(12) United States Patent
Utsubo

(10) Patent No.: US 9,154,646 B2
(45) Date of Patent: Oct. 6, 2015

(54) IMAGE FORMING SYSTEM

(71) Applicant: OKI DATA CORPORATION, Tokyo (JP)

(72) Inventor: Yoshiaki Utsubo, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 14/166,915

(22) Filed: Jan. 29, 2014

(65) Prior Publication Data

US 2014/0211220 A1    Jul. 31, 2014

(30) Foreign Application Priority Data

Jan. 30, 2013 (JP) ................................. 2013-015995

(51) Int. Cl.
*G06F 3/12* (2006.01)
*H04N 1/00* (2006.01)
*H04N 1/32* (2006.01)
*G06K 15/00* (2006.01)

(52) U.S. Cl.
CPC ....... *H04N 1/00225* (2013.01); *H04N 1/00233* (2013.01); *H04N 1/00244* (2013.01); *H04N 1/00344* (2013.01); *H04N 1/00925* (2013.01); *H04N 1/00973* (2013.01); *H04N 1/32122* (2013.01); *H04N 2201/0081* (2013.01); *H04N 2201/0082* (2013.01); *H04N 2201/0094* (2013.01); *H04N 2201/3204* (2013.01); *H04N 2201/3205* (2013.01); *H04N 2201/3208* (2013.01); *H04N 2201/3276* (2013.01)

(58) Field of Classification Search
CPC ................... H04N 1/00925; H04N 2201/3208
See application file for complete search history.

(56) References Cited

U.S. PATENT DOCUMENTS

2003/0103236 A1* 6/2003 Kato ............................ 358/1.15
2004/0190042 A1* 9/2004 Ferlitsch et al. ............. 358/1.15

FOREIGN PATENT DOCUMENTS

JP        2007-072514 A    3/2007

OTHER PUBLICATIONS

Machine Translation of JP 2007072514 A, Auther Name Yoshida Tomoya, Date Mar. 2007, Country Japan, pp. 1-15.*

* cited by examiner

*Primary Examiner* — Dov Popovici
(74) *Attorney, Agent, or Firm* — Kubotera & Associates, LLC

(57) ABSTRACT

An image forming system includes a first image forming apparatus configured to form an image according to first setting information that is set to a first user; a second image forming apparatus configured to form an image according to second setting information that is set to a second user; and an administration apparatus that holds the first setting information and the second setting information and administers the first image forming apparatus and the second image forming apparatus according to the first setting information and the second setting information thus held. The administration apparatus includes a determining unit configured to determine whether a substitute apparatus for the first image forming apparatus is necessary; and an information setting unit configured to obtain the first setting information according to a determination result of the determining unit, and add the first setting information to the second setting information.

8 Claims, 19 Drawing Sheets

FIG. 2

200: Apparatus administration table

| N | 200A | 200B | 200C | 200D | 200E | 200F |
|---|---|---|---|---|---|---|
| NO | Apparatus name | Address | Status | Non-connection time | Substitution flag | Substitute apparatus name |
| 1 | First floor east MFP | 192.168.0.1 | 0 | 0 | 0 | First floor west MFP |
| 2 | First floor west MFP | 192.168.0.2 | 0 | 0 | 0 | First floor east MFP |
| | | | | | | |
| | | | | | | |

201a : First function limitation information table

| NO | User name | Printing permission flag | Facsimile transmission permission flag | Scanning permission flag | Substitution flag | Mail address |
|---|---|---|---|---|---|---|
| 1 | User1 | 0 | 1 | 0 | 0 | User1@aaa.bbb |
| 2 | User2 | 0 | 0 | 0 | 0 | User2@aaa.bbb |
| 3 | User4 | 0 | 1 | 1 | 0 | User4@aaa.bbb |
| | | | | | | |

FIG. 3 (a)

201b : Second function limitation information table

| NO | User name | Printing permission flag | Facsimile transmission permission flag | Scanning permission flag | Substitution flag | Mail address |
|---|---|---|---|---|---|---|
| 1 | User3 | 0 | 1 | 0 | 0 | User3@aaa.bbb |
| 2 | User4 | 0 | 0 | 0 | 0 | User4@aaa.bbb |
| | | | | | | |

FIG. 3 (b)

250: Apparatus administration table

| NO | Apparatus name | Model name | Address | Status | Non-connection time | Substitution flag | Substitute apparatus name |
|---|---|---|---|---|---|---|---|
| 1 | First floor west MFP | Model1 | 192.168.0.2 | 0 | 0 | 0 | First floor south printer |
| 2 | First floor south printer | Model2 | 192.168.0.3 | 0 | 0 | 0 | First floor west MFP |
| | | | | | | | |
| | | | | | | | |
| N | | | | | | | |
| 250A | 250B | 250C | 250D | 250E | 250F | 250G |

251a: First function limitation information table

| NO | User name | Printing permission flag | Facsimile transmission permission flag | Scanning permission flag | Substitution flag | Mail address |
|---|---|---|---|---|---|---|
| 1 | User3 | 0 | 1 | 0 | 0 | User3@aaa.bbb |
| 2 | User4 | 0 | 0 | 0 | 0 | User4@aaa.bbb |

FIG. 9(b)

251b: Second function limitation information table

| NO | User name | Printing permission flag | Facsimile transmission permission flag | Scanning permission flag | Substitution flag | Mail address |
|---|---|---|---|---|---|---|
| 1 | User1 | 0 | 1 | 1 | 0 | User1@aaa.bbb |
| 2 | User2 | 0 | 1 | 1 | 0 | User2@aaa.bbb |
| 3 | User4 | 0 | 1 | 1 | 0 | User4@aaa.bbb |

FIG. 10

257: Model information table

| Model name | Print-ing flag | Facsimile trans-mission flag | Scann-ing flag | Printer driver name | Fax driver name | Scanner driver name | Printer driver pass | Fax driver pass | Scanner driver pass |
|---|---|---|---|---|---|---|---|---|---|
| Model1 | 0 | 0 | 0 | Model1Prn | Model1Fax | Model1Scn | ¥¥Server¥Drv¥Model1Prn | ¥¥Server¥Drv¥Model1Fax | ¥¥Server¥Drv¥Model1Scn |
| Model2 | 0 | 1 | 1 | Model2Prn | | | ¥¥Server¥Drv¥Model2Prn | | |

257A · 257B · 257C · 257D · 257E · 257F · 257G · 257H · 257I · 257J

IMAGE FORMING SYSTEM

BACKGROUND OF THE INVENTION AND RELATED ART STATEMENT

The present invention relates to an image forming system. More specifically, the present invention relates to an image forming system capable of switching to a substitute image forming apparatus when a current image forming apparatus that is currently used becomes an unusable state due to malfunction and the like.

A conventional image forming system includes a plurality of image forming apparatus connected through a network. In the conventional image forming system, when a specific image forming apparatus becomes unusable due to malfunction and the like, another image forming apparatus is substituted. For example, in the conventional image forming system disclosed in Patent Reference, setting information is obtained from an image forming apparatus that becomes unusable, and the setting information is set in another image forming apparatus that is substituted. Accordingly, a user who is using the image forming apparatus that becomes unusable is able to use another image forming apparatus that is substituted.

Patent Reference: Japanese Patent Publication No. 2007-72514

In the conventional image forming system disclosed in Patent Reference, however, the setting information with regard to communication of the image forming apparatus that becomes unusable is set in the image forming apparatus that is substituted. Accordingly, it is necessary to add another image forming apparatus that is substituted.

An object of the present invention is to provide an image forming system, an image forming system capable of solving the problems of the conventional image forming system.

Further objects and advantages of the invention will be apparent from the following description of the invention.

SUMMARY OF THE INVENTION

In order to attain the objects described above, according to a first aspect of the present invention, an image forming system includes a first image forming apparatus configured to form an image according to first setting information that is set to a first user; a second image forming apparatus configured to form an image according to second setting information that is set to a second user; and an administration apparatus that holds the first setting information and the second setting information and administers the first image forming apparatus and the second image forming apparatus according to the first setting information and the second setting information thus held.

In the first aspect of the present invention, the administration apparatus includes a determining unit configured to determine whether a substitute apparatus for the first image forming apparatus is necessary; and an information setting unit configured to obtain the first setting information, and add the first setting information to the second setting information according to a determination result of the determining unit.

As described above, according to the first aspect of the present invention, the image forming system includes the first image forming apparatus; the second image forming apparatus; and the administration apparatus. Further, the administration apparatus includes the determining unit configured to determine whether the substitute apparatus for the first image forming apparatus is necessary; and the information setting unit configured to obtain the first setting information according to a determination result of the determining unit, and add the first setting information to the second setting information. Accordingly, it is possible to set the setting information regarding communication of the image forming apparatus that malfunctions to another image forming apparatus that is substituted. As a result, it is not necessary to add another image forming apparatus that is substituted for setting.

BRIEF DESCRIPTION OF THE DRAWINGS

FIG. 2 is a schematic view showing an example of an apparatus administration table of the image forming system according to the first embodiment of the present invention;

FIGS. 3(a) and 3(b) are schematic views showing examples of a first function limitation information table and a second function limitation information table of the image forming system according to the first embodiment of the present invention;

FIG. 8 is a schematic view showing an example of an apparatus administration table of the image forming system according to the second embodiment of the present invention;

FIGS. 9(a) and 9(b) are schematic views showing examples of a first function limitation information table and a second function limitation information table of the image forming system according to the second embodiment of the present invention;

FIG. 10 is a schematic view showing an example of a model information table of the image forming system according to the second embodiment of the present invention;

DETAILED DESCRIPTION OF PREFERRED EMBODIMENTS

Hereunder, embodiments of the present invention will be explained with reference to the accompanying drawings. It should be noted that the accompanying drawings are presented only for an explanation purpose, and the present invention is not limited to the accompanying drawings.

First Embodiment

Figure 1:
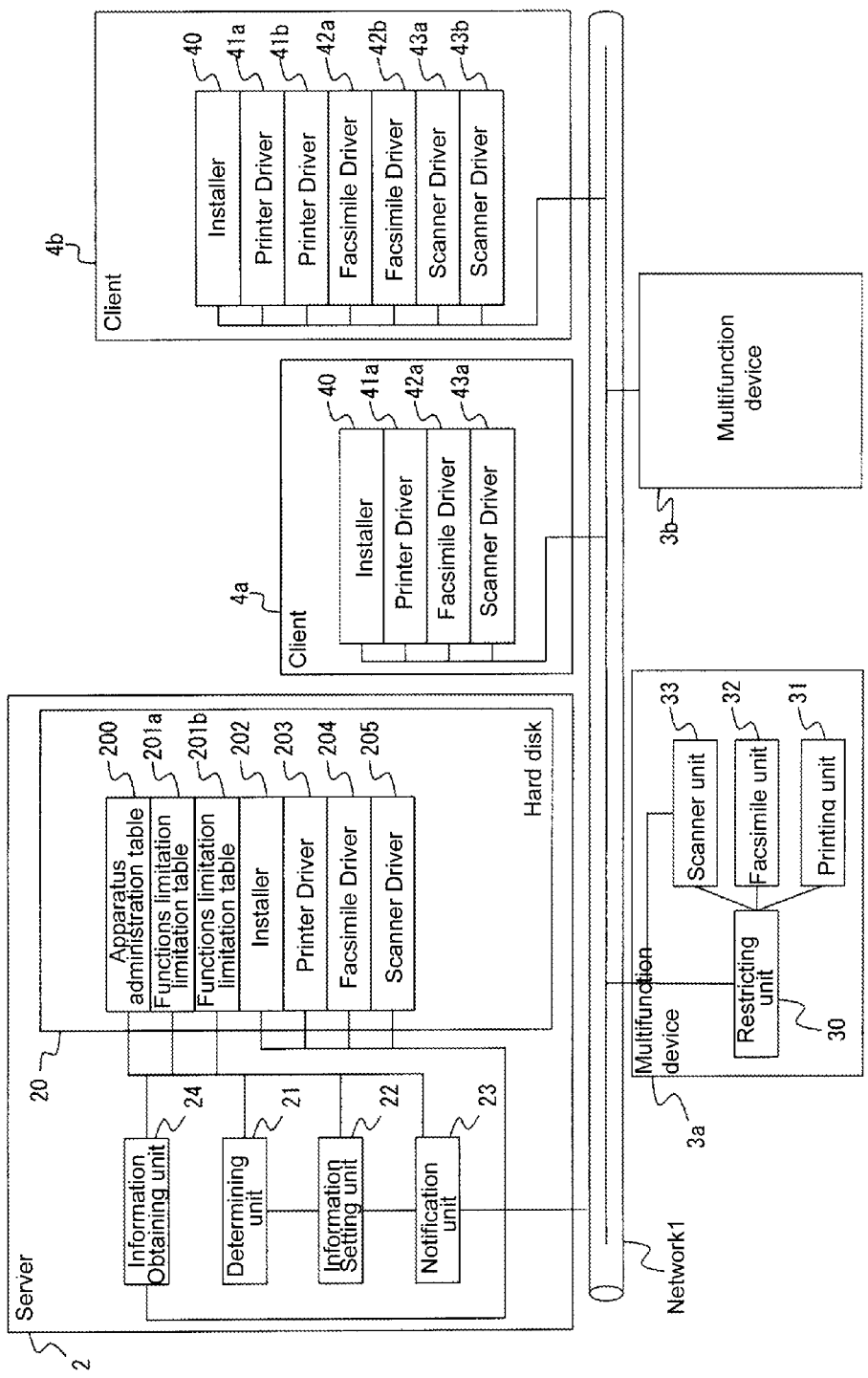
FIG. 1 is a block diagram showing a configuration of an image forming system according to a first embodiment of the present invention.

A first embodiment of the present invention will be explained. FIG. 1 is a block diagram showing a configuration of an image forming system according to the first embodiment of the present invention.

As shown in FIG. 1, the image forming system includes a server 2 as an administration apparatus; a multifunction device 3a as a first image forming apparatus; a multifunction device 3b as a second image forming apparatus; a client device 4a (also referred to as a client 4a) as an information processing apparatus; and a client device 4b (also referred to as a client 4b) as the information processing apparatus, all of which are connected through a network 1 to be able to communicate with each other in bilateral directions.

In the first embodiment, the image forming apparatus may include an apparatus in general that is capable of forming an image according to image data. Further, the multifunction device may include an apparatus having a plurality of functions including a facsimile function, a scanner function for reading an image from a recording medium and the like to generate image data, and the like, in addition to an image forming function.

In the first embodiment, the server 2 is configured to administer function limitation information of users of the multifunction device 3a and the multifunction device 3b. More specifically, the server 2 includes a hard disk 20; a determining unit 21; an information setting unit 22; a notification unit 23; and an information obtaining unit 24. It should be noted that the server 2 has a name "Server".

In the first embodiment, the hard disk 20 is formed of a non-volatile storage device, and is configured to store an apparatus administration table 200; a first function limitation information table 201a; a second function limitation information table 201b; an installer 202; a printer driver 203; a facsimile driver 204; and a scanner driver 205.

FIG. 2 is a schematic view showing an example of the apparatus administration table 200 of the image forming system according to the first embodiment of the present invention.

As shown in FIG. 2, the apparatus administration table 200 stores information of the multifunction device 3a and the multifunction device 3b. More specifically, the apparatus administration table 200 includes an apparatus name column 200A; an address column 200B; a status column 200C; a non-connection time column 200D; a substitution flag column 200E; and a substitute apparatus name column 200F.

In the first embodiment, names arbitrarily assigned to the apparatus are stored in the apparatus name column 200A. Addresses as locations of the apparatus on the network are stored in the address column 200B. A status of the apparatus is stored in the status column 200C. When the apparatus is in a usable state, "0" is assigned to the status. When the apparatus is in an unusable state, "1" is assigned to the status. When the apparatus cannot be connected due to power off and the like, "2" is assigned to the status. A period of time during which the apparatus is in the unconnected state is stored in the non-connection time column 200D. The substitution flag is stored in the substitution flag column 200E. When the determining unit 21 determines that the substitute apparatus is not necessary, "0" is assigned to the substitution flag. When the determining unit 21 determines that the substitute apparatus is necessary, "1" is assigned to the substitution flag. A name of the substitute apparatus is stored in the substitute apparatus name column 200F when the determining unit 21 determines that the substitute apparatus is necessary.

FIGS. 3(a) and 3(b) are schematic views showing examples of the first function limitation information table 201a and the second function limitation information table 201b of the image forming system according to the first embodiment of the present invention. More specifically, FIG. 3(a) is a schematic view showing an example of the first function limitation information table 201a of the image forming system, and FIG. 3(b) is a schematic view showing an example of the second function limitation information table 201b of the image forming system.

In the first embodiment, each of the first function limitation information table 201a and the second function limitation information table 201b is disposed per each apparatus of the apparatus administration table 200, and is provided for storing information to restrict a function per user. More specifically, each of the first function limitation information table 201a and the second function limitation information table 201b includes a user name column 201A; a printing permission flag column 201B; a facsimile transmission permission flag column 201C; a scanning permission flag column 201D; a substitution number column 201E; and a mail address column 201F.

In the first embodiment, a user name whose function is restricted is stored in the user name column 201A. A printing permission flag is stored in the printing permission flag column 201B. When a printing operation is restricted relative to the user name stored in the user name column 201A, "1" is assigned to the printing permission flag. When the printing operation is not restricted relative to the user name stored in the user name column 201A, "0" is assigned to the printing permission flag. A facsimile transmission permission flag is stored in the facsimile transmission permission flag column 201C. When a facsimile transmission operation is restricted relative to the user name stored in the user name column 201A, "1" is assigned to the facsimile transmission permission flag. When the facsimile transmission operation is not restricted relative to the user name stored in the user name column 201A, "0" is assigned to the facsimile transmission permission flag. A scanning permission flag is stored in the scanning permission flag column 201D. When a scanning operation is restricted relative to the user name stored in the user name column 201A, "1" is assigned to the scanning permission flag. When the scanning operation is not restricted relative to the user name stored in the user name column 201A, "0" is assigned to the scanning permission flag.

In the first embodiment, a substitution number is stored in the substitution number column 201E. When the user is not added as the substitution apparatus, "0" is assigned to the substitution number. When the user is added as the substitution apparatus, "1" is assigned to the substitution number. When the user exists in a plurality of apparatus, the number of the apparatus is assigned to the substitution number. A mail address of the user is stored in the mail address column 201F.

In the first embodiment, an installer is stored in the hard disk 202 shown in FIG. 1. The installer is a program for installing the hard disk 203, the hard disk 204, and the hard disk 205 as a control program for controlling the multifunction device 3a and the multifunction device 3b to the client device 4a or the client device 4b. It should be noted that a path to the hard disk 202 is represented as "¥¥Server¥Drv¥Installer.exe". The printer driver 203 is a program for the client device 4a or the client device 4b to instruct the multifunction device 3a or the multifunction device 3b to perform the printing operation. It should be noted that "Model1Prn" is assigned as a name of the hard disk 203. The facsimile driver 204 is a program for the client device 4a or the client device 4b to instruct the multifunction device 3a or the multifunction device 3b to perform the facsimile transmission operation. It should be noted that "Model1Fax" is assigned as a name of the hard disk 204. The scanner driver 205 is a program for the multifunction device 3a or the multifunction device 3b to perform the scanning operation and obtain scan data. It should be noted that "Model1Scn" is assigned as a name of the hard disk 205.

In the first embodiment, the determining unit 21 is configured to retrieve the address column 200B, the substitution flag column 200E, and the substitute apparatus name column 200F from the apparatus administration table 200 per inquiry interval, so that the determining unit 21 obtains the status of the apparatus at the address thus retrieved. Further, the determining unit 21 is configured to store "0" in the status column 200C when the apparatus is in the usable state; to store "1" in the status column 200C when the apparatus is not in the usable state; and to store "2" in the status column 200C when the apparatus cannot be connected. It should be noted that the inquiry interval is set to one minute in the first embodiment.

Further, the determining unit 21 is configured to store "0" in the non-connection time column 200D when the apparatus is connected, and to add one to the non-connection time in the non-connection time column 200D when the apparatus cannot be connected. Then, the determining unit 21 determines that the substitute apparatus is necessary when "0" is assigned to the substitution flag column 200E, "1" or "2" is assigned to the status column 200C, and the value in the non-connection time column 200D is greater than an unusable determination time. When the determining unit 21 determines that the substitute apparatus is necessary, the determining unit 21 assigns "1" in the substitution flag column 200E, and transmits the apparatus name of the current apparatus, the substitution flag, and the apparatus name of the substitution apparatus to the information setting unit 22. It should be noted that the unusable determination time is set to 60 minutes in the first embodiment.

In the first embodiment, the determining unit 21 determines that the substitute apparatus is not necessary when "1" is assigned to the substitution flag column 200E, and "0" is assigned to the status column 200C. When the determining unit 21 determines that the substitute apparatus is not necessary, the determining unit 21 assigns "0" in the substitution flag column 200E, and transmits the apparatus name of the current apparatus, the substitution flag, and the apparatus name of the substitution apparatus to the information setting unit 22.

In the first embodiment, when the information setting unit 22 receives the apparatus name of the current apparatus, the substitution flag, and the apparatus name of the substitution apparatus from the determining unit 21, the information setting unit 22 retrieves the user name column 201A, the printing permission flag column 201B, the facsimile transmission permission flag column 201C, the scanning permission flag column 201D, the substitution number column 201E, and the mail address column 201F from the first function limitation information table 201a or the second function limitation information table 201b corresponding to the apparatus name of the current apparatus when the substitution flag is "1".

In the first embodiment, when the user name of the current apparatus does not exist in the first function limitation information table 201a or the second function limitation information table 201b corresponding to the apparatus name of the substitution apparatus, the information setting unit 22 adds the user name of the current apparatus. At the same time, the information setting unit 22 stores the printing permission flag of the current apparatus in the printing permission flag column 201B; the facsimile transmission permission flag in the facsimile transmission permission flag column 201C; the scanning permission flag in the scanning permission flag column 201D; the mail address of the current apparatus in the mail address column 201F; and "1" in the substitution number column 201E. Further, the information setting unit 22 transmits the apparatus name, the substitution flag, the apparatus name of the substitution apparatus, the user name, and the mail address to the notification unit 23. When the user name of the current apparatus exists, and "0" is not assigned to the substitution number column 201E, the information setting unit 22 adds "1" to the substitution number column 201E to be stored.

In the first embodiment, when the substitution flag is "0", the information setting unit 22 retrieves the user name column 201A and the mail address column 201F from the first function limitation information table 201a or the second function limitation information table 201b corresponding to the apparatus name of the current apparatus. When the user name of the current apparatus exists in the first function limitation information table 201a or the second function limitation information table 201b corresponding to the apparatus name of the substitution apparatus, and "1" is assigned to the substitution number column 201E, the information setting unit 22 transmits the apparatus name of the current apparatus, the substitution flag, the apparatus name of the substitution apparatus, the user name, and the mail address to the notification unit 23. When a number more than "2" is assigned to the substitution number column 201E, the information setting unit 22 subtracts "1" to be stored.

In the first embodiment, when the notification unit 23 receives the apparatus name of the current apparatus, the substitution flag, the apparatus name of the substitution apparatus, the user name, and the mail address from the information setting unit 22, the notification unit 23 retrieves the address column 200B of an entry in which the apparatus name of the substitution apparatus matches to the apparatus name column 200A of the apparatus administration table 200. When the substitution flag is "1", the notification unit 23 transmits a mail to the mail address. The mail states that the substitution apparatus is to be used since the apparatus name of the current apparatus cannot be used. Further, the substitution flag, the apparatus name of the substitution apparatus, and the address of the substitution apparatus are added to the path of the hard disk 202.

In the first embodiment, when the substitution flag is "1", the notification unit 23 retrieves the address column 200B of an entry in which the apparatus name of the substitution apparatus matches to the apparatus name column 200A of the apparatus administration table 200, and transmits a mail to the mail address. The mail states that the apparatus name of the current apparatus can be used. Further, the substitution flag, the apparatus name of the substitution apparatus, the address of the current apparatus, and the address of the substitution apparatus are added to the path of the hard disk 202.

In the first embodiment, when the information obtaining unit 24 receives an inquiry of the function limitation information of the user thus specified, the information obtaining unit 24 retrieves the function limitation information of the user thus specified from the first function limitation information table 201a or the second function limitation information table 201b corresponding to the apparatus name to which the inquiry is referred. Then, the information obtaining unit 24 returns the function limitation information of the user thus specified to the inquirer. When the user thus specified does not exist in the first function limitation information table 201a or the second function limitation information table 201b, the information obtaining unit 24 returns "1" to the inquirer.

In the first embodiment, the multifunction device 3a includes a restricting unit 30; a printing unit 31; a facsimile unit 32; and a scanner unit 33. When the restricting unit 30 receives print data from the client device 4a or the client device 4b, the restricting unit 30 inquires the server 2 of the printing permission flag column 201B of the user that transmits the print data. When "0" is assigned in the printing permission flag column 201B, the restricting unit 30 transmits the print data to the printing unit 31. When "1" is assigned in the printing permission flag column 201B, the restricting unit 30 cancels the print data.

Further, when the restricting unit 30 receives facsimile transmission data from the client device 4a or the client device 4b, the restricting unit 30 inquires the server 2 of the facsimile transmission permission flag column 201C of the user that transmits the facsimile transmission data. When "0" is assigned in the facsimile transmission permission flag column 201C, the restricting unit 30 transmits the facsimile transmission data to the facsimile unit 32. When "1" is assigned in the facsimile transmission permission flag column 201C, the restricting unit 30 cancels the facsimile transmission data.

Further, when the restricting unit 30 receives a scanning request from the client device 4a or the client device 4b, the restricting unit 30 inquires the server 2 of the scanning permission flag column 201D of the user that transmits the scanning request. When "0" is assigned in the scanning permission flag column 201D, the restricting unit 30 transmits the scanning request to the scanner unit 33. When "1" is assigned in the scanning permission flag column 201D, the restricting unit 30 cancels the scanning request.

In the first embodiment, when the printing unit 31 receives the print data, the printing unit 31 prints the print data. When the facsimile unit 32 receives the facsimile transmission data, the facsimile unit 32 transmits the facsimile transmission data. When the scanner unit 33 receives the scanning request, the scanner unit 33 performs a scanning operation, and transmits scan data to the client device 4a or the client device 4b who transmits the scanning request.

In the first embodiment the multifunction device 3b has a configuration (not shown in detail) similar to that of the multifunction device 3a. It is supposed that the multifunction device 3a has an apparatus name of "First floor east MFP" and an address of "192.168.0.1", and the multifunction device 3b has an apparatus name of "First floor west MFP" and an address of "192.168.0.2".

In the first embodiment, the client device 4a and the client device 4b are configured to generate the print data, and transmit the print data thus generated to the multifunction device 3a or the multifunction device 3b, so that the multifunction device 3a or the multifunction device 3b performs the printing operation. Further, the client device 4a and the client device 4b are configured to generate the facsimile transmission data, and transmit the facsimile transmission data thus generated to the multifunction device 3a or the multifunction device 3b, so that the multifunction device 3a or the multifunction device 3b performs the facsimile transmission operation. Further, the client device 4a and the client device 4b are configured to obtain the scanning data scan with the multifunction device 3a or the multifunction device 3b.

As shown in FIG. 1, the client device 4a includes an installer 40; a printer driver 41a as a control program; a facsimile driver 42a; and a scanner driver 43a. It is supposed that a user 1 (referred to as User1) as a first operator normally uses the multifunction device 3a with the client device 4a.

As shown in FIG. 1, the client device 4b includes the installer 40; a printer driver 41b as a control program; the facsimile driver 42a; a facsimile driver 42b; the scanner driver 43a; and a scanner driver 43b. It is supposed that the printer driver 41a, the facsimile driver 42a, and the scanner driver 43a are not installed initially in the client device 4b. It is supposed that a user (referred to as User3) as a second operator normally uses the multifunction device 3b with the client device 4b.

In the first embodiment, the installer 40 is provided for installing the printer driver 41a as the control program, the printer driver 41a, the facsimile driver 42a, the facsimile driver 42b, the scanner driver 43a, and the scanner driver 43b. More specifically, when the notification unit 23 in the server 2 transmits a mail and the path of the hard disk 202 is executed, the substitution flag added to the path is obtained. When the substitution flag thus obtained is "1", the substitute apparatus name and the address of the substitute apparatus are obtained. Further, when the printer driver having a connection destination matching to the address of the substitute apparatus is not installed, the hard disk 203 of the server 2 is installed with a name that the printer driver name is added to the substitute apparatus name, and the connection destination as the address of the substitute apparatus.

Further, when the facsimile driver having the connection destination matching to the address of the substitute apparatus is not installed, the hard disk 204 of the server 2 is installed with a name that the facsimile driver name is added to the substitute apparatus name, and the connection destination as the address of the substitute apparatus. Further, when the scanner driver having the connection destination matching to the address of the substitute apparatus is not installed, the hard disk 205 of the server 2 is installed with a name that the scanner driver name is added to the substitute apparatus name, and the connection destination as the address of the substitute apparatus.

In the first embodiment, when the substitution flag thus obtained is "0", the apparatus name of the current apparatus added to the path, the address of the current apparatus, and the address of the substitute apparatus are obtained. When the printer driver having the connection destination matching to the address of the current apparatus is installed, the printer driver is deleted. Further, when the printer driver having the connection destination matching to the address of the current apparatus is not installed, the hard disk 203 is installed with a name that the printer driver name is added to the apparatus name of the current apparatus, and the connection destination as the address of the current apparatus.

Further, when the facsimile driver having the connection destination matching to the address of the current apparatus is installed, the facsimile driver is deleted. Further, when the facsimile driver having the connection destination matching to the address of the current apparatus is not installed, the hard disk 204 is installed with a name that the facsimile driver name is added to the apparatus name of the current apparatus, and the connection destination as the address of the current apparatus. Further, when the scanner driver having the connection destination matching to the address of the current apparatus is installed, the scanner driver is deleted. Further, when the scanner driver having the connection destination matching to the address of the current apparatus is not installed, the hard disk 205 is installed with a name that the scanner driver name is added to the apparatus name of the current apparatus, and the connection destination as the address of the current apparatus.

In the first embodiment, the printer driver 41a and the printer driver 41b generate the print data in response to a call from an application (not shown), and transmit the print data to the multifunction device 3a or the multifunction device 3b as the connection destination. It is supposed that the printer driver 41a and the printer driver 41b are connected to the multifunction device 3a and the multifunction device 3b, respectively.

In the first embodiment, the facsimile driver 42a and the facsimile driver 42b generate the facsimile transmission data in response to a call from an application (not shown), and transmit the facsimile transmission data to the multifunction device 3a or the multifunction device 3b as the connection destination. It is supposed that the facsimile driver 42a and the facsimile driver 42b are connected to the multifunction device 3a and the multifunction device 3b, respectively.

In the first embodiment, the scanner driver 43a and the scanner driver 43b obtain the scan data from the multifunction device 3a or the multifunction device 3b in response to a call from an application (not shown), and transmit the scan data to the application that transmits the call. It is supposed that the scanner driver 43a and the scanner driver 43b are connected to the multifunction device 3a and the multifunction device 3b, respectively.

An operation of the image forming system will be explained next separately when the multifunction device 3b becomes the unusable state and when the multifunction device 3b becomes the usable state.

Figure 4:
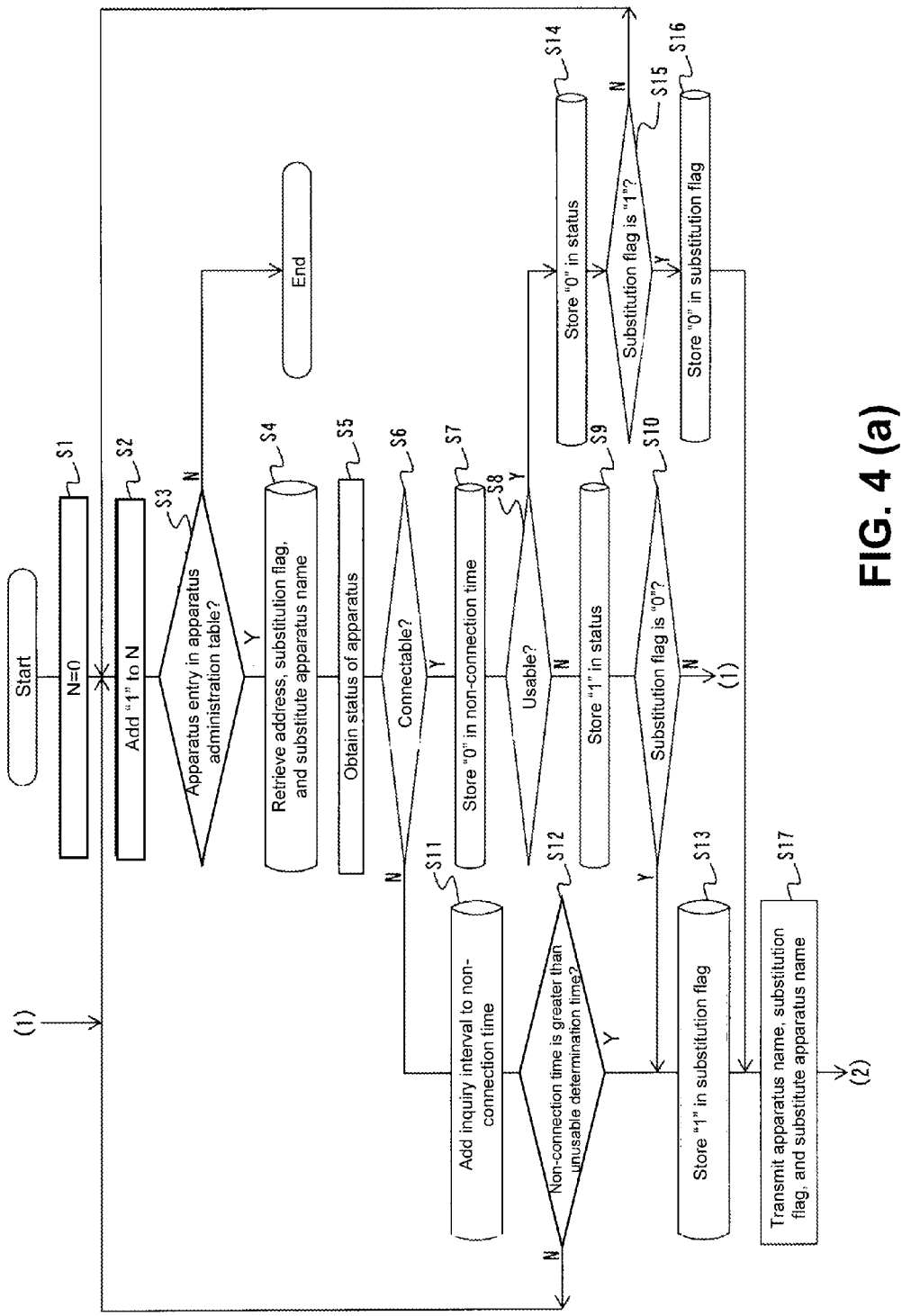
FIG. 4(a) is a flowchart No. 1 showing an operation of a server of the image forming system in a process after an inquiry interval is elapsed according to the first embodiment of the present invention.
FIG. 4(b) is a flowchart No. 2 showing the operation of the server of the image forming system in the process after the inquiry interval is elapsed according to the first embodiment of the present invention.
Figure 4:
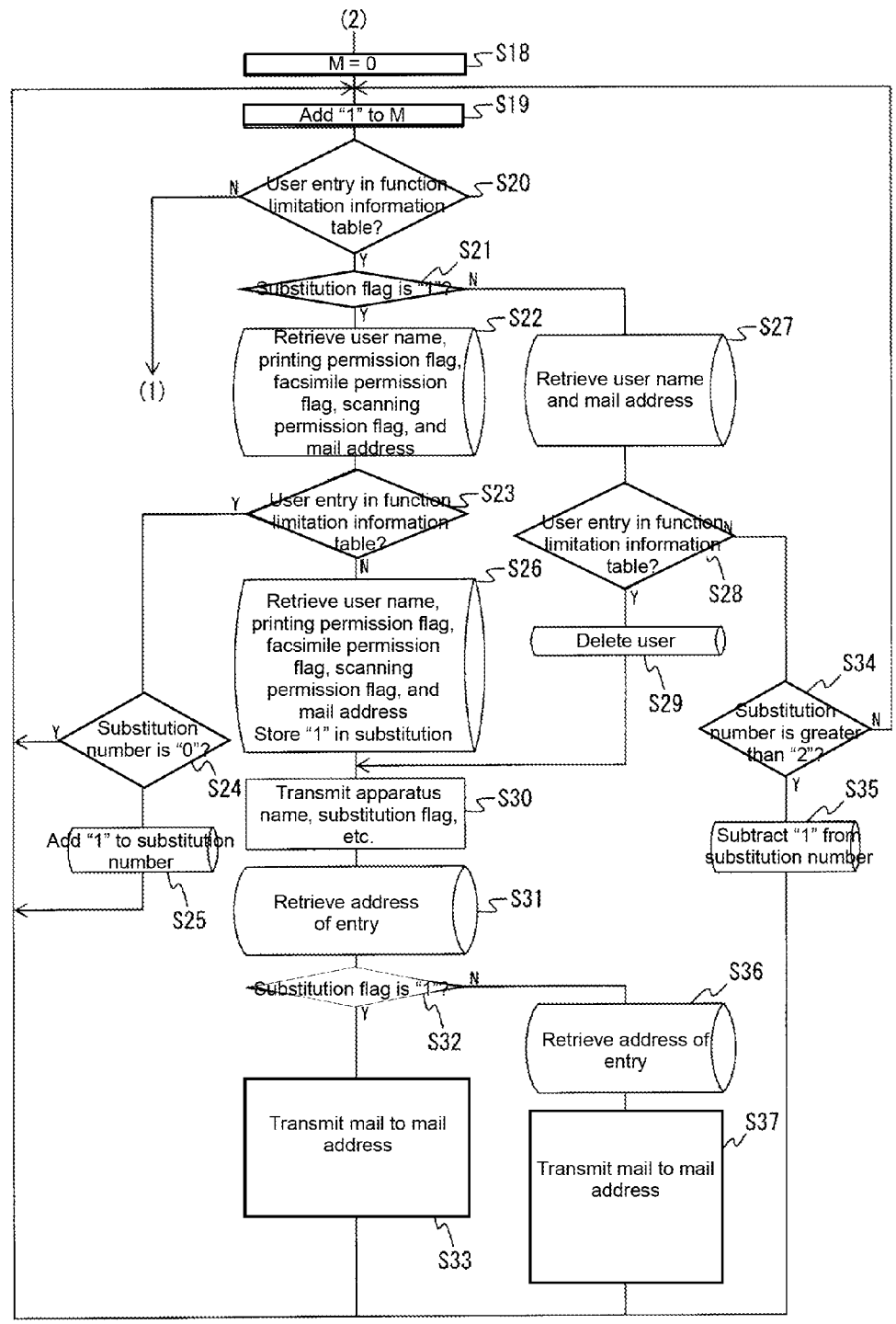

First, the operation of the image forming system when the multifunction device 3b becomes the unusable state will be explained. FIG. 4(a) is a flowchart No. 1 showing an operation of the server 2 of the image forming system in a process after the inquiry interval is elapsed according to the first embodiment of the present invention. FIG. 4(b) is a flowchart No. 2 showing the operation of the server 2 of the image forming system in the process after the inquiry interval is elapsed according to the first embodiment of the present invention.

As shown in the flowchart shown in FIG. 4(a), in the process from step S1 to step S17, the determining unit 21 obtains the status from the multifunction device 3a or the multifunction device 3b with reference to the apparatus administration table 200, so that the determining unit 21 determines whether the substitute apparatus is necessary. When the determining unit 21 determines that the substitute apparatus is necessary, or the determining unit 21 determines that the substitute apparatus is not necessary, the determining unit 21 transmits the apparatus name, the substitution flag, and the substitution apparatus name to the information setting unit 22.

As shown in the flowchart shown in FIG. 4(b), in the process from step S18 to step S30, step S34, and step S35, when the determining unit 21 determines that the substitute apparatus is necessary, the information setting unit 22 adds the user that does not exist in the first function limitation information table 201a or the second function limitation information table 201b of the substitute apparatus with reference to the first function limitation information table 201a or the second function limitation information table 201b of the current apparatus. When the determining unit 21 determines that the substitute apparatus is not necessary, the information setting unit 22 deletes the user added to the first function limitation information table 201a or the second function limitation information table 201b of the substitute apparatus with reference to the first function limitation information table 201a or the second function limitation information table 201b of the current apparatus. Further, the information setting unit 22 transmits the apparatus name, the substitution flag, the substitute apparatus name, the user name, and the mail address to the notification unit 23.

As shown in the flowchart shown in FIG. 4(b), in the process from step S31 to step S33, step S36, and step S37, when the substitute apparatus is necessary, with reference to the apparatus administration table 200, the notification unit 23 transmits the mail indicating that the apparatus becomes the unusable state and the substitute apparatus is used and including the information for installing the driver of the substitute apparatus. When the substitute apparatus is not necessary, with reference to the apparatus administration table 200, the notification unit 23 transmits the mail indicating that the apparatus becomes the usable state and including the information for deleting the driver of the substitute apparatus.

The operation of the server 2 will be explained next in more detail when the multifunction device 3b becomes the unusable state due to malfunction and the inquiry interval of the server 2 is elapsed with reference to FIGS. 1 to 4(a)-4(b).

When the operation starts, the process proceeds to step S1. In step S1, the determining unit 21 set the number N in the apparatus administration table 200 to zero (N=0), and the process proceeds to step S2. In step S2, the determining unit 21 adds "1" to the number N (N=1), and the process proceeds to step S3. In step S3, the determining unit 21 determines whether the apparatus registered in the first row does exist in the apparatus administration table 200. When the determining unit 21 determines that the apparatus exists (Y in step S3), the process proceeds to step S4. When the determining unit 21 determines that the apparatus does not exist (N in step S3), the process is completed. For example, in the apparatus administration table 200 shown in FIG. 2, the apparatus name "First floor east MFP" is registered in the first row. Accordingly, the process proceeds to step S4.

In step S4, the determining unit 21 retrieves the address "192.168.0.1", the substitution flag "0", and the substitute apparatus name "First floor west MFP" from the first row of the apparatus administration table 200 where the apparatus name "First floor east MFP" is registered. Then, the process proceeds to step S5. In step S5, the determining unit 21 obtains the status of the usable state from the apparatus with the address "192.168.0.1", and the process proceeds to step S6. In step S6, the determining unit 21 determines whether the apparatus can be connected. When the determining unit 21 determines that the apparatus can be connected (Y in step S6), the process proceeds to step S7. When the determining unit 21 determines that the apparatus cannot be connected (N in step S6), the process proceeds to step S11.

In step S11, the determining unit 21 adds the inquiry interval to the non-connection time column 200D of the apparatus administration table 200 to be stored, and the process proceeds to step S12. In step S12, the determining unit 21 determines whether the value in the non-connection time column 200D is greater than the unusable determination time. When the determining unit 21 determines that the value in the non-connection time column 200D is greater than the unusable determination time (Y in step S12), the process proceeds to step S13. When the determining unit 21 determines that the value in the non-connection time column 200D is not greater than the unusable determination time (N in step S12), the process returns to step S2. Accordingly, the process from step S2 to step S6, step S11, and step S12 is repeated until the value in the non-connection time column 200D becomes greater than the unusable determination time (Y in step S12). When the value in the non-connection time column 200D is greater than the unusable determination time (Y in step S12), the process proceeds to step S13.

In step S7, the determining unit 21 stores "0" in the first row of the non-connection time column 200D of the apparatus administration table 200, and the process proceeds to step S8. In step S8, the determining unit 21 determines whether the apparatus is in the usable state. When the determining unit 21 determines that the apparatus is in the usable state (Y in step S8), the process proceeds to step S14. In this case, the status obtained in step S8 is the usable state (Y in step S8). Accordingly, the process proceeds to step S14. In step S14, the determining unit 21 stores "0" in the status column 200C of the apparatus administration table 200, and the process proceeds to step S15.

In step S15, the determining unit 21 determines whether the substitution flag is "1". When the determining unit 21 determines that the substitution flag is not "1" (N in step S15), the process returns to step S2. Accordingly, the process from step S2 to step S8, step S14, and step S15 is repeated until the substitution flag becomes "1" (Y in step S15). When the substitution flag becomes "1" (Y in step S15), the process proceeds to step S16. In step S16, the determining unit 21 stores "0" in the substitution flag column 200E of the apparatus administration table 200, and the process proceeds to step S17.

In step S2, the determining unit 21 adds "1" to the number N (N=2), and the process proceeds to step S3. In step S3, the determining unit 21 determines that the apparatus exists (Y in step S3), and the process proceeds to step S4.

In step S4, the determining unit 21 retrieves the address "192.168.0.2", the substitution flag "0", and the substitute apparatus name "First floor east MFP" from the second row of the apparatus administration table 200 where the apparatus name "First floor west MFP" is registered. Then, the process proceeds to step S5.

In step S5, the determining unit 21 obtains the status of the unusable state from the apparatus with the address "192.168.0.2", and the process proceeds to step S6. In step S6, the determining unit 21 determines that the apparatus can be connected (Y in step S6), and the process proceeds to step S7.

In step S7, the determining unit 21 stores "0" in the second row of the non-connection time column 200D of the apparatus administration table 200, and the process proceeds to step S8. In step S8, the determining unit 21 determines that the apparatus is not in the usable state (N in step S8), and the process proceeds to step S9.

In step S9, the determining unit 21 stores "1" in the status column 200C of the apparatus administration table 200, and the process proceeds to step S10. In step S10, the determining unit 21 determines whether the substitution flag is "0". In this case, the determining unit 21 determines that the substitution flag is "0" (Y in step S10), the process returns to step S13. When the determining unit 21 determines that the substitution flag is not "0" (N in step S10), the process returns to step S2 through a connection path (1). Accordingly, the process from step S2 to step S10 is repeated until the substitution flag becomes "0" (Y in step S10).

In step S13, the determining unit 21 stores "1" in the substitution flag column 200E of the apparatus administration table 200, and the process proceeds to step S17.

In step S17, the determining unit 21 transmits the information of the apparatus name "First floor west MFP", the substitution flag "1", and the substitute apparatus name "First floor east MFP" to the information setting unit 22. Afterward, the process proceeds to step 18 shown in FIG. 4(b) through a connection path (2).

In step S18, the information setting unit 22 sets the number M in the first function limitation information table 201a and the second function limitation information table 201b to "0" (M=0), and the process proceeds to step S19. In step S19, the information setting unit 22 adds "1" to the number M (M=1), and the process proceeds to step S20.

In step S20, the information setting unit 22 determines whether the user entry in the M-th row does exist in the first function limitation information table 201a or the second function limitation information table 201b. When the information setting unit 22 determines that the user entry exists (Y in step S20), the process proceeds to step S21. When the determining unit 21 determines that the user entry does not exist (N in step S20), the process returns to step S2 shown in FIG. 4(a) through the connection path (1). Accordingly, the process from step S2 to step S20 is repeated until the user entry in the M-th row does exist in the first function limitation information table 201a or the second function limitation information table 201b corresponding to the apparatus name. When the information setting unit 22 determines that the user entry exists (Y in step S20), the process proceeds to step S21.

In step S21, the information setting unit 22 determines whether the substitution flag is "1". When the information setting unit 22 determines that the substitution flag is "1" (Y in step S21), the process proceeds to step S22. When the information setting unit 22 determines that the substitution flag is not "1" (N in step S21), the process proceeds to step S27. In step S22, from the user entry at the first row of the second function limitation information table 201b corresponding to the apparatus name, the information setting unit 22 retrieves "User3" in the user name column 201A, "0" in the printing permission flag column 201B, "1" in the facsimile transmission permission flag column 201C, "0" in the scanning permission flag column 201D, and "User3@aaa.bbb" in the mail address column 201F. Afterward, the process proceeds to step S23.

In step S23, the information setting unit 22 determines whether the user name does exist in the second function limitation information table 201b corresponding to the substitute apparatus name. When the information setting unit 22 determines that the user name does not exist (N in step S23), the process proceeds to step S26. When the information setting unit 22 determines that the user name exists (Y in step S23), the process proceeds to step S24. In this case, the user name "User3" does not exist in the first function limitation information table 201a corresponding to the substitute apparatus name "First floor east MFP", so that the process proceeds to step S26.

In step S24, the information setting unit 22 determines whether the substitution number of the user thus identified is "0". When the information setting unit 22 determines that the substitution number of the user thus identified is "0" (Y in step S24), the process returns to step S19. Accordingly, the process from step S19 to step S24 is repeated until the substitution number of the user thus identified is not "0" (N in step S24). When the determining unit 21 determines that the substitution number of the user thus identified is not "0" (N in step S24), the process proceeds to step S25. In step S25, the information setting unit 22 adds "1" to the substitution number column 201E of the first function limitation information table 201a or the second function limitation information table 201b, and the process returns to step S19.

In step S26, from the first function limitation information table 201a or the second function limitation information table 201b corresponding to the apparatus name, the information setting unit 22 retrieves "User3" in the user name column 201A, "0" in the printing permission flag column 201B, "1" in the facsimile transmission permission flag column 201C, "0" in the scanning permission flag column 201D, "1" in the substitution number column 201E, and "User3@aaa.bbb" in the mail address column 201F. Afterward, the information setting unit 22 stores them into the first function limitation information table 201a or the second function limitation information table 201b corresponding to the substitute apparatus name, and the process proceeds to step S30.

When the determining unit 21 determines that the substitution flag is not "1" (N in step S21), the process proceeds to step S27. In step S27, the information setting unit 22 retrieves the user name and the mail address in the M-th row of the first function limitation information table 201a or the second function limitation information table 201b corresponding to the apparatus name, and the process proceeds to step S28.

In step S28, the information setting unit 22 determines whether the user name does exist in the first function limitation information table 201a or the second function limitation information table 201b corresponding to the substitute apparatus name, and the substitution number of the user name is "1". When the information setting unit 22 determines that the user name exists, and the substitution number of the user name is "1" (Y in step S28), the process proceeds to step S29. When the determining unit 21 determines that the user name does not exist (N in step S28), or the substitution number of the user name is not "1", the process proceeds to step S34. In step S29, the information setting unit 22 deletes the user name thus identified, and the process proceeds to step S30.

In step S30, the information setting unit 22 transmits the apparatus name "First floor west MFP", the substitution flag "1", the substitute apparatus name "First floor east MFP", the user name "User3", and the mail address "User3@aaa.bbb" to the notification unit 23. Then, the process proceeds to step S31.

In step S31, the notification unit 23 retrieves the address "192.168.0.1" in the row where the substitute apparatus name "First floor east MFP" matches the apparatus name column 200A of the apparatus administration table 200, and the process proceeds to step S32. In step S32, the notification unit 23 determines whether the substitution flag is "1". When the notification unit 23 determines that the substitution flag is "1" (Y in step S32), the process proceeds to step S33. When the notification unit 23 determines that the substitution flag is not "1" (N in step S32), the process proceeds to step S36.

In step S33, the notification unit 23 transmits the mail to the mail address "User3@aaa.bbb", and the process returns to step S19. The mail indicates that the apparatus name "First floor west MFP" is not in the usable state, and the substitute apparatus name "First floor east MFP" is used. Further, the substitution flag "1", the substitute apparatus name "First floor east MFP", and the address of the substitute apparatus "192.168.0.1" are added to the path "¥¥Server¥Drv¥Installer.exe" of the hard disk 202.

In step S34, the information setting unit 22 determines whether the substitution number of the user thus identified is greater than "2". When the information setting unit 22 determines that the substitution number of the user thus identified is greater than "2" (Y in step S34), the process proceeds to step S35. When the determining unit 21 determines that the substitution number of the user thus identified is less than "2" (N in step S34), the process returns to step S19. In step S35, the information setting unit 22 subtracts "1" from the substitution number, and the process returns to S19.

In step S36, the notification unit 23 retrieves the address of the entry having the apparatus name matching to the apparatus name in the apparatus administration table 200, and the process proceeds to step S37. In step S37, the notification unit 23 transmits the mail to the mail address, and the process returns to step S19. The mail indicates that the apparatus name becomes the usable state. Further, the substitution flag, the substitute apparatus name, and the address of the current apparatus are added to the path of the hard disk 202.

In step S19, the information setting unit 22 adds "1" to the number M (M=2), and the process proceeds to step S20.

In step S20, the information setting unit 22 determines that the user entry at the second row exists in the second function limitation information table 201b corresponding to the apparatus name "First floor west MFP" (Y in step S20), and the process proceeds to step S21. In step S21, the information setting unit 22 determines that the substitution flag is "1" (Y in step S21), and the process proceeds to step S22. In step S22, from the user entry at the second row of the second function limitation information table 201b, the information setting unit 22 retrieves "User4" in the user name column 201A, "0" in the printing permission flag column 201B, "0" in the facsimile transmission permission flag column 201C, "0" in the scanning permission flag column 201D, and "User4@aaa.bbb" in the mail address column 201F. Afterward, the process proceeds to step S23.

In step S23, the information setting unit 22 determines that the user name "User4" exists in the first function limitation information table 201a corresponding to the substitute apparatus name "First floor east NFP" (Y in step S23), the process proceeds to step S24. In step S24, the information setting unit 22 determines that the substitution number is "0" (Y in step S24), and the process returns to step S19. In step S19, the information setting unit 22 adds "1" to the number M (M=3), and the process proceeds to step S20.

In step S20, the information setting unit 22 determines that the user entry at the third row does not exist in the second function limitation information table 201b corresponding to the apparatus name "First floor west MFP" (N in step S20), and the process returns to step S2 through the connection path (1). In step S2, the determining unit 21 adds "1" to the number N (N=3), and the process proceeds to step S3. In step S3, the determining unit 21 determines that the apparatus entry does not exist at the third row of the apparatus administration table 200 (N in step S3), and the process is completed.

Figure 5:
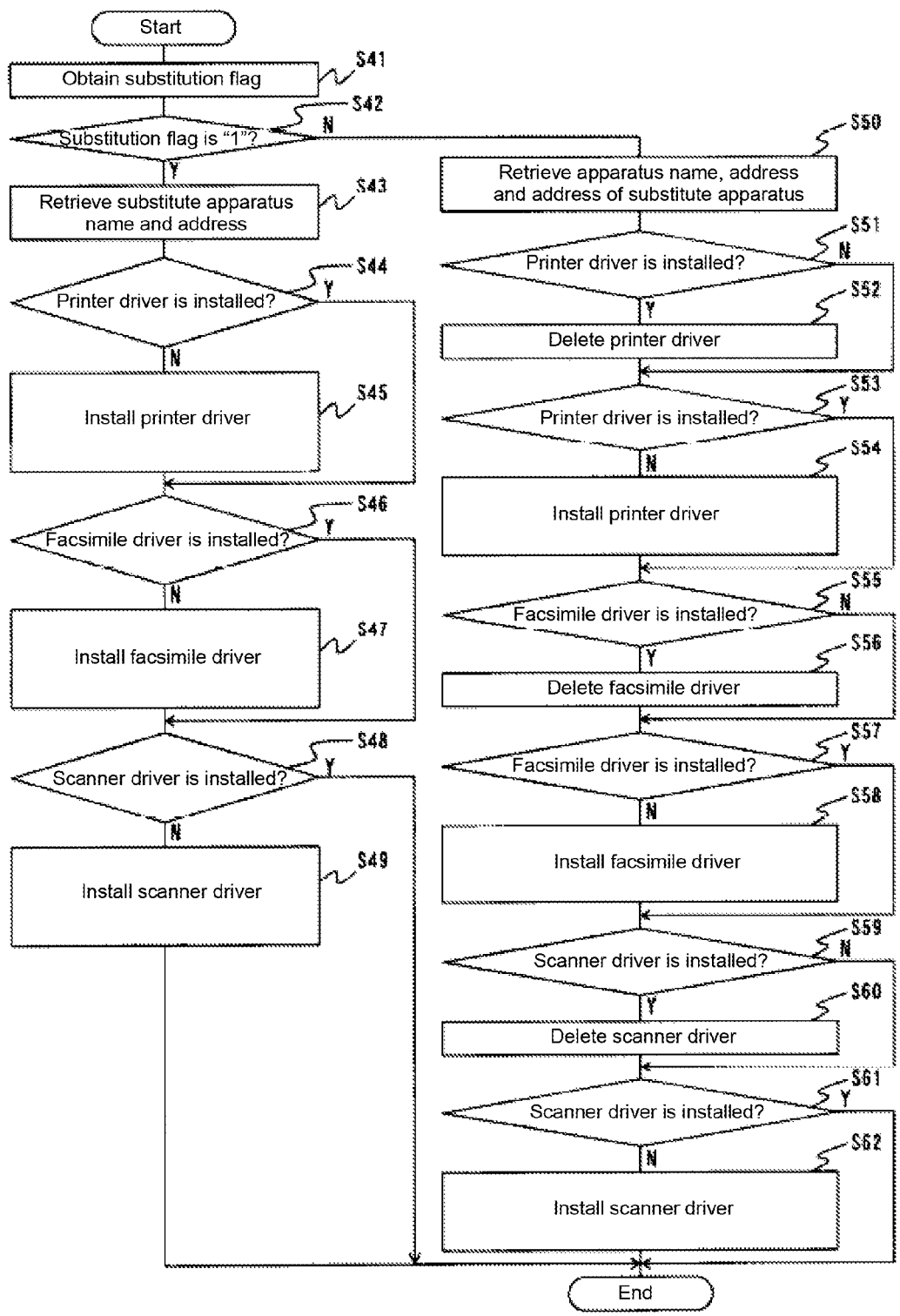
FIG. 5 is a flowchart showing the operation of the image forming system in a process of installing and deleting a driver of a substitute apparatus when a path of a transmitted mail in a client device of the image forming system is executed according to the first embodiment of the present invention.

FIG. 5 is a flowchart showing the operation of the image forming system in a process of installing and deleting the driver of the substitute apparatus when the path of the transmitted mail in the client device 4a of the image forming system is executed according to the first embodiment of the present invention.

In the process from step S41 to step S49 shown in the flowchart in FIG. 5, the installer 40 installs the driver of the substitute apparatus when the substitute apparatus becomes necessary. More specifically, when the multifunction device 3b becomes the unusable state due to malfunction, the user "User3" uses the client device 4b to execute the path referring to the transmitted mail of the notification unit 23. The process will be explained in more detail with reference to FIG. 1 along with the flowchart shown in FIG. 5.

When the path of the transmitted mail is executed, the process starts and proceeds to step S41. In step S41, the hard disk 202 of the server 2 is retrieved on the client device 4b, so that the installer 40 is started. Accordingly, the installer 40 retrieves the substitution flag "1" in the path, and the process proceeds to step S42. In step S42, the installer 40 determines whether the substitution flag is "1". When the installer 40 determines that the substitution flag is "1" (Y in step S42), the process proceeds to step S43. When the installer 40 determines that the substitution flag is not "1" (N in step S42), the process proceeds to step S50.

In step S43, the installer 40 retrieves the substitute apparatus name "First floor east MFP" and the address of the substitute apparatus "192.168.0.1". Afterward, the process proceeds to step S44. In step S44, the installer 40 determines whether the printer driver having the connection destination matching to the address of the substitute apparatus is installed. In this case, the installer 40 determines that the printer driver having the connection destination matching to the address of the substitute apparatus "192.168.0.1" is not installed (N in step S44), and the process proceeds to step S45.

In step S45, the installer 40 installs the hard disk 203 of the server 2 with the name that the printer driver name is added to the substitute apparatus name, and the connection destination as the address of the substitute apparatus. Accordingly, the substitute apparatus name becomes "First floor east MFP Model1Prn", and the connection destination is "192,168.0.1". Afterward, the process proceeds to step S46.

In step S46, the installer 40 determines whether the facsimile driver having the connection destination matching to the address of the substitute apparatus is installed. In this case, the facsimile driver having the connection destination is "192,168.0.1" is not installed. Accordingly, the installer 40 determines that the facsimile driver having the connection destination matching to the address of the substitute apparatus is not installed (N in step S46), and the process proceeds to step S47.

In step S47, the installer 40 installs the hard disk 204 of the server 2 with the name that the facsimile driver name is added to the substitute apparatus name, and the connection destination as the address of the substitute apparatus. Accordingly, the substitute apparatus name becomes "First floor east MFP Model1Fax", and the connection destination is "192,168.0.1". Afterward, the process proceeds to step S48.

In step S48, the installer 40 determines whether the scanner driver having the connection destination matching to the address of the substitute apparatus is installed. In this case, the scanner driver having the connection destination is "192,168.0.1" is not installed. Accordingly, the installer 40 determines that the scanner driver having the connection destination matching to the address of the substitute apparatus is not installed (N in step S48), and the process proceeds to step S49.

In step S49, the installer 40 installs the hard disk 205 of the server 2 with the name that the scanner driver name is added to the substitute apparatus name, and the connection destination as the address of the substitute apparatus. Accordingly, the substitute apparatus name becomes "First floor east MFP Model1Scn", and the connection destination is "192,168.0.1". Afterward, the process is completed. Through the process described above, the printer driver 41a, the facsimile driver 42a, and the scanner driver 43a become the usable state in the client device 4b.

FIG. 6(a) is a flowchart No. 1 showing the operation of the image forming system in a process when a job request is transmitted in the multifunction device 3a and the multifunction device 3b of the image forming system according to the first embodiment of the present invention.

In the process from step S71 to step S81 in the flowchart shown in FIG. 6(a), when the multifunction device 3a or the multifunction device 3b receives the print data from the client device 4a or the client device 4b, the multifunction device 3a or the multifunction device 3b retrieves the second function limitation information table 201b of the user who requests the printing operation from the server 2. When the printing operation is allowed, the multifunction device 3a or the multifunction device 3b performs the printing operation.

First, the process will be explained when the user "User3" on the client device 4b requests the multifunction device 3a to perform the printing operation after the driver of the multifunction device 3a is installed with reference to FIGS. 1 and 3 along with the flowchart shown in FIG. 6(a).

When the user "User3" uses the client device 4b to request the multifunction device 3a to perform the printing operation through an application (not shown), the process starts and proceeds to step S71. In step S71, the restricting unit 30 of the multifunction device 3a receives the job request transmitted from the client device 4b, and the process proceeds to step S72. In step S72, the restricting unit 30 determines whether the restricting unit 30 receives the print data. In this case, the restricting unit 30 determines that the restricting unit 30 receives the print data (Y in step S72), and the process proceeds to step S73. In step S73, the restricting unit 30 inquires the server 2 of the second function limitation information table 201b of the user "User3", and the process proceeds to step S74.

In step S74, the information obtaining unit 24 of the server 2 retrieves the second function limitation information table 201b of the user "User3" from the first function limitation information table 201a of the multifunction device 3a to which the inquiry is referred, and the process proceeds to step S75. In step S75, the information obtaining unit 24 determines whether the user does exist. In this case, the information obtaining unit 24 determines that the user "User3" does not exist (N in step S75), and the process proceeds to step S76.

In step S76, the information obtaining unit 24 returns the printing permission flag "1" to the multifunction device 3a to which the inquiry is referred, and the process proceeds to step S78. In step S78, the restricting unit 30 of the multifunction device 3a receives the printing permission flag "1", and the process proceeds to step S79. In step S79, the restricting unit 30 determines whether the printing permission flag is "0". In this case, the restricting unit 30 determines that the printing permission flag is not "0" (N in step S79), and the process is completed without transmitting the print data to the printing unit 31.

Instead of the user "User3", when the user "User2" requests the multifunction device 3a to perform the printing operation, the multifunction device 3a inquires the server 2 of the second function limitation information table 201b of the user "User2" in step S73. In step S77, the information obtaining unit 24 returns the printing permission flag "0" to the multifunction device 3a to which the inquiry is referred, and the process proceeds to step S80 through step S79. In step S80, the information obtaining unit 24 of the server 2 transmits the print data to the printing unit 31, and the process proceeds to step S81. In step S81, the printing unit 31 performs the printing operation of the print data thus received, and the process is completed.

Next, the process will be explained when the user "User1", who is using the multifunction device 3a as the substitute apparatus through the client device 4a, requests the multifunction device 3a to perform the printing operation in a case that the multifunction device 3b becomes the unusable state due to malfunction and the multifunction device 3a is used as the substitute apparatus with reference to FIGS. 1 and 3 along with the flowchart shown in FIG. 6(a).

When the user "User1" uses the client device 4a to request the multifunction device 3a to perform the printing operation through an application (not shown), the process starts and proceeds to step S71. In step S71, the restricting unit 30 of the multifunction device 3a receives the job request transmitted from the client device 4a, and the process proceeds to step S72. In step S72, the restricting unit 30 determines that the restricting unit 30 receives the print data (Y in step S72), and the process proceeds to step S73. In step S73, the restricting unit 30 inquires the server 2 of the second function limitation information table 201b of the user "User1", and the process proceeds to step S74.

In step S74, the information obtaining unit 24 of the server 2 retrieves the second function limitation information table 201b of the user "User1" from the first function limitation information table 201a of the multifunction device 3a to which the inquiry is referred, and the process proceeds to step S75. In step S75, the information obtaining unit 24 determines that the user "User1" does exist (Y in step S75), and the process proceeds to step S77. In step S77, the information obtaining unit 24 returns the printing permission flag "0" to the multifunction device 3a to which the inquiry is referred, and the process proceeds to step S78. In step S78, the restricting unit 30 of the multifunction device 3a receives the printing permission flag "0", and the process proceeds to step S79. In step S79, the restricting unit 30 determines that the printing permission flag is "0" (Y in step S79), and the process proceeds to step S80. In step S80, the information obtaining unit 24 of the server 2 transmits the print data to the printing unit 31, and the process proceeds to step S81. In step S81, the printing unit 31 performs the printing operation of the print data thus received, and the process is completed.

Next, the operation of the image forming system when the multifunction device 3b becomes the usable state will be explained. First, the operation of the server 2 after the inquiry interval of the server 2 is elapsed after the multifunction device 3b is restored and becomes the usable state will be explained with reference to FIGS. 1 to 3 along with the flowcharts shown in FIGS. 4(a) and 4(b).

As shown in the flowchart shown in FIG. 4(a), when the operation starts, the process proceeds to step S1. In step S1, the determining unit 21 set the number N in the apparatus administration table 200 to zero (N=0), and the process proceeds to step S2. In step S2, the determining unit 21 adds "1" to the number N (N=1), and the process proceeds to step S3. In step S3, the determining unit 21 determines that the apparatus exists at the first row in the apparatus administration table 200 (Y in step S3), and the process proceeds to step S4.

In step S4, from the apparatus entry at the first row of the apparatus administration table 200, the determining unit 21 retrieves the apparatus name "First floor east MFP", the address "192.168.0.1", the substitution flag "0", and the substitute apparatus name "First floor west MFP". Then, the process proceeds to step S5. In step S5, the determining unit 21 obtains the status of the usable state "0" from the apparatus with the address "192.168.0.1", and the process proceeds to step S6. In step S6, the determining unit 21 determines that the apparatus can be connected (Y in step S6), and the process proceeds to step S7. In step S7, the determining unit 21 stores "0" in the first row of the non-connection time column 200D of the apparatus administration table 200, and the process proceeds to step S8. In step S8, the determining unit 21 determines that the apparatus is in the usable state (Y in step S8), the process proceeds to step S14.

In step S14, the determining unit 21 stores "0" in the status column 200C of the apparatus administration table 200, and the process proceeds to step S15. In step S15, the determining unit 21 determines whether the substitution flag is "1". When the determining unit 21 determines that the substitution flag is "1" (Y in step S15), the process proceeds to step S16. When the determining unit 21 determines that the substitution flag is "0" (N in step S15), the process returns to step S2.

When the determining unit 21 determines that the substitution flag is "0" (N in step S15), the process returns to step S2. In step S2, the determining unit 21 adds "1" to the number N (N=2), and the process proceeds to step S3. In step S3, the determining unit 21 determines that the apparatus exists at the second row of the apparatus administration table 200 (Y in step S3), and the process proceeds to step S4. In step S4, the determining unit 21 retrieves the apparatus name "First floor west MFP", the address "192.168.0.2", the substitution flag "1", and the substitute apparatus name "First floor east MFP". Then, the process proceeds to step S5.

In step S5, the determining unit 21 obtains the status of the usable state "0" of the address "192.168.0.2", and the process proceeds to step S6. In step S6, the determining unit 21 determines that the apparatus can be connected (Y in step S6), and the process proceeds to step S7. In step S7, the determining unit 21 stores "0" in the non-connection time column 200D of the apparatus administration table 200, and the process proceeds to step S8. In step S8, the determining unit 21 determines that the apparatus is in the usable state (Y in step S8), and the process proceeds to step S14.

In step S14, the determining unit 21 stores "0" in the status column 200C of the apparatus administration table 200, and the process proceeds to step S15. In step S15, the determining unit 21 determines that the substitution flag is "1" (Y in step S15), and the process proceeds to step S16. In step S16, the determining unit 21 determines that the substitute apparatus is not necessary and stores "0" in the substitution flag column 200E of the apparatus administration table 200, and the process proceeds to step S17.

In step S17, the determining unit 21 transmits the apparatus name "First floor west MFP", the substitution flag "0", and the substitute apparatus name "First floor east MFP" to the information setting unit 22. Afterward, the process proceeds to step 18. In step S18, the information setting unit 22 sets the number M in the first function limitation information table 201a and the second function limitation information table 201b to "0" (M=0), and the process proceeds to step S19. In step S19, the information setting unit 22 adds "1" to the number M (M=1), and the process proceeds to step S20. In step S20, the information setting unit 22 determines that the user entry exists at the first row of the second function limitation information table 201*b* corresponding to the apparatus name "First floor west MFP" (Y in step S20), the process proceeds to step S21. In step S21, the information setting unit 22 determines that the substitution flag is not "1" (N in step S21), the process proceeds to step S27.

In step S27, from the user entry at the first row of the second function limitation information table 201*b* corresponding to the apparatus name "First floor west MFP", the information setting unit 22 retrieves the user name "User3" and the mail address "User3@aaa.bbb", and the process proceeds to step S28. In step S28, the information setting unit 22 determines that the user name "User3" does exist in the first function limitation information table 201*a* corresponding to the substitute apparatus name "First floor east MFP", and the process proceeds to step S29. In step S29, the information setting unit 22 deletes the user name "User3", and the process proceeds to step S30.

In step S30, the information setting unit 22 transmits the apparatus name "First floor west MFP", the substitution flag "0", the substitute apparatus name "First floor east MFP", the user name "User3", and the mail address "User3@aaa.bbb" to the notification unit 23. Then, the process proceeds to step S31.

In step S31, the notification unit 23 retrieves the address "192.168.0.1" in the row where the substitute apparatus name "First floor east MFP" matches the apparatus name column 200A of the apparatus administration table 200, and the process proceeds to step S32. In step S32, the notification unit 23 determines that the substitution flag is not "1" (N in step S32), the process proceeds to step S36.

In step S36, the notification unit 23 retrieves the address "192.168.0.1" of the entry having the apparatus name "First floor west MFP" matching to the apparatus name column 200A of the apparatus administration table 200, and the process proceeds to step S37.

In step S37, the notification unit 23 transmits the mail to the mail address "User3@aaa.bbb", and the process returns to step S19. The mail indicates that the apparatus name "First floor west MFP" becomes the usable state and the apparatus name "First floor east MFP" is used. Further, the substitution flag "0", the apparatus name of the current apparatus "First floor west MFP", the address of the current apparatus "192.168.0.2", and the address of the substitute apparatus "192.168.0.1" are added to the path "¥¥Server¥Drv¥Installer.exe" of the hard disk 202.

In step S19, the information setting unit 22 adds "1" to the number M (M=2), and the process proceeds to step S20.

In step S20, the information setting unit 22 determines that the user entry at the second row exists in the second function limitation information table 201*b* corresponding to the apparatus name "First floor west MFP" (Y in step S20), and the process proceeds to step S21. In step S21, the information setting unit 22 determines that the substitution flag is not "1" (N in step S21), and the process proceeds to step S27. In step S27, from the user entry at the second row of the second function limitation information table 201*b* corresponding to the apparatus name "First floor west MFP", the information setting unit 22 retrieves the user name "User4" and the mail address "User4@aaa.bbb". Afterward, the process proceeds to step S28.

In step S28, the information setting unit 22 determines that the user name "User4" does exist in the first function limitation information table 201*a* corresponding to the substitute apparatus name "First floor east MFP", and the substitution number of the user name is not "1" (N in step S28), and the process proceeds to step S34. In step S34, the information setting unit 22 determines whether the substitution number of the user thus identified is greater than "2". When the information setting unit 22 determines that the substitution number of the user thus identified is less than "2" (N in step S34), the process returns to step S19.

In step S19, the information setting unit 22 adds "1" to the number M (M=3), and the process proceeds to step S20. In step S20, the information setting unit 22 determines whether the user entry in the third row does not exist in the second function limitation information table 201*b* corresponding to the apparatus name "First floor west MFP" (N in step S20), and the process returns to step S2 through the connection path (1). In step S2, the determining unit 21 adds "1" to the number N (N=3), and the process proceeds to step S3. In step S3, the determining unit 21 determines that the apparatus does not exist at the third row of the apparatus administration table 200 (N in step S3), and the process is completed.

Next, the operation, in which the user "User3" executes the path with the client device 4*b* referring to the transmitted mail of the notification unit 23 when the multifunction device 3*b* is restored and becomes the usable state, will be explained with reference to FIGS. 1 to 3 along with the flowchart shown in FIG. 5.

As shown in the flowchart shown in FIG. 5, in the process from step S50 to step S62, the installer 40 deletes the driver of the substitute apparatus when the substitute apparatus becomes unnecessary.

When the path of the transmitted mail is double clicked, the hard disk 202 of the server 2 is retrieved on the client device 4*b*. Accordingly, the installer 40 is started, and the process starts and proceeds to step S41. In step S41, the installer 40 retrieves the substitution flag "0" in the path, and the process proceeds to step S42. In step S42, the installer 40 determines that the substitution flag is not "1" (N in step S42), the process proceeds to step S50.

In step S50, the installer 40 retrieves the apparatus name of the current apparatus "First floor west MFP", the address of the current apparatus "192.168.0.2", and the address of the substitute apparatus "192.168.0.1". Afterward, the process proceeds to step S51.

In step S51, the installer 40 determines whether the printer driver having the connection destination matching to the address of the substitute apparatus "192.168.0.1" is installed. In this case, the installer 40 determines that the printer driver having the connection destination matching to the address of the substitute apparatus "192.168.0.1" is installed (Y in step S51), and the process proceeds to step S52. In step S52, the installer 40 deletes the printer driver thus identified, and the process proceeds to step S53.

In step S53, the installer 40 determines whether the printer driver having the connection destination matching to the address of the current apparatus "192.168.0.2" is installed. In this case, the installer 40 determines that the printer driver having the connection destination matching to the address of the current apparatus "192.168.0.2" is installed (Y in step S53), and the process proceeds to step S55.

In step S55, the installer 40 determines whether the facsimile driver having the connection destination matching to the address of the substitute apparatus "192.168.0.1" is installed. In this case, the installer 40 determines that the facsimile driver having the connection destination matching to the address of the substitute apparatus "192.168.0.1" is installed (Y in step S55), and the process proceeds to step S56. In step S56, the installer 40 deletes the facsimile driver thus identified, and the process proceeds to step S57.

In step S57, the installer 40 determines whether the facsimile driver having the connection destination matching to the address of the current apparatus "192.168.0.2" is installed. In this case, the installer 40 determines that the facsimile driver having the connection destination matching to the address of the current apparatus "192.168.0.2" is installed (Y in step S57), and the process proceeds to step S59.

In step S59, the installer 40 determines whether the scanner driver having the connection destination matching to the address of the substitute apparatus "192.168.0.1" is installed. In this case, the installer 40 determines that the scanner driver having the connection destination matching to the address of the substitute apparatus "192.168.0.1" is installed (Y in step S59), and the process proceeds to step S60. In step S60, the installer 40 deletes the scanner driver thus identified, and the process proceeds to step S61.

In step S61, the installer 40 determines whether the scanner driver having the connection destination matching to the address of the current apparatus "192.168.0.2" is installed. In this case, the installer 40 determines that the scanner driver having the connection destination matching to the address of the current apparatus "192.168.0.2" is installed (Y in step S61), and the process is completed. Through the process from step S52, step S56, and step S60, the printer driver 41*a*, the facsimile driver 42*a*, and the scanner driver 43*a* are deleted and become the unusable state.

When the installer 40 determines that the printer driver having the connection destination matching to the address of the current apparatus "192.168.0.2" is not installed (N in step S53), and the process proceeds to step S54.

In step S54, the installer 40 installs the hard disk 203 of the server 2 with the name that the printer driver name is added to the apparatus name of the current apparatus, and the connection destination as the address of the current apparatus.

When the installer 40 determines that the facsimile driver having the connection destination matching to the address of the current apparatus "192.168.0.2" is not installed (N in step S57), and the process proceeds to step S58.

In step S58, the installer 40 installs the hard disk 204 of the server 2 with the name that the facsimile driver name is added to the apparatus name of the current apparatus, and the connection destination as the address of the current apparatus.

When the installer 40 determines that the scanner driver having the connection destination matching to the address of the current apparatus "192.168.0.2" is not installed (N in step S61), and the process proceeds to step S62.

In step S62, the installer 40 installs the hard disk 205 of the server 2 with the name that the scanner driver name is added to the apparatus name of the current apparatus, and the connection destination as the address of the current apparatus. Afterward, the process is completed.

Figure 6:
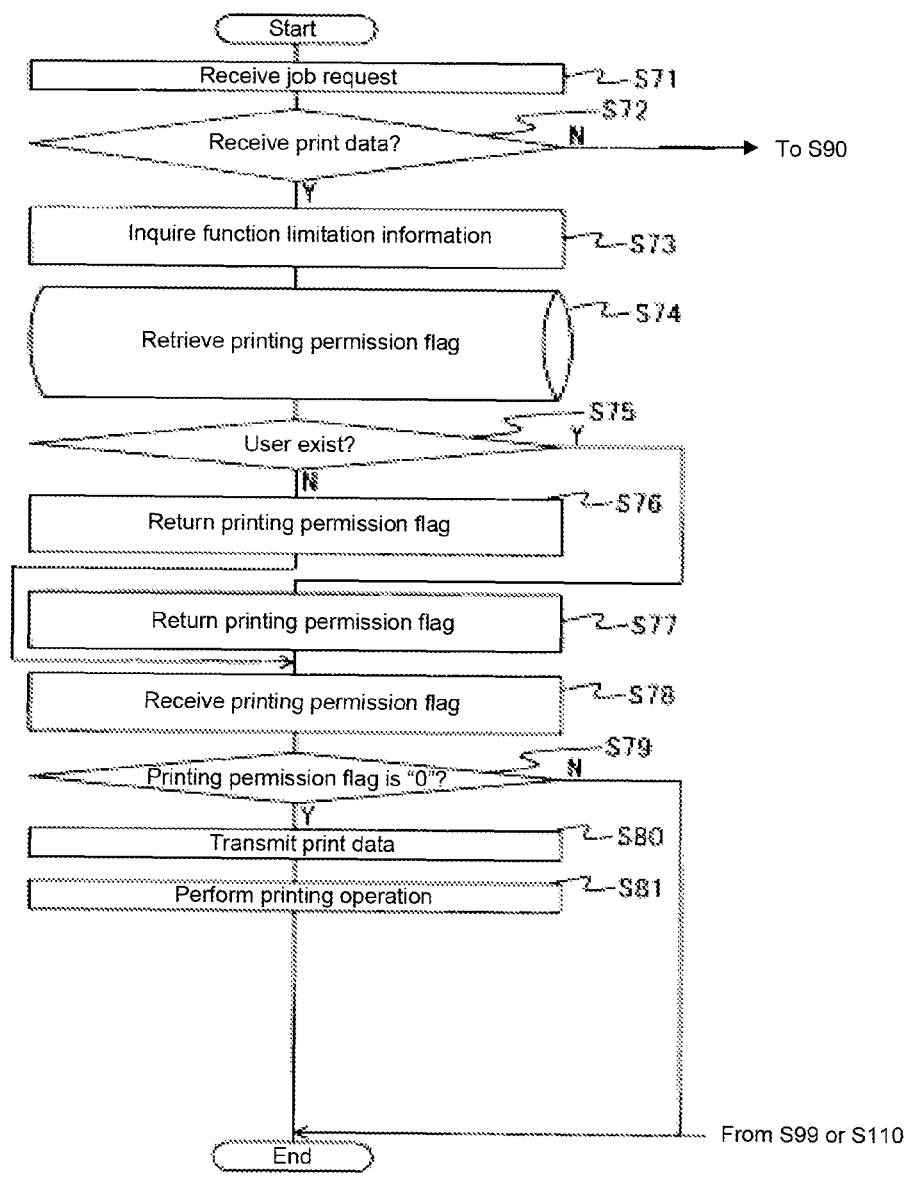
FIG. 6(a) is a flowchart No. 1 showing the operation of the image forming system in a process when a job request is transmitted in a multifunction device of the image forming system according to the first embodiment of the present invention.
FIG. 6(b) is a flowchart No. 2 showing the operation of the image forming system in a process when a job request is transmitted in a multifunction device of the image forming system according to the first embodiment of the present invention.
FIG. 6(c) is a flowchart No. 3 showing the operation of the image forming system in a process when a job request is transmitted in a multifunction device of the image forming system according to the first embodiment of the present invention.
Figure 6:
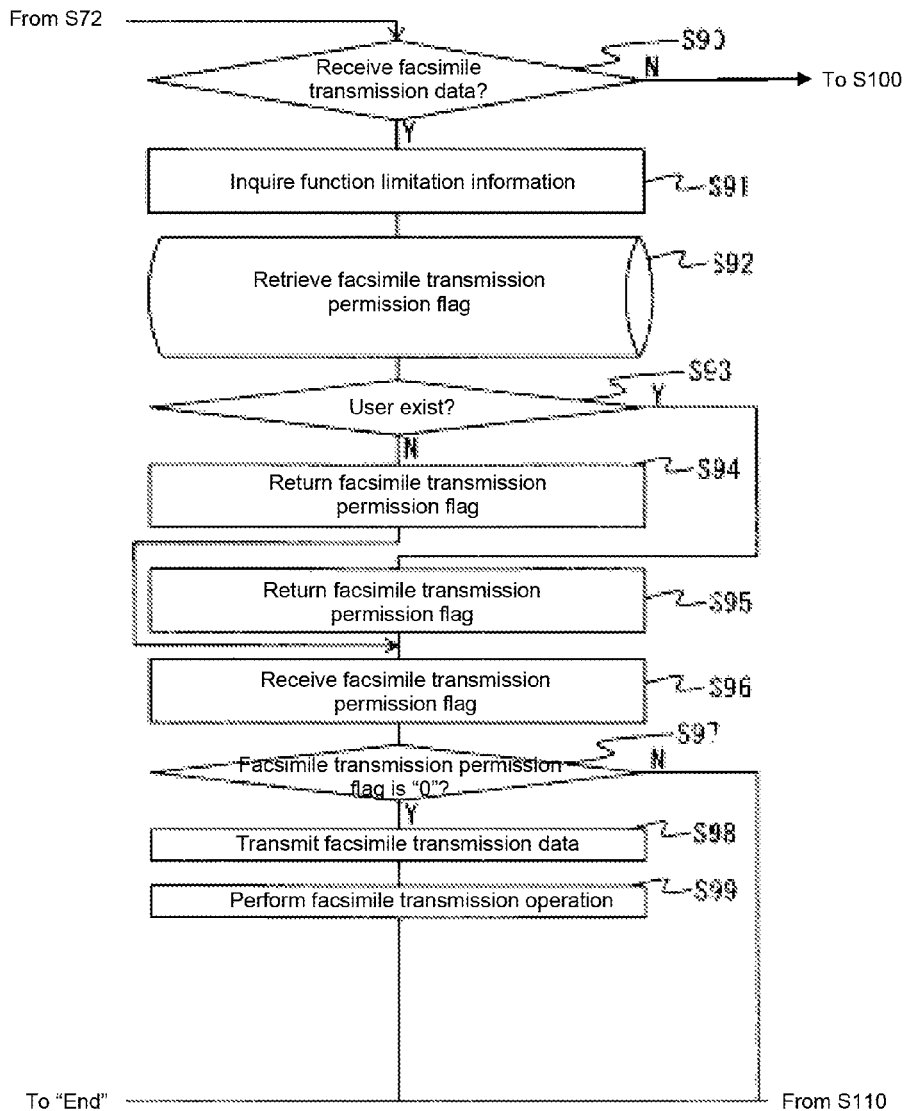
Figure 6:
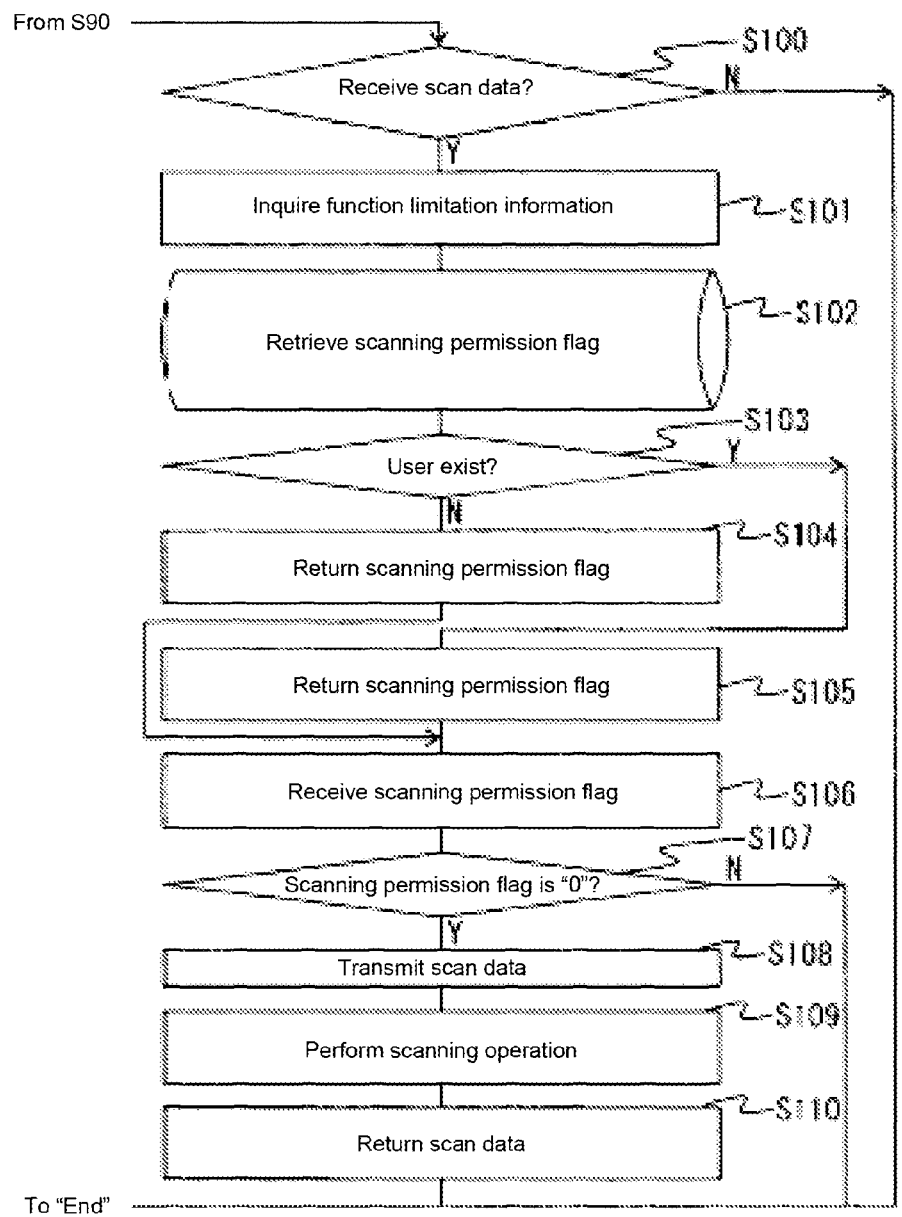

Next, the process from step S90 to step S99 in the flowchart shown in FIG. 6(*b*) will be explained with reference to FIGS. 1 to 3. FIG. 6(*b*) is a flowchart No. 2 showing the operation of the image forming system in a process when a job request is transmitted in the multifunction device 3*a* and the multifunction device 3*b* of the image forming system according to the first embodiment of the present invention.

In the process from step S90 to step S99, when the multifunction device 3*a* or the multifunction device 3*b* receives the facsimile data from the client device 4*a* or the client device 4*b*, the multifunction device 3*a* or the multifunction device 3*b* retrieves the facsimile transmission permission flag column 201C of the user who performs the facsimile transmission operation from the server 2. When the facsimile transmission operation is allowed, the multifunction device 3*a* or the multifunction device 3*b* performs the facsimile transmission operation.

When the user "User3" uses the client device 4*b* to request the multifunction device 3*a* to perform the facsimile transmission operation through an application (not shown), the process starts and proceeds to step S71. In step S71, the restricting unit 30 of the multifunction device 3*a* receives the job request transmitted from the client device 4*b*, and the process proceeds to step S72. In step S72, the restricting unit 30 determines whether the restricting unit 30 receives the print data. In this case, the restricting unit 30 determines that the restricting unit 30 does not receive the print data (N in step S72), and the process proceeds to step S90.

In step S90, the restricting unit 30 determines whether the restricting unit 30 receives the facsimile transmission data. In this case, the restricting unit 30 determines that the restricting unit 30 receives the facsimile transmission data (Y in step S90), and the process proceeds to step S91. In step S91, the restricting unit 30 inquires the server 2 of the second function limitation information table 201*b* of the user "User3", and the process proceeds to step S92.

In step S92, the information obtaining unit 24 of the server 2 retrieves the facsimile transmission permission flag column 201C of the user "User3" from the first function limitation information table 201*a* of the multifunction device 3*a* to which the inquiry is referred, and the process proceeds to step S93. In step S93, the information obtaining unit 24 determines whether the user does exist. In this case, the information obtaining unit 24 determines that the user "User3" does not exist (N in step S93), and the process proceeds to step S94.

In step S94, the information obtaining unit 24 returns the printing permission flag "1" to the multifunction device 3*a* to which the inquiry is referred, and the process proceeds to step S96. In step S96, the restricting unit 30 of the multifunction device 3*a* receives the facsimile transmission permission flag "1", and the process proceeds to step S97. In step S97, the restricting unit 30 determines whether the facsimile transmission permission flag is "0". In this case, the restricting unit 30 determines that the facsimile transmission permission flag is not "0" (N in step S97), and the process is completed without transmitting the facsimile transmission data to the facsimile unit 32.

When the user "User3" uses the client device 4*b* to perform the facsimile transmission to the multifunction device 3*b* through an application (not shown), the process proceeds to step S71. In step S71, the restricting unit 30 of the multifunction device 3*b* receives the job request transmitted from the client device 4*b*, and the process proceeds to step S72. In step S72, the restricting unit 30 determines that the restricting unit 30 does not receive the print data (N in step S72), and the process proceeds to step S90.

In step S90, the restricting unit 30 determines whether the restricting unit 30 receives the facsimile transmission data. In this case, the restricting unit 30 determines that the restricting unit 30 receives the facsimile transmission data (Y in step S90), and the process proceeds to step S91. In step S91, the restricting unit 30 inquires the server 2 of the second function limitation information table 201*b* of the user "User3", and the process proceeds to step S92.

In step S92, the information obtaining unit 24 of the server 2 retrieves the facsimile transmission permission flag column 201C of the user "User3" from the first function limitation information table 201*a* of the multifunction device 3*b* to which the inquiry is referred, and the process proceeds to step S93. In step S93, the information obtaining unit 24 determines whether the user does exist. In this case, the information obtaining unit 24 determines that the user "User3" does exist (Y in step S93), and the process proceeds to step S95.

In step S95, the information obtaining unit 24 returns the facsimile transmission permission flag "0" to the multifunction device 3b to which the inquiry is referred, and the process proceeds to step S96. In step S96, the restricting unit 30 of the multifunction device 3b receives the facsimile transmission permission flag "0", and the process proceeds to step S97. In step S97, the restricting unit 30 determines that the facsimile transmission permission flag is "0" (Y in step S97), and the process proceeds to step S98. In step S98, the information obtaining unit 24 of the server 2 transmits the facsimile transmission data to the facsimile unit 32, and the process proceeds to step S99. In step S99, the facsimile unit 32 performs the facsimile transmission operation of the facsimile transmission data thus received, and the process is completed.

Next, the process from step S100 to step S110 in the flowchart shown in FIG. 6(c) will be explained with reference to FIGS. 1 to 3. FIG. 6(c) is a flowchart No. 3 showing the operation of the image forming system in a process when a job request is transmitted in the multifunction device 3a and the multifunction device 3b of the image forming system according to the first embodiment of the present invention.

In the process from step S100 to step S110, when the multifunction device 3a or the multifunction device 3b receives the scanning request from the client device 4a or the client device 4b, the multifunction device 3a or the multifunction device 3b retrieves the scanning permission flag column 201D of the user who transmits the scanning request from the server 2. When the scanning operation is allowed, the multifunction device 3a or the multifunction device 3b performs the scanning operation and returns the scanning data to the client device 4a or the client device 4b.

When the multifunction device 3a receives the scanning request from the user "User3" who uses the client device 4b to transmit the scanning request through an application (not shown), the process starts and proceeds to step S71. In step S71, the restricting unit 30 of the multifunction device 3a receives the job request transmitted from the client device 4b, and the process proceeds to step S72. In step S72, the restricting unit 30 determines whether the restricting unit 30 receives the print data. In this case, the restricting unit 30 determines that the restricting unit 30 does not receive the print data (N in step S72), and the process proceeds to step S90.

In step S90, the restricting unit 30 determines whether the restricting unit 30 receives the facsimile transmission data. In this case, the restricting unit 30 determines that the restricting unit 30 does not receive the facsimile transmission data (N in step S90), and the process proceeds to step S100.

In step S100, the restricting unit 30 determines whether the restricting unit 30 receives the scanning request. In this case, the restricting unit 30 determines that the restricting unit 30 receives the scanning request (Y in step S100), and the process proceeds to step S101. In step S101, the restricting unit 30 inquires the server 2 of the second function limitation information table 201b of the user "User3", and the process proceeds to step S102. In step S102, the information obtaining unit 24 of the server 2 retrieves the scanning permission flag column 201D of the user "User3" from the first function limitation information table 201a of the multifunction device 3a to which the inquiry is referred, and the process proceeds to step S103.

In step S103, the information obtaining unit 24 determines whether the user does exist. In this case, the information obtaining unit 24 determines that the user "User3" does not exist (N in step S93), and the process proceeds to step S104. In step S104, the information obtaining unit 24 returns the scanning permission flag "1" to the multifunction device 3a to which the inquiry is referred, and the process proceeds to step S106. In step S106, the restricting unit 30 of the multifunction device 3a receives the scanning permission flag "1", and the process proceeds to step S107. In step S107, the restricting unit 30 determines whether the scanning permission flag is "0". In this case, the restricting unit 30 determines that the scanning permission flag is not "0" (N in step S107), and the process is completed.

When the information obtaining unit 24 determines that the user does exist (Y in step S103), the process proceeds to step S105. In step S105, the information obtaining unit 24 returns the scanning permission flag "0" to the multifunction device 3b to which the inquiry is referred, and the process proceeds to step S106. In step S106, the restricting unit 30 of the multifunction device 3b receives the scanning permission flag "0", and the process proceeds to step S107. In step S107, the restricting unit 30 determines that the scanning permission flag is "0" (Y in step S97), and the process proceeds to step S108.

In step S108, the information obtaining unit 24 of the server 2 transmits the scanning request to the scanner unit 33, and the process proceeds to step S109. In step S109, the scanner unit 33 performs the scanning operation according to the scanning request thus received, and the process proceeds to step S110. In step S110, the restricting unit 30 of the multifunction device 3a returns the scanning data to the client device 4b, and the process completed.

As described above, in the first embodiment, the image forming system includes the multifunction device 3a as the first image forming apparatus; the multifunction device 3b as the second image forming apparatus; and the server 2 as the administration apparatus. The server 2 is configured to store the setting information of the users of the multifunction device 3a and the multifunction device 3b, so that the server 2 controls the multifunction device 3a and the multifunction device 3b according to the setting information thus stored.

Further, the server 2 includes the determining unit 21 for determining whether the substitute apparatus of the multifunction device 3a is necessary; and the information setting unit 22 for obtaining the first setting information of the user relative to the multifunction device 3a according to the determining result of the determining unit 21. Further, the information setting unit 22 is configured to add the first setting information to the second setting information of the user of the multifunction device 3b. Accordingly, when the multifunction device 3a or the multifunction device 3b becomes the unusable state, the setting information of the user is automatically added to the substitute apparatus of the multifunction device 3a or the multifunction device 3b. As a result, the user, who uses the substitute apparatus, is capable of using the substitute apparatus without any additional operation as well as the user who uses the multifunction device 3a or the multifunction device 3b that becomes the unusable state.

Second Embodiment

Figure 7:
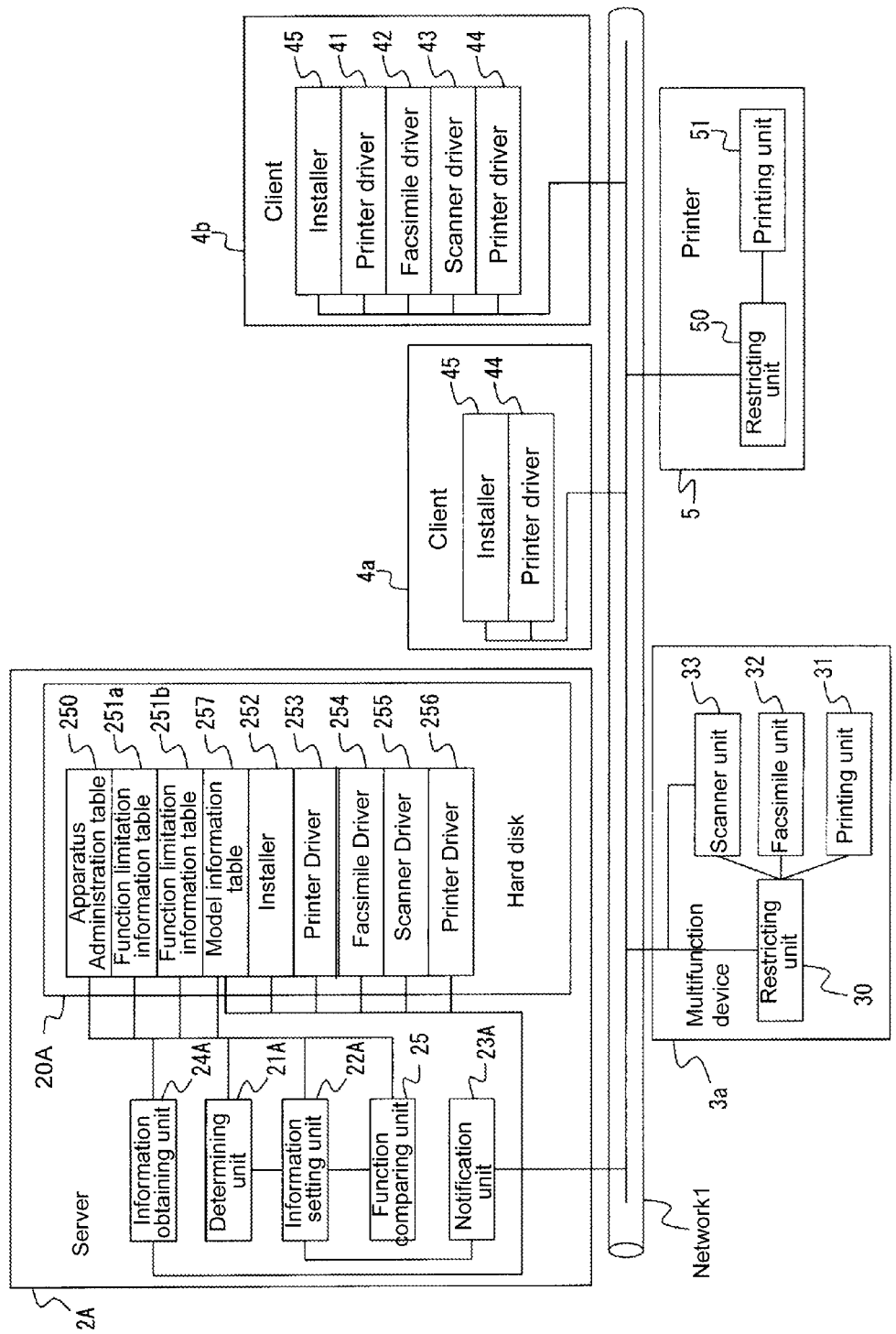
FIG. 7 is a block diagram showing a configuration of an image forming system according to a second embodiment of the present invention.

A second embodiment of the present invention will be explained next. FIG. 7 is a block diagram showing a configuration of an image forming system according to the second embodiment of the present invention. Components shown in FIG. 7 and similar to those in the first embodiment shown in FIG. 1 are designated with the same reference numerals.

As shown in FIG. 7, the image forming system includes a server 2A having a configuration and functions different from those of the server 2 in the first embodiment; the multifunction device 3a similar to that in the first embodiment; the client device 4a similar to that in the first embodiment; the client device 4b similar to that in the first embodiment; and a printer 5 as an additional image forming apparatus having only the printing function, all of which are connected through the network 1 to be able to communicate with each other in bilateral directions.

In the first embodiment, the multifunction device 3a and the multifunction device 3b having the same functions are connected to the network 1. On the other hand, in the second embodiment, the multifunction device 3a and the printer 5 having the different functions are connected to the network 1.

In the second embodiment, the server 2A is configured to administer function limitation information of users of the multifunction device 3a and the printer 5. More specifically, the server 2 includes a hard disk 20A; a determining unit 21A; an information setting unit 22A; a notification unit 23A; an information obtaining unit 24A; and a function comparing unit 25 as an additional unit. The hard disk 20A; the determining unit 21A; the information setting unit 22A; the notification unit 23A; and the information obtaining unit 24A have different configurations and functions from those in the first embodiment. It should be noted that the server 2A has a name "Server".

In the first embodiment, the hard disk 20A is formed of a non-volatile storage device, and is configured to store an apparatus administration table 250; a first function limitation information table 251a; a second function limitation information table 251b; an installer 252; a printer driver 253; a facsimile driver 254; a scanner driver 255; a printer driver 256; and a model information table 257.

FIG. 8 is a schematic view showing an example of the apparatus administration table 250 of the image forming system according to the second embodiment of the present invention.

As shown in FIG. 8, the apparatus administration table 250 stores information of the multifunction device 3a and the printer 5. More specifically, the apparatus administration table 250 includes an apparatus name column 250A; a model name column 250B; an address column 250C; a status column 250D; a non-connection time column 250E; a substitution flag column 250F; and a substitute apparatus name column 250G. It should be noted that, in the second embodiment, the model name column 250B is added to the apparatus administration table 200 in the first embodiment shown in FIG. 2.

In the second embodiment, names arbitrarily assigned to the apparatus are stored in the apparatus name column 250A. Model names of the apparatus are stored in the model name column 250B. Addresses as locations of the apparatus on the network are stored in the address column 250C. A status of the apparatus is stored in the status column 250D. When the apparatus is in the usable state, "0" is assigned to the status. When the apparatus is in the unusable state, "1" is assigned to the status. When the apparatus cannot be connected due to power off and the like, "2" is assigned to the status. A period of time during which the apparatus is in the unconnected state is stored in the non-connection time column 250E. The substitution flag is stored in the substitution flag column 250F. When the determining unit 21A determines that the substitute apparatus is not necessary, "0" is assigned to the substitution flag. When the determining unit 21A determines that the substitute apparatus is necessary, "1" is assigned to the substitution flag. A name of the substitute apparatus is stored in the substitute apparatus name column 250G when the determining unit 21A determines that the substitute apparatus is necessary.

FIGS. 9(*a*) and 9(*b*) are schematic views showing examples of the first function limitation information table 251a and the second function limitation information table 251b of the image forming system according to the second embodiment of the present invention. More specifically, FIG. 9(*a*) is a schematic view showing an example of the first function limitation information table 251a of the image forming system, and FIG. 9(*b*) is a schematic view showing an example of the second function limitation information table 251b of the image forming system.

In the second embodiment, each of the first function limitation information table 251a and the second function limitation information table 251b is disposed per each apparatus of the apparatus administration table 250, and is provided for storing information to restrict a function per user. More specifically, each of the first function limitation information table 251a and the second function limitation information table 251b includes a user name column 251A; a printing permission flag column 251B; a facsimile transmission permission flag column 251C; a scanning permission flag column 251D; a substitution number column 251E; and a mail address column 251F.

In the second embodiment, the user name whose function is restricted is stored in the user name column 251A. The printing permission flag is stored in the printing permission flag column 251B. When the printing operation is restricted relative to the user name stored in the user name column 251A, "1" is assigned to the printing permission flag. When the printing operation is not restricted relative to the user name stored in the user name column 251A, "0" is assigned to the printing permission flag. The facsimile transmission permission flag is stored in the facsimile transmission permission flag column 251C. When the facsimile transmission operation is restricted relative to the user name stored in the user name column 251A, "1" is assigned to the facsimile transmission permission flag. When the facsimile transmission operation is not restricted relative to the user name stored in the user name column 251A, "0" is assigned to the facsimile transmission permission flag. The scanning permission flag is stored in the scanning permission flag column 251D. When the scanning operation is restricted relative to the user name stored in the user name column 251A, "1" is assigned to the scanning permission flag. When the scanning operation is not restricted relative to the user name stored in the user name column 251A, "0" is assigned to the scanning permission flag.

In the second embodiment, the substitution number is stored in the substitution number column 251E. When the user is not added as the substitution apparatus, "0" is assigned to the substitution number. When the user is added as the substitution apparatus, "1" is assigned to the substitution number. When the user exists in a plurality of apparatus, the number of the apparatus is assigned to the substitution number. The mail address of the user is stored in the mail address column 251F. Further, it is supposed that the function restriction information of each of the multifunction device 3a and the printer 5 is stored in the first function limitation information table 251a and the second function limitation information table 251b.

FIG. 10 is a schematic view showing an example of the model information table 257 of the image forming system shown in FIG. 7 according to the second embodiment of the present invention.

In the second embodiment, the model information table 257 is additionally disposed, and stores information per model. More specifically, the model information table 257 includes a model name column 257A; a printing flag column 257B; a facsimile transmission flag column 257C; a scanning flag column 257D; a printer driver name column 257E; a facsimile driver name column 257F; a scanner driver name column 257G; a printer driver path column 257H; a facsimile driver path column 257I; and a scanner driver path column 257J.

In the second embodiment, a model name of the image forming apparatus is stored in the model name column 257A. A printing flag is stored in the printing flag column 257B. When the apparatus has the printing function, "0" is assigned to the printing flag. When the apparatus does not have the printing function, "1" is assigned to the printing flag. A facsimile transmission flag is stored in the facsimile transmission flag column 257C. When the apparatus has the facsimile transmission function, "0" is assigned to the facsimile transmission flag. When the apparatus does not have the facsimile transmission function, "1" is assigned to the facsimile transmission flag. A scanning flag is stored in the scanning flag column 257D. When the apparatus has the scanning function, "0" is assigned to the scanning flag. When the apparatus does not have the scanning function, "1" is assigned to the scanning flag.

In the second embodiment, the printer driver name is stored in the printer driver name column 257E. The facsimile driver name is stored in the facsimile driver name column 257F. The scanner driver name is stored in the facsimile driver name column 257F. The path where the printer driver for the model name in the model name column 257A is stored is stored in the printer driver path column 257H. The path where the facsimile driver for the model name in the model name column 257A is stored is stored in the facsimile driver path column 257I. The path where the scanner driver for the model name in the model name column 257A is stored is stored in the scanner driver path column 257J.

In the second embodiment, an installer is stored in the installer 252 shown in FIG. 7. The installer is a program for installing the printer driver 253, the facsimile driver 254, and the scanner driver 255 as a control program for controlling the multifunction device 3a, and for installing the printer driver 256 as a control program for controlling the printer 5 to the client device 4a or the client device 4b. It should be noted that a path to the installer 252 is represented as "¥¥Server¥Drv¥Installer.exe".

In the second embodiment, the printer driver 253 is a program for the client device 4a or the client device 4b to instruct the multifunction device 3a to perform the printing operation. It should be noted that "Model1Prn" is assigned as a name of the printer driver 253, and "¥¥Server¥Drv¥Model1Prn" is assigned as a path of the printer driver 253. The facsimile driver 254 is a program for the client device 4a or the client device 4b to instruct the multifunction device 3a to perform the facsimile transmission operation. It should be noted that "Model1Fax" is assigned as a name of the facsimile driver 254, and "¥¥Server¥Drv¥Model1Fax" is assigned as a path of the facsimile driver 254.

In the second embodiment, the scanner driver 255 is a program for the multifunction device 3a to perform the scanning operation and obtain scan data. It should be noted that "Model1Scn" is assigned as a name of the scanner driver 255, and "¥¥Server¥Drv¥Model1Scn" is assigned as a path of the scanner driver 255. The printer driver 256 is a program for the client device 4a or the client device 4b to instruct the printer 5 to perform the printing operation. It should be noted that "Model2Prn" is assigned as a name of the printer driver 256, and "¥¥Server¥Drv¥Model2Prn" is assigned as a path of the printer driver 256.

In the first embodiment, the determining unit 21A is configured to retrieve the address column 250C, the substitution flag column 250F, and the substitute apparatus name column 250G from the apparatus administration table 250 per inquiry interval, so that the determining unit 21 obtains the status of the apparatus at the address thus retrieved. Further, the determining unit 21A is configured to store "0" in the status column 250D when the apparatus is in the usable state; to store "1" in the status column 250D when the apparatus is not in the usable state; and to store "2" in the status column 250D when the apparatus cannot be connected. It should be noted that the inquiry interval is set to one minute in the second embodiment. Then, the determining unit 21A is configured to store "0" in the non-connection time column 250E when the apparatus thus retrieved is connected, and to add one to the non-connection time in the non-connection time column 250E when the apparatus cannot be connected.

Further, the determining unit 21A determines that the substitute apparatus is necessary when "0" is assigned to the substitution flag column 250F, "1" or "2" is assigned to the status column 250D, and the value in the non-connection time column 200D is greater than the unusable determination time. When the determining unit 21A determines that the substitute apparatus is necessary, the determining unit 21A assigns "1" in the substitution flag column 250F, and transmits the apparatus name of the current apparatus, the substitution flag, and the substitution apparatus name to the information setting unit 22A. It should be noted that the unusable determination time is set to 60 minutes in the second embodiment.

In the first embodiment, the determining unit 21A determines that the substitute apparatus is not necessary when "1" is assigned to the substitution flag column 250F, and "0" is assigned to the status column 250D. When the determining unit 21 determines that the substitute apparatus is not necessary, the determining unit 21 assigns "0" in the substitution flag column 250F, and transmits the apparatus name of the current apparatus, the substitution flag, and the substitution apparatus name to the information setting unit 22A.

In the second embodiment, the function comparing unit 25 is configured as the additional unit to retrieve the model name column 250B having the entry matching to the apparatus name of the current apparatus to which the apparatus name column 250A of the apparatus administration table 250 is transmitted. Further, the function comparing unit 25 is configured as the additional unit to retrieve the printing flag column 257B, the facsimile transmission flag column 257C, and the scanning flag column 257D having the entry matching to the model name in the model name column 257A of the model information table 257 thus retrieved.

In the second embodiment, the function comparing unit 25 is configured as the additional unit to retrieve the model name column 250B having the entry matching to the substitute apparatus name to which the apparatus name column 250A of the apparatus administration table 250 is transmitted. Further, the function comparing unit 25 is configured as the additional unit to retrieve the printing flag column 257B, the facsimile transmission flag column 257C, and the scanning flag column 257D having the entry matching to the model name in the model name column 257A of the model information table 257 thus retrieved.

Further, the function comparing unit 25 is configured to compare the printing flag column 257B, the facsimile transmission flag column 257C, and the scanning flag column 257D of the current apparatus with the printing flag column 257B, the facsimile transmission flag column 257C, and the scanning flag column 257D of the substitute apparatus, respectively.

Further, the function comparing unit 25 is configured to transmit "1" to the information setting unit 22A when the flag of the current apparatus and the flag of the substitute apparatus are "1". Further, the function comparing unit 25 is configured to transmit "0" to the information setting unit 22A when the flag of the current apparatus and the flag of the substitute apparatus are "0". Further, the function comparing unit 25 is configured to transmit "2" to the information setting unit 22A when the flag of the current apparatus is "0", and the flag of the substitute apparatus is "1". Further, the function comparing unit 25 is configured to transmit "3" to the information setting unit 22A when the flag of the current apparatus is "1", and the flag of the substitute apparatus is "0".

In the second embodiment, when the information setting unit 22A receives the apparatus name of the current apparatus, the substitution flag, and the substitution apparatus name from the determining unit 21A, the information setting unit 22A transmits apparatus name of the current apparatus and the substitution apparatus name to the function comparing unit 25. Further, the information setting unit 22A receives the comparison result of the printing flag column 257B, the facsimile transmission flag column 257C, and the scanning flag column 257D from the function comparing unit 25. Further, the information setting unit 22A adds and registers the user name of the current apparatus when the user name of the current apparatus does not exist in the first function limitation information table 251a or the second function limitation information table 251b corresponding to the substitute apparatus name.

In the second embodiment, when the comparison result of the printing permission flag column 251B is "0", the information setting unit 22A stores the printing permission flag of the current apparatus in the printing permission flag column 251B. Further, when the comparison result of the printing permission flag column 251B is not "0", the information setting unit 22A stores "1" in the second function limitation information table 251b. Further, when the comparison result of the facsimile transmission permission flag column 251C is "0", the information setting unit 22A stores the facsimile transmission permission flag of the current apparatus in the facsimile transmission permission flag column 251C. Further, when the comparison result of the facsimile transmission permission flag column 251C is not "0", the information setting unit 22A stores "1" in the facsimile transmission permission flag column 251C.

In the second embodiment, when the comparison result of the scanning permission flag column 251D is "0", the information setting unit 22A stores the scanning permission flag of the current apparatus in the scanning permission flag column 251D. Further, when the comparison result of the scanning permission flag column 251D is not "0", the information setting unit 22A stores "1" in the scanning permission flag column 251D; the mail address of the current apparatus in the mail address column 251F; and "1" in the substitution number column 251E. Further, the information setting unit 22A transmits to the notification unit 23A the apparatus name, the substation flag, the substitute apparatus name, the user name, the mail address, the comparison result of the printing permission flag column 251B, the comparison result of the facsimile transmission permission flag column 251C, and the comparison result of the scanning permission flag column 251D.

In the second embodiment, when the user name of the current apparatus exists and the substitution number column 251E is not "0", the information setting unit 22A adds "1" to the value in the substitution number column 251E to be stored. When the substitution flag is "0", the information setting unit 22A retrieves the user name column 251A and the mail address column 251F from the first function limitation information table 251a or the second function limitation information table 251b corresponding to the apparatus name of the current apparatus. Further, when the user name of the current apparatus exists in the first function limitation information table 251a or the second function limitation information table 251b corresponding to the substitute apparatus name column 250G of the apparatus administration table 250 and the substitution number column 251E is "1", the information setting unit 22A deletes them. Further, the information setting unit 22A transmits to the notification unit 23A the apparatus name of the current apparatus, the substation flag, the substitute apparatus name, the user name, the mail address, the comparison result of the printing permission flag column 251B, the comparison result of the facsimile transmission permission flag column 251C, and the comparison result of the scanning permission flag column 251D. Further, when the substitution number column 251E is greater than "2", the information setting unit 22A subtracts "1" from the value in the substitution number column 251E to be stored.

In the second embodiment, when the notification unit 23A receives the apparatus name of the current apparatus, the substitution flag, the substitution apparatus name, the user name, the mail address, the comparison result of the printing permission flag column 251B, the comparison result of the facsimile transmission permission flag column 251C, and the comparison result of the scanning permission flag column 251D from the information setting unit 22A, the notification unit 23A retrieves the model name column 250B and the address column 250C of an entry in which the substitution apparatus name matches to the apparatus name column 250A of the apparatus administration table 250. When the substitution flag is "1", the notification unit 23A transmits a mail to the mail address. The mail states that the substitution apparatus is to be used since the apparatus name of the current apparatus cannot be used. Further, the mail states that the notification unit 23A retrieves the printer driver name column 257E, the facsimile driver name column 257F, the scanner driver name column 257G, the printer driver path column 257H, the facsimile driver path column 257I, and the scanner driver path column 257J of the entry in which the model name thus retrieved matches to the model name column 257A of the model information table 257.

In the second embodiment, when the printing flag of the comparison result is "2", the notification unit 23A transmits a mail stating that the printing operation cannot be performed. Further, when the facsimile transmission flag of the comparison result is "2", the notification unit 23A transmits a mail stating that the facsimile transmission operation cannot be performed. Further, when the scanning flag of the comparison result is "2", the notification unit 23A transmits a mail stating that the scanning operation cannot be performed. In each case, the substitution flag, the substitution apparatus name, and the address of the substitution apparatus are added to the path of the installer 252.

In the second embodiment, when the printing flag of the comparison result is "0", the notification unit 23A transmits the mail to the mail address thus retrieved. The mail contains "-P" indicating the printer driver, the printer driver name of the substitute apparatus, and the printer driver path of the substitute apparatus. Further, when the facsimile transmission flag of the comparison result is "0", the notification unit 23A transmits the mail to the mail address thus retrieved. The mail contains "-F" indicating the facsimile driver, the facsimile driver name of the substitute apparatus, and the facsimile driver path of the substitute apparatus. Further, when the scanning flag of the comparison result is "0", the notification unit 23A transmits the mail to the mail address thus retrieved. The mail contains "-S" indicating the scanner driver, the scanner driver name of the substitute apparatus, and the scanner driver path of the substitute apparatus.

In the second embodiment, when the substitution flag is "0", the notification unit 23A retrieves the printer driver name column 257E, the facsimile driver name column 257F and the scanner driver name column 257G of the entry in which the model name thus retrieved matches the model name column 257A of the model information table 257. Further, the notification unit 23A retrieves the model name column 250B and the address column 250C of the entry matching the apparatus name column 250A of the apparatus administration table 250. Further, the notification unit 23A retrieves the printer driver name column 257E, the facsimile driver name column 257F, the scanner driver name column 257G, the printer driver path column 257H, the facsimile driver path column 257I, and the scanner driver path column 257J of the entry in which the model name thus retrieved matches the model name column 257A of the model information table 257.

In the second embodiment, the notification unit 23A transmits the mail to the mail address thus received. The mail states that the apparatus name of the current apparatus becomes the usable state. Further, in the mail, the substitution flag, the apparatus name of the current apparatus, the address of the current apparatus, and the address of the substitute apparatus are added to the path of the installer 252.

In the embodiment, in the mail, when the printing flag of the comparison result is "0", "-P" indicating the printer driver, the printer driver name of the substitute apparatus, and the printer driver path of the substitute apparatus are added to the path of the installer 252. Further, when the facsimile transmission flag of the comparison result is "0", "-F" indicating the facsimile driver, the facsimile driver name of the substitute apparatus, and the facsimile driver path of the substitute apparatus are added to the path of the installer 252. Further, when the scanning flag of the comparison result is "0", "-S" indicating the scanner driver, the scanner driver name of the substitute apparatus, and the scanner driver path of the substitute apparatus are added to the path of the installer 252.

In the second embodiment, when the information obtaining unit 24A receives an inquiry of the function limitation information of the user thus specified, the information obtaining unit 24 retrieves the function limitation information of the user thus specified from the first function limitation information table 251a or the second function limitation information table 251b corresponding to the apparatus name to which the inquiry is referred. Then, the information obtaining unit 24A returns the function limitation information of the user thus specified to the inquirer. When the user thus specified does not exist in the first function limitation information table 251a or the second function limitation information table 251b, the information obtaining unit 24A returns "1" to the inquirer.

In the second embodiment, the multifunction device 3a includes the restricting unit 30; the printing unit 31; the facsimile unit 32; and the scanner unit 33. When the restricting unit 30 receives the print data from the client device 4a or the client device 4b, the restricting unit 30 inquires the server 2 of the printing operation of the function limitation information of the user that transmits the print data. When "0" is assigned in the printing permission flag column 251B, the restricting unit 30 transmits the print data to the printing unit 31. When "1" is assigned in the printing permission flag column 251B, the restricting unit 30 cancels the print data.

Further, when the restricting unit 30 receives the facsimile transmission data from the client device 4a or the client device 4b, the restricting unit 30 inquires the server 2 of the facsimile transmission operation of the function limitation information of the user that transmits the facsimile transmission data. When "0" is assigned in the facsimile transmission permission flag column 251C, the restricting unit 30 transmits the facsimile transmission data to the facsimile unit 32. When "1" is assigned in the facsimile transmission permission flag column 251C, the restricting unit 30 cancels the facsimile transmission data.

Further, when the restricting unit 30 receives the scanning request from the client device 4a or the client device 4b, the restricting unit 30 inquires the server 2 of the scanning operation of the function limitation information of the user that transmits the scanning request.

When "0" is assigned in the scanning permission flag column 251D, the restricting unit 30 transmits the scanning request to the scanner unit 33. When "1" is assigned in the scanning permission flag column 251D, the restricting unit 30 cancels the scanning request.

In the second embodiment, when the printing unit 31 receives the print data, the printing unit 31 prints the print data. When the facsimile unit 32 receives the facsimile transmission data, the facsimile unit 32 transmits the facsimile transmission data. When the scanner unit 33 receives the scanning request, the scanner unit 33 performs the scanning operation, and transmits the scan data to the client device 4a or the client device 4b who transmits the scanning request. It is supposed that the multifunction device 3a has the apparatus name of "First floor east MFP", the model name of "Model1", and the address of "192.168.0.2".

In the second embodiment, the client device 4a and the client device 4b are configured to generate the print data, and transmit the print data thus generated to the multifunction device 3a or the printer 5, so that the multifunction device 3a or the printer 5 performs the printing operation. Further, the client device 4a and the client device 4b are configured to generate the facsimile transmission data, and transmit the facsimile transmission data thus generated to the multifunction device 3a, so that the multifunction device 3a performs the facsimile transmission operation. Further, the client device 4a and the client device 4b are configured to obtain the scanning data scan with the multifunction device 3a.

As shown in FIG. 7, the client device 4a includes an installer 45 and a printer driver 44 as a control program. It is supposed that the user "User1" as the first operator normally uses the printer 5 with the client device 4a.

As shown in FIG. 7, the client device 4b includes the installer 45; a printer driver 41; a facsimile driver 42; a scanner driver 43; and the printer driver 44. It is supposed that the printer driver 44 is not installed initially in the client device 4b. It is supposed that the user "User3" as the second operator normally uses the multifunction device 3a with the client device 4b.

In the first embodiment, the installer 45 is provided for installing the printer driver 41 as the control program, the facsimile driver 42, the scanner driver 43, and the printer driver 44. More specifically, when the notification unit 23 in the server 2 transmits the mail and the path of the installer 252 in the mail is executed, the installer 45 obtains the substitution flag added to the path. When the substitution flag thus obtained is "1", the installer 45 obtains the substitute apparatus name and the address of the substitute apparatus.

Further, when "-P" is attached to the path, the installer 45 obtains the printer driver name of the substitute apparatus and the printer driver path of the substitute apparatus. When the printer driver of the printer driver name of the substitute apparatus having a connection destination matching to the address of the substitute apparatus is not installed, the installer 45 installs the printer driver with the name that the printer driver name of the substitute apparatus is added to the substitute apparatus name, and the connection destination as the address of the substitute apparatus from the printer driver path of the substitute apparatus.

Further, when "-F" is attached to the path, the installer 45 obtains the facsimile driver name of the substitute apparatus and the facsimile driver path of the substitute apparatus. When the facsimile driver of the facsimile driver name of the substitute apparatus having a connection destination matching to the address of the substitute apparatus is not installed, the installer 45 installs the facsimile driver with the name that the facsimile driver name of the substitute apparatus is added to the substitute apparatus name, and the connection destination as the address of the substitute apparatus from the facsimile driver path of the substitute apparatus.

Further, when "-S" is attached to the path, the installer 45 obtains the scanner driver name of the substitute apparatus and the scanner driver path of the substitute apparatus. When the scanner driver of the scanner driver name of the substitute apparatus having a connection destination matching to the address of the substitute apparatus is not installed, the installer 45 installs the scanner driver with the name that the scanner driver name of the substitute apparatus is added to the substitute apparatus name, and the connection destination as the address of the substitute apparatus from the scanner driver path of the substitute apparatus.

In the second embodiment, when the substitution flag thus obtained is "0", the printer driver 44 obtains the apparatus name of the current apparatus added to the path, the address of the current apparatus, and the address of the substitute apparatus.

When "-P" is attached to the path, the printer driver 44 obtains the printer driver name of the current apparatus, the printer driver path of the current apparatus, and the printer driver name of the substitute apparatus. When the printer driver of the printer driver name of the substitute apparatus having the connection destination matching to the address of the current apparatus is installed, the installer 45 deletes the printer driver. Further, when the printer driver of the printer driver name of the substitute apparatus having the connection destination matching to the address of the current apparatus is not installed, the installer 45 installs the printer driver with the name that the printer driver name of the current apparatus is added to the apparatus name of the current apparatus, and the connection destination as the address of the current apparatus from the printer driver path of the current apparatus.

Further, when "-F" is attached to the path, the installer 45 obtains the facsimile driver name of the current apparatus, the facsimile driver path of the current apparatus, and the facsimile driver name of the substitute apparatus. When the facsimile driver of the facsimile driver name of the current apparatus having the connection destination matching to the address of the current apparatus is installed, the installer 45 deletes the facsimile driver. When the facsimile driver of the facsimile driver name of the current apparatus having the connection destination matching to the address of the current apparatus is not installed, the installer 45 installs the facsimile driver with the name that the facsimile driver name of the current apparatus is added to the apparatus name of the current apparatus, and the connection destination as the address of the current apparatus from the facsimile driver path of the current apparatus.

Further, when "-S" is attached to the path, the installer 45 obtains the scanner driver name of the current apparatus, the scanner driver path of the current apparatus, and the scanner driver name of the substitute apparatus. When the scanner driver of the scanner driver name of the current apparatus having the connection destination matching to the address of the current apparatus is installed, the installer 45 deletes the scanner driver. When the scanner driver of the scanner driver name of the current apparatus having the connection destination matching to the address of the current apparatus is not installed, the installer 45 installs the scanner driver with the name that the scanner driver name of the current apparatus is added to the apparatus name of the current apparatus, and the connection destination as the address of the current apparatus from the scanner driver path of the current apparatus.

In the second embodiment, the printer driver 41 and the printer driver 44 generate the print data in response to a call from an application (not shown), and transmit the print data to the multifunction device 3a or the printer 5 as the connection destination. It is supposed that the printer driver 41 is connected to the multifunction device 3a, and the printer driver 44 is connected to the printer 5.

In the second embodiment, the facsimile driver 42 generates the facsimile transmission data in response to a call from an application (not shown), and transmits the facsimile transmission data to the multifunction device 3a as the connection destination. It is supposed that the facsimile driver 42 is connected to the multifunction device 3a. Further, the scanner driver 43 obtains the scan data from the multifunction device 3a in response to a call from an application (not shown), and transmits the scan data to the application that transmits the call. It is supposed that the scanner driver 43 is connected to the multifunction device 3a.

In the second embodiment, the printer 5 includes a restricting unit 50 and a printing unit 51. When the restricting unit 50 receives the print data from the client device 4a or the client device 4b, the restricting unit 50 inquires the server 2A of the function limitation information of the user that transmits the print data. When "0" is assigned in the printing permission flag column 251B, the restricting unit 50 transmits the print data to the printing unit 51. When "1" is assigned in the printing permission flag column 251B, the restricting unit 50 cancels the print data.

Further, when the restricting unit 50 receives the facsimile transmission data from the client device 4a or the client device 4b, the restricting unit 50 cancels the facsimile transmission data. Further, when the restricting unit 50 receives the scanning request from the client device 4a or the client device 4b, the restricting unit 50 cancels the scanning request.

In the second embodiment, when the printing unit 51 receives the print data, the printing unit 51 prints the print data. It is supposed that the printer 5 has an apparatus name of "First floor south printer" and an address of "192.168.0.3".

An operation of the image forming system will be explained next separately when the multifunction device 3b becomes the unusable state and when the multifunction device 3b becomes the usable state.

Figure 11:
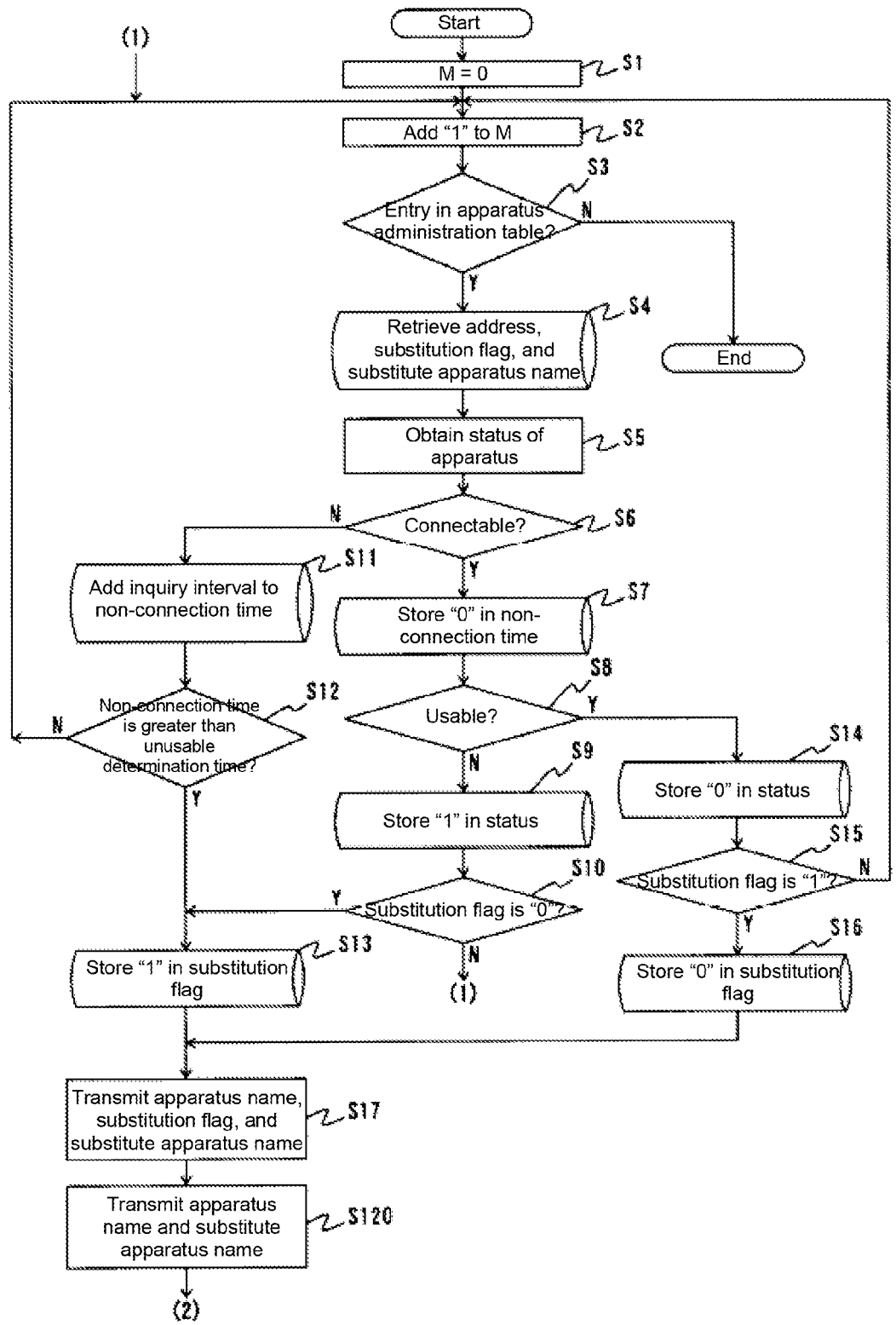
FIG. 11 is a flowchart No. 1 showing an operation of a server of the image forming system in a process after an inquiry interval is elapsed according to the second embodiment of the present invention.
Figure 12:
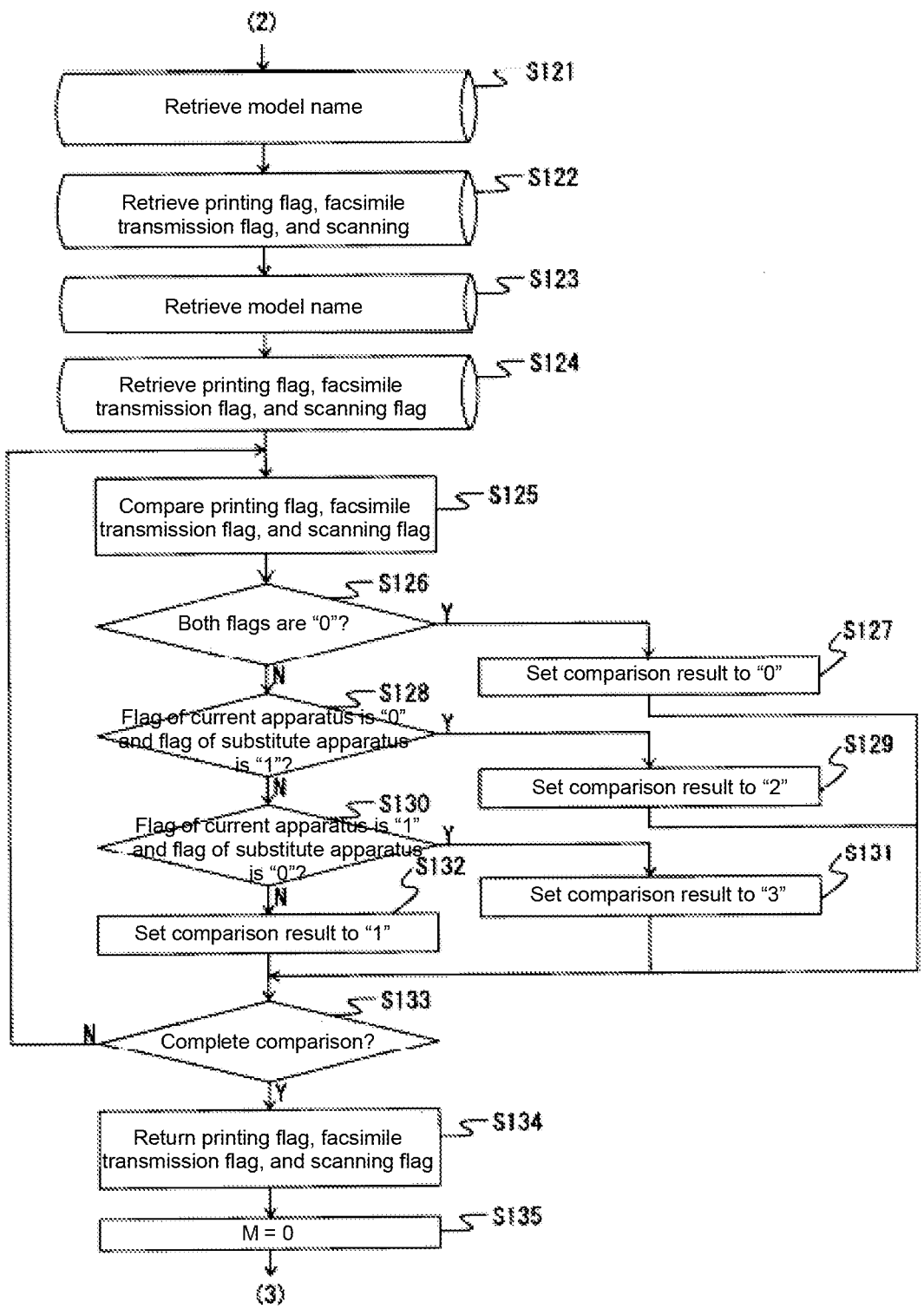
FIG. 12 is a flowchart No. 2 showing the operation of the server of the image forming system in the process after the inquiry interval is elapsed according to the second embodiment of the present invention.
Figure 13:
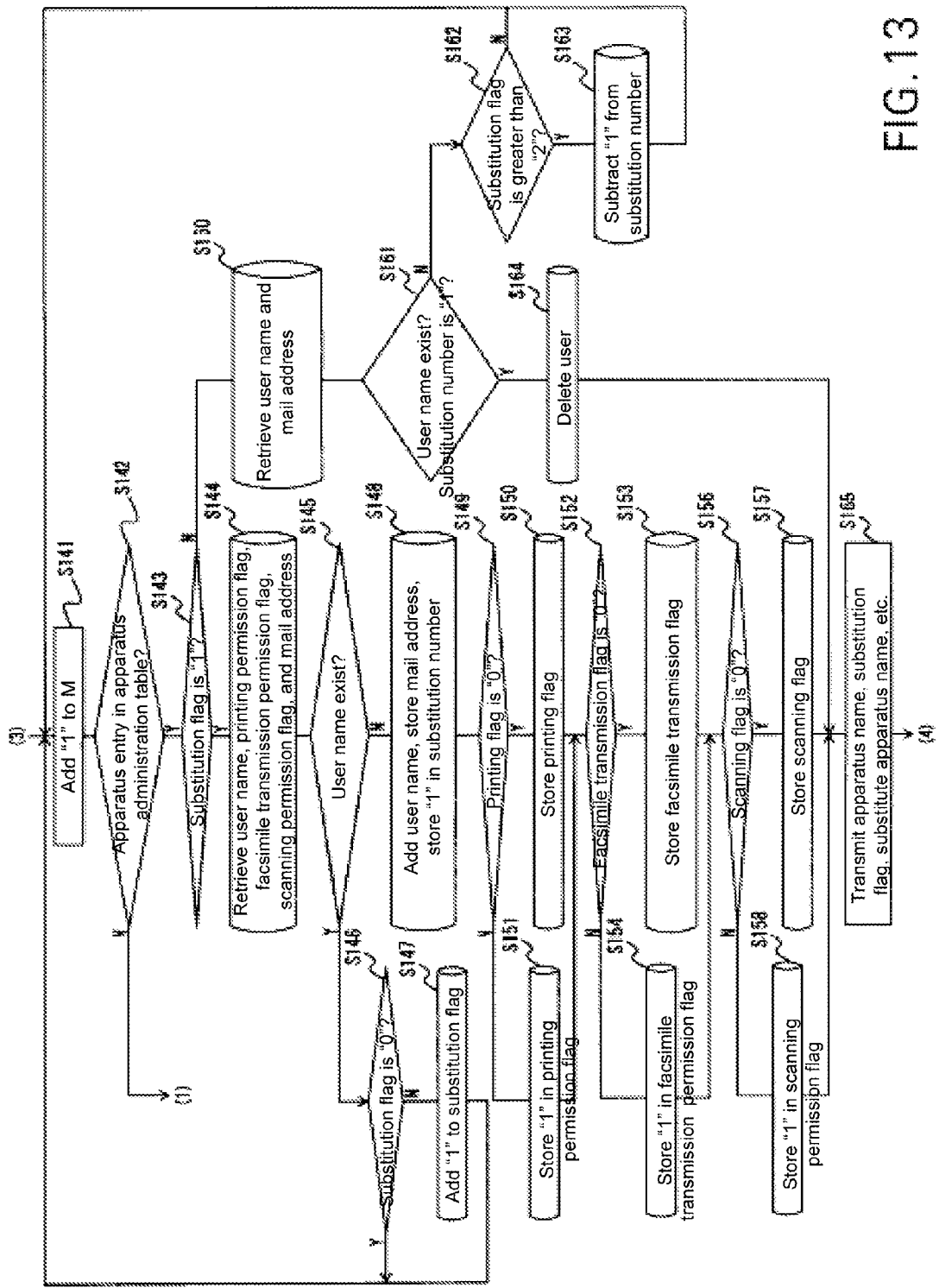
FIG. 13 is a flowchart No. 3 showing the operation of the server of the image forming system in the process after the inquiry interval is elapsed according to the second embodiment of the present invention.
Figure 14:
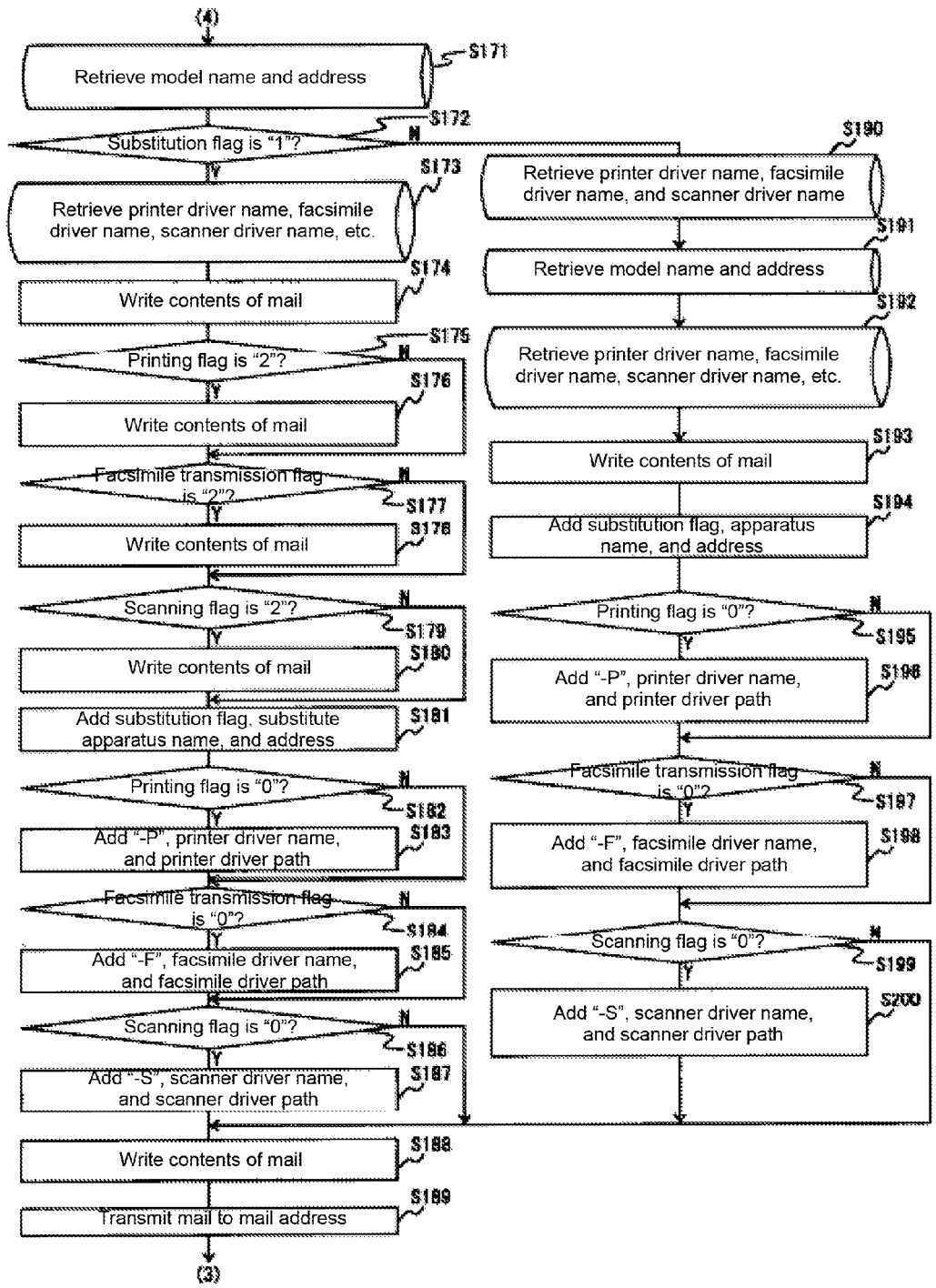
FIG. 14 is a flowchart No. 4 showing the operation of the server of the image forming system in the process after the inquiry interval is elapsed according to the second embodiment of the present invention.

First, the operation of the image forming system when the multifunction device 3b becomes the unusable state will be explained. FIG. 11 is a flowchart No. 1 showing an operation of the server 2A of the image forming system in a process after the inquiry interval is elapsed according to the second embodiment of the present invention. FIG. 12 is a flowchart No. 2 showing the operation of the server 2A of the image forming system in the process after the inquiry interval is elapsed according to the second embodiment of the present invention. FIG. 13 is a flowchart No. 3 showing the operation of the server 2A of the image forming system in the process after the inquiry interval is elapsed according to the second embodiment of the present invention. FIG. 14 is a flowchart No. 4 showing the operation of the server 2A of the image forming system in the process after the inquiry interval is elapsed according to the second embodiment of the present invention.

As shown in the flowchart shown in FIG. 11, the determining unit 21A obtains the status of the multifunction device 3*a* or the printer 5 with reference to the apparatus administration table 250, so that the determining unit 21A determines whether the substitute apparatus is necessary. When the determining unit 21A determines that the substitute apparatus is necessary, or determines that the substitute apparatus is not necessary, the determining unit 21A transmits the apparatus name, the substitution flag, and the substitution apparatus name to the information setting unit 22A. The process from step S1 to step S17 in the flowchart shown in FIG. 11 is similar to the process from step S1 to step S17 in the flowchart in the first embodiment shown in FIG. 4(*a*).

After the process from step S1 to step S16 in the flowchart shown in FIG. 11 is performed similarly to that in the first embodiment, the process proceeds to step S17. In step S17, the determining unit 21A transmits the apparatus name "First floor west MFP", the substitution flag "1", and the substitution apparatus name "First floor south printer" to the information setting unit 22A. Afterward, the process proceeds to step S120. In step S120, the information setting unit 22A transmits the apparatus name "First floor west MFP" and the substitution apparatus name "First floor south printer" to the function comparing unit 25. Afterward, the process proceeds to step S121 in the flowchart shown in FIG. 12 through the connection path (2).

As shown in the flowchart shown in FIG. 12, in the process from step S121 to step S134, the function comparing unit 25 compares the set functions of the current apparatus and the substitute apparatus with reference to the apparatus administration table 250 and the model information table 257. Then, the function comparing unit 25 returns the comparison result to the information setting unit 22A.

More specifically, in step S121, the function comparing unit 25 retrieves the model name "Model1" of the entry matching to the apparatus name of the current apparatus "First floor west MFP" retrieved from the apparatus name column 250A of the apparatus administration table 250. In step S122, the function comparing unit 25 retrieves the printing flag "0", the facsimile transmission flag "0", and the scanning flag "0" of the entry in which the model name column 257A of the model information table 257 matches to the model name "Model1", and the process proceeds to step S123.

In step S123, the function comparing unit 25 retrieves to the model name "Model2" of the entry matching to the substitute apparatus name "First floor south printer" retrieved from the apparatus name column 250A of the apparatus administration table 250, and the process proceeds to step S124. In step S124, the function comparing unit 25 retrieves the printing flag "0", the facsimile transmission flag "1", and the scanning flag "1" of the entry in which the model name column 257A of the model information table 257 matches to the model name "Model2", and the process proceeds to step S125.

In step S125, the function comparing unit 25 compares the printing flag of the current apparatus with the printing flag of the substitute apparatus, and the process proceeds to step S126. In step S126, the function comparing unit 25 determines whether the printing flag of the current apparatus and the printing flag of the substitute apparatus are both "0". In this case, the function comparing unit 25 determines that the printing flag of the current apparatus and the printing flag of the substitute apparatus are both "0" (Y in step S126), and the process proceeds to step S127. In step S127, the function comparing unit 25 sets the comparison result to "0", and the process proceeds to step S133.

In step S133, the function comparing unit 25 determines whether all of the printing flag, the facsimile transmission flag, and the scanning flag are compared. In this case, the function comparing unit 25 determines that the facsimile transmission flag and the scanning flag are not compared yet (N in step S133), the process returns to step S125.

In step S125, the function comparing unit 25 compares the facsimile transmission flag of the current apparatus with the facsimile transmission flag of the substitute apparatus, and the process proceeds to step S126. In step S126, the function comparing unit 25 determines whether the facsimile transmission flag of the current apparatus and the facsimile transmission flag of the substitute apparatus are both "0". In this case, the function comparing unit 25 determines that the facsimile transmission flag of the current apparatus and the facsimile transmission flag of the substitute apparatus are not both "0" (N in step S126), and the process proceeds to step S128.

In step S128, the function comparing unit 25 determines whether the facsimile transmission flag of the current apparatus is "0" and the facsimile transmission flag of the substitute apparatus is "1". In this case, the function comparing unit 25 determines that the facsimile transmission flag of the current apparatus is "0" and the facsimile transmission flag of the substitute apparatus is "1" (Y in step S128), and the process proceeds to step S129. In step S129, the function comparing unit 25 sets the comparison result to "2", and the process proceeds to step S133.

In step S133, the function comparing unit 25 determines whether all of the printing flag, the facsimile transmission flag, and the scanning flag are compared. In this case, the function comparing unit 25 determines that the scanning flag is not compared yet (N in step S133), the process returns to step S125.

In step S125, the function comparing unit 25 compares the scanning flag of the current apparatus with the scanning flag of the substitute apparatus, and the process proceeds to step S126. In step S126, the function comparing unit 25 determines whether the scanning flag of the current apparatus and the scanning flag of the substitute apparatus are both "0". In this case, the function comparing unit 25 determines that the scanning flag of the current apparatus and the scanning flag of the substitute apparatus are not both "0" (N in step S126), and the process proceeds to step S128.

In step S128, the function comparing unit 25 determines whether the scanning flag of the current apparatus is "0" and the scanning flag of the substitute apparatus is "1". In this case, the function comparing unit 25 determines that the scanning flag of the current apparatus is "0" and the scanning flag of the substitute apparatus is "1" (Y in step S128), and the process proceeds to step S129. In step S129, the function comparing unit 25 sets the comparison result to "2", and the process proceeds to step S133.

In step S133, the function comparing unit 25 determines whether all of the printing flag, the facsimile transmission flag, and the scanning flag are compared. In this case, the function comparing unit 25 determines that all of the printing flag, the facsimile transmission flag, and the scanning flag are compared (Y in step S133), the process proceeds to step S134.

In step S134, the function comparing unit 25 returns the printing flag "0", the facsimile transmission flag "2", and the scanning flag "2" to the information setting unit 22A, and the process proceeds to step S135. In step S135, the information setting unit 22A sets the number M in the first function limitation information table 251a and the second function limitation information table 251b to "0" (M=0), and the process proceeds to step S141 in the flowchart shown in FIG. 13 through the connection path (3).

As shown in the flowchart shown in FIG. 13, in the process from step S141 to step S165, the information setting unit 22A receives the comparison result of the functions of the current apparatus and the substitute apparatus from the function comparing unit 25. When the determining unit 21A determines that the substitute apparatus is necessary, the information setting unit 22A adds the user that does not exist in the first function limitation information table 251a or the second function limitation information table 251b of the substitute apparatus with reference to the first function limitation information table 251a or the second function limitation information table 251b of the current apparatus, so that the information setting unit 22A invalidates the functions existing only in the substitute apparatus according to the comparison result of the functions. When the determining unit 21A determines that the substitute apparatus is not necessary, the information setting unit 22A deletes the user added to the first function limitation information table 251a or the second function limitation information table 251b of the substitute apparatus with reference to the first function limitation information table 251a or the second function limitation information table 251b of the current apparatus. Further, the information setting unit 22A transmits the apparatus name, the substitution flag, the substitute apparatus name, the user name, the mail address, and the comparison result of the functions to the notification unit 23A.

More specifically, in step S141, the information setting unit 22A adds "1" to the number M (M=1), and the process proceeds to step S142. In step S142, the information setting unit 22A determines whether the user entry in the M-th row does exist in the first function limitation information table 251a or the second function limitation information table 251b matching to the apparatus name. In this case, the information setting unit 22A determines that the user entry exists at the first row of the first function limitation information table 251a corresponding to the apparatus name "First floor west MFP" (Y in step S142), and the process proceeds to step S143. In step S143, the information setting unit 22A determines whether the substitution flag is "1". In this case, the information setting unit 22A determines that the substitution flag is "1" (Y in step S143), and the process proceeds to step S144.

In step S144, from the user entry at the first row of the first function limitation information table 251a corresponding to the apparatus name "First floor west MFP", the information setting unit 22A retrieves "User3" in the user name column 251A, "0" in the printing permission flag column 251B, "1" in the facsimile transmission permission flag column 251C, "0" in the scanning permission flag column 251D, and "User3@aaa.bbb" in the mail address column 251F. Afterward, the process proceeds to step S145.

In step S145, the information setting unit 22A determines whether the user name does exist in the second function limitation information table 251b corresponding to the substitute apparatus name. In this case, the information setting unit 22A determines that the user name does not exist (N in step S145), so that the process proceeds to step S148. In step S148, from the second function limitation information table 251b corresponding to the substitute apparatus name, the information setting unit 22A retrieves "User3" in the user name column 251A, "1" in the substitution number column 251E, and "User3@aaa.bbb" in the mail address column 251F. Afterward, the information setting unit 22 adds "User3" and stores the substitution flag "1" and the mail address "User3@aaa.bbb", and the process proceeds to step S149.

In step S149, the information setting unit 22A determines whether the comparison result of the printing flag is "0". In this case, the information setting unit 22A determines that the comparison result of the printing flag is "0" (Y in step S149), and the process proceeds to step S150. In step S150, the information setting unit 22A stores the printing permission flag "0" of the current apparatus in the printing permission flag, and the process proceeds to step S152. When the information setting unit 22A determines that the comparison result of the printing flag is not "0" (N in step S149), and the process proceeds to step S151. In step S151, the information setting unit 22A stores "1" in the printing permission flag, and the process proceeds to step S152.

In step S152, the information setting unit 22A determines whether the comparison result of the facsimile transmission flag is "0". In this case, the information setting unit 22A determines that the comparison result of the facsimile transmission flag is not "0" (N in step S152), and the process proceeds to step S154. In step S154, the information setting unit 22A stores "1" in the facsimile transmission permission flag, and the process proceeds to step S156. When the information setting unit 22A determines that the comparison result of the facsimile transmission flag is "0" (Y in step S152), and the process proceeds to step S153. In step S153, the information setting unit 22A stores the facsimile transmission permission flag of the current apparatus in the facsimile transmission permission flag, and the process proceeds to step S156.

In step S156, the information setting unit 22A determines whether the comparison result of the scanning flag is "0". In this case, the information setting unit 22A determines that the comparison result of the scanning flag is not "0" (N in step S156), and the process proceeds to step S158. In step S158, the information setting unit 22A stores "1" in the scanning permission flag, and the process proceeds to step S165. When the information setting unit 22A determines that the comparison result of the scanning flag is "0" (Y in step S156), and the process proceeds to step S157. In step S157, the information setting unit 22A stores the scanning permission flag of the current apparatus in the scanning permission flag, and the process proceeds to step S165.

In step S165, the information setting unit 22A transmits the apparatus name "First floor west MFP", the substitution flag "1", the substitute apparatus name "First floor south printer", the user name "User3", the mail address "User3@aaa.bbb", the printing flag "0", the facsimile transmission flag "2", and the scanning flag "2" to the notification unit 23A. Then, the process proceeds to step S171 in the flowchart shown in FIG. 14 through the connection path (4).

As shown in the flowchart shown in FIG. 14, in the process from step S171 to step S33, step S189, when the substitute apparatus is necessary, with reference to the apparatus administration table 250 and the model information table 257, the notification unit 23A transmits the mail to the user indicating that the apparatus becomes the unusable state and the substitute apparatus is used and including the information for installing the driver of the substitute apparatus of the function that the substitute apparatus cannot use and the function other than the function that exists in the substitute apparatus when there is the function that exists only in the substitute apparatus. When the substitute apparatus is not necessary, with reference to the apparatus administration table 250 and the model information table 257, the notification unit 23A transmits the mail indicating that the apparatus becomes the usable state and including the information for deleting the driver of the substitute apparatus of the function other than the function that exists only in the substitute apparatus.

More specifically, in step S171, the notification unit 23A retrieves the model name "Model2" and the address "192.168.0.3" of the entry having the substitute apparatus name "First floor south printer" matching to the apparatus name column 250A of the apparatus administration table 250, and the process proceeds to step S172. In step S172, the notification unit 23A determines whether the substitution flag is "1". In this case, the notification unit 23A determines that the substitution flag is "1" (Y in step S172), and the process proceeds to step S173.

In step S173, the notification unit 23A retrieves the printer driver name "Model2Prn", the facsimile driver name "NULL", the scanner driver name "NULL", the printer driver path "¥¥Server¥Drv¥Model2Prn", the facsimile driver path "NULL", and the scanner driver path "NULL" of the entry having the model name "Model2" matching to the model name column 257A of the model information table 257. Afterward, the process proceeds to step S174. In step S174, the notification unit 23A writes contents of the mail, and the process proceeds to step S175. The mail indicates that the apparatus name "First floor west MFP" is not in the usable state and the substitute apparatus name "First floor south printer" is used.

In step S175, the notification unit 23A determines whether the comparison result of the printing flag is "2". In this case, the notification unit 23A determines that the comparison result of the printing flag is not "2" (N in step S175), and the process proceeds to step S177. When the notification unit 23A determines that the comparison result of the printing flag is "2" (Y in step S175), the process proceeds to step S176. In step S176, the notification unit 23A writes contents of the mail, and the process proceeds to step S177. The mail indicates that the substitute apparatus cannot perform the printing operation.

In step S177, the notification unit 23A determines whether the comparison result of the facsimile transmission flag is "2". In this case, the notification unit 23A determines that the comparison result of the facsimile transmission flag is "2" (Y in step S177), and the process proceeds to step S178. In step S178, the notification unit 23A writes contents of the mail, and the process proceeds to step S179. The mail indicates that the facsimile transmission becomes unavailable. In step S179, the notification unit 23A determines whether the comparison result of the scanning flag is "2". In this case, the notification unit 23A determines that the comparison result of the scanning flag is "2" (Y in step S179), and the process proceeds to step S180. In step S180, the notification unit 23A writes contents of the mail, and the process proceeds to step S181. The mail indicates that the scanning becomes unavailable.

In step S181, the notification unit 23A adds the substitution flag "1", the substitute apparatus name "First floor south printer", and the address of the substitute apparatus "192.168.0.3" to the path "¥¥Server¥Drv¥Installer.exe" of the installer 252. Afterward, the process proceeds to step S182. In step S182, the notification unit 23A determines whether the comparison result of the printing flag is "0". In this case, the notification unit 23A determines that the comparison result of the printing flag is "0" (Y in step S182), and the process proceeds to step S183.

In step S183, the notification unit 23A adds "-P" indicating the printer driver, the printer driver name "Model2Prn", and the printer driver path "¥¥Server¥Drv¥ Model2Prn" to the path "¥¥Server¥Drv¥Installer.exe" of the installer 252. Afterward, the process proceeds to step S184. In step S184, the notification unit 23A determines whether the comparison result of the facsimile transmission flag is "0". In this case, the notification unit 23A determines that the comparison result of the facsimile transmission flag is not "0" (N in step S184), and the process proceeds to step S186. In step S186, the notification unit 23A determines whether the comparison result of the scanning flag is "0". In this case, the notification unit 23A determines that the comparison result of the scanning flag is not "0" (N in step S186), and the process proceeds to step S188.

When the notification unit 23A determines that the comparison result of the facsimile transmission flag is "0" (Y in step S184), and the process proceeds to step S185. In step S185, the notification unit 23A adds "-F" indicating the facsimile driver, the facsimile driver name, and the facsimile driver path to the path "¥¥Server¥Drv¥Installer.exe" of the installer 252. Afterward, the process proceeds to step S186.

When the notification unit 23A determines that the comparison result of the scanning flag is "0" (Y in step S186), and the process proceeds to step S187. In step S187, the notification unit 23A adds "-S" indicating the scanner driver, the scanner driver name, and the scanner driver path to the path "¥¥Server¥Drv¥Installer.exe" of the installer 252. Afterward, the process proceeds to step S188.

In step S188, the notification unit 23A writes the path of the installer and the additional information to the contents of the mail, and the process proceeds to step S189. In step S189, the notification unit 23A transmits the mail in which the path of the installer and the additional information are written to the mail address "User3@aaa.bbb". Afterward, the process returns to step S141 of the flowchart shown in FIG. 13 through the connection path (3).

In step S141 of the flowchart shown in FIG. 13, the information setting unit 22A adds "1" to the number M (M=2), and the process proceeds to step S142. In step S142, the information setting unit 22A determines that the user entry exists at the second row of the first function limitation information table 251a corresponding to the apparatus name "First floor west MFP" (Y in step S142), and the process proceeds to step S143. In step S143, the information setting unit 22A determines that the substitution flag is "1" (Y in step S143), and the process proceeds to step S144. In step S144, from the user entry at the second row of the second function limitation information table 251b corresponding to the apparatus name "First floor west MFP", the information setting unit 22A retrieves "User4" in the user name column 251A, "0" in the printing permission flag column 251B, "0" in the facsimile transmission permission flag column 251C, "0" in the scanning permission flag column 251D, and "User4@aaa.bbb" in the mail address column 251F. Afterward, the process proceeds to step S145.

In step S145, the information setting unit 22A determines that the user name does exist in the second function limitation information table 251b corresponding to the substitute apparatus name (First floor south printer) (Y in step S145), so that the process proceeds to step S146. In step S146, the information setting unit 22A determines whether the substitution flag of the user thus identified is "0". In this case, the information setting unit 22A determines that the substitution flag of the user thus identified is "0" (Y in step S146), and the process returns to step S141.

In step S141, the information setting unit 22A adds "1" to the number M (M=3), and the process proceeds to step S142. In step S142, the information setting unit 22A determines that the user entry does not exist at the third row of the first function limitation information table 251a corresponding to the apparatus name "First floor west MFP" (N in step S142), and the process returns to step S2 of the flowchart shown in FIG. 11 through the connection path (1).

In step S2 of the flowchart shown in FIG. 11, the determining unit 21A adds "1" to the number N (N=2), and the process proceeds to step S3. In step S3, the determining unit 21A determines that the apparatus entry does exist at the second row in the apparatus administration table 250 (Y in step S3), and the process proceeds to step S4.

In step S4, the determining unit 21A retrieves the apparatus name "First floor south printer", the address "192.168.0.3", the substitution flag "0", and the substitute apparatus name "First floor west MFP" from the apparatus entry at the second row of the apparatus administration table 250. Afterward, the process proceeds to step S5. In step S5, the determining unit 21 obtains the status of the usable state from the apparatus with the address "192.168.0.3", and the process proceeds to step S6.

In step S6, the determining unit 21A determines that the apparatus can be connected (Y in step S6), the process proceeds to step S7. In step S7, the determining unit 21A stores "0" in the non-connection time column 250E of the apparatus administration table 250, and the process proceeds to step S8. In step S8, the determining unit 21A determines that the apparatus is in the usable state (Y in step S8), the process proceeds to step S14. In step S14, the determining unit 21A stores "0" in the status column 250D of the apparatus administration table 250, and the process proceeds to step S15. In step S15, the determining unit 21A determines that the substitution flag is not "1" (N in step S15), the process returns to step S2.

In step S2, the determining unit 21A adds "1" to the number N (N=3), and the process proceeds to step S3. In step S3, the determining unit 21A determines that the apparatus does not exist at the third row of the apparatus administration table 250 (N in step S3), and the process is completed.

Figure 15:
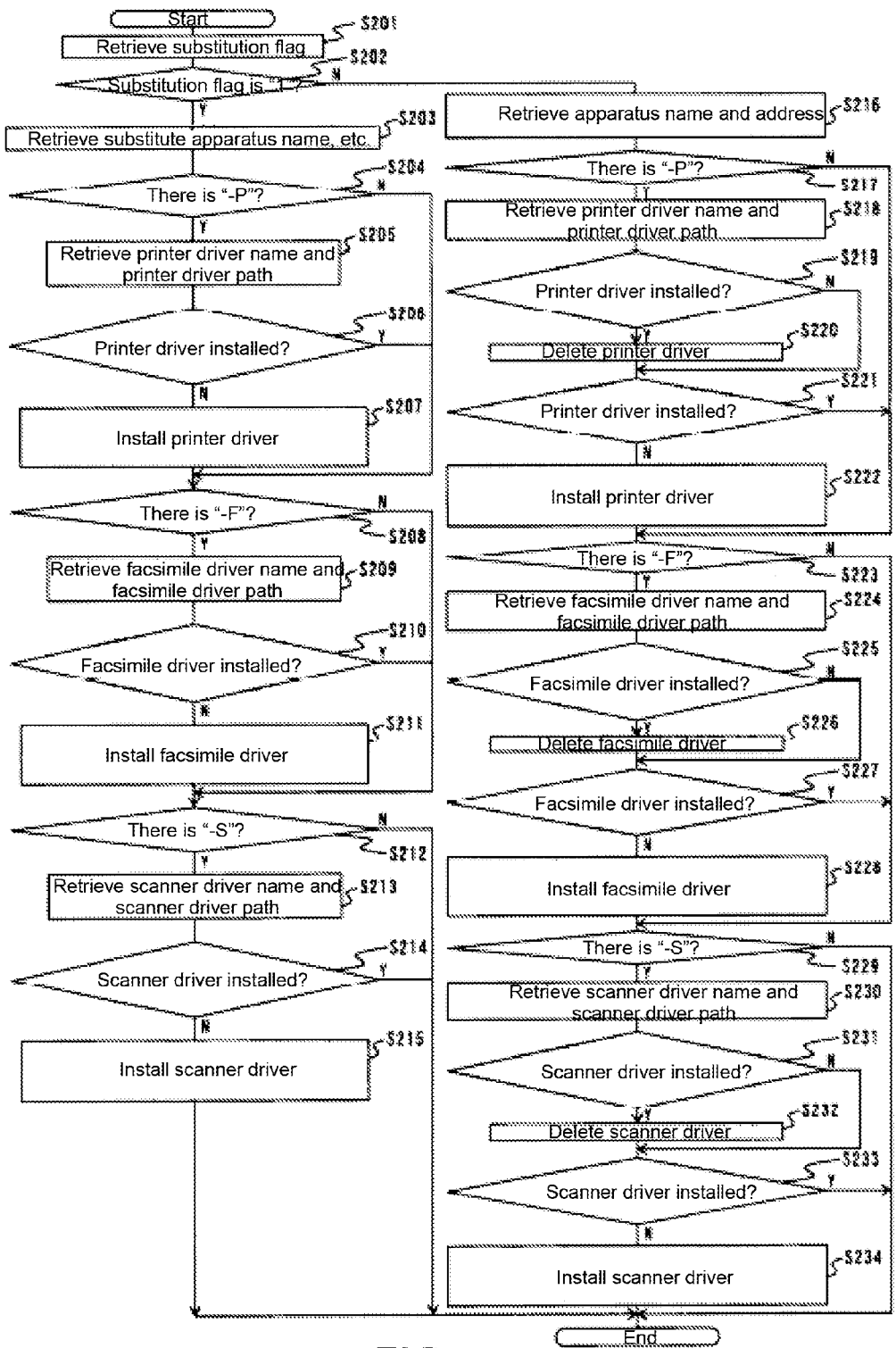
FIG. 15 is a flowchart showing the operation of the image forming system in a process when a path of a transmitted mail is executed in a multifunction device and a printer of the image forming system according to the second embodiment of the present invention.

FIG. 15 is a flowchart showing the operation of the image forming system in a process when the path of the transmitted mail is executed in the multifunction device 3a and the printer 5 of the image forming system according to the second embodiment of the present invention.

More specifically, with reference to the transmitted mail of the notification unit 23A, the user "User3" uses the client device 4b to execute the path when the multifunction device 3a becomes the unusable state due to malfunction. The operation in the process will be explained with reference to FIG. 7 along with the flowchart shown in FIG. 15.

In the process from step S201 to step S215 shown in the flowchart in FIG. 15, the installer 45 installs the driver of the substitute apparatus when the substitute apparatus becomes necessary.

When the path of the transmitted mail is executed, the installer 252 of the server 2A is retrieved in the client device 4b, so that the installer 45 is started. Accordingly, the process starts and proceeds to step S201. In step S201, the installer 45 retrieves the substitution flag "1" transmitted from the path, and the process proceeds to step S202. In step S202, the installer 45 determines whether the substitution flag is "1". In this case, the installer 45 determines that the substitution flag is "1" (Y in step S202), and the process proceeds to step S203.

In step S203, the installer 45 retrieves the substitute apparatus name "First floor south printer" and the address of the substitute apparatus "192.168.0.3" from the starting path. Afterward, the process proceeds to step S204. In step S204, the installer 45 determines whether the starting path includes "-P". In this case, the installer 45 determines that the starting path includes "-P" (Y in step S204), and the process proceeds to step S205. In step S205, the installer 45 retrieves the printer driver name of the substitute apparatus "Model2Prn" and the printer driver path of the substitute apparatus "¥¥Server¥Drv¥Model2Prn" from the starting path. Afterward, the process proceeds to step S206. When the installer 45 determines that the starting path does not include "-P" (N in step S204), the process proceeds to step S208.

In step S206, the installer 45 determines whether the printer driver having the printer driver name "Model2Prn" and the connection destination "192.168.0.3" is installed. In this case, the installer 45 determines that the printer driver having the printer driver name "Model2Prn" and the connection destination "192.168.0.3" is not installed (N in step S206), and the process proceeds to step S207. When the installer 45 determines that the printer driver having the printer driver name "Model2Prn" and the connection destination "192.168.0.3" is installed (Y in step S206), the process proceeds to step S208.

In step S207, the installer 45 sets the printer driver name to "First floor south printer Model2Prn" and the connection destination to "192.168.0.3", and installs the printer driver 256 of the printer driver path "¥¥Server¥Drv¥Model2Prn" of the server 2A as the printer driver 44. Afterward, the process proceeds to step S208.

In step S208, the installer 45 determines whether the starting path includes "-F". In this case, the installer 45 determines that the starting path does not include "-F" (N in step S208), and the process proceeds to step S212. In step S212, the installer 45 determines whether the starting path includes "-S". In this case, the installer 45 determines that the starting path does not include "-S" (N in step S212), and the process is completed.

When the installer 45 determines that the starting path includes "-F" (Y in step S208), the process proceeds to step S209. In step S209, the installer 45 retrieves the facsimile driver name of the substitute apparatus "Model2Fax" and the facsimile driver path of the substitute apparatus "¥¥Server¥Drv¥Model2Fax" from the starting path. Afterward, the process proceeds to step S210.

In step S210, the installer 45 determines whether the facsimile driver having the facsimile driver name "Model2Fax" and the connection destination "192.168.0.3" is installed. When the installer 45 determines that the facsimile driver having the facsimile driver name "Model2Fax" and the connection destination "192.168.0.3" is installed (Y in step S210), the process proceeds to step S212. When the installer 45 determines that the facsimile driver having the facsimile driver name "Model2Fax" and the connection destination "192.168.0.3" is not installed (N in step S210), the process proceeds to step S211.

In step S211, the installer 45 installs the facsimile driver 254 of the server 2A with the name that the facsimile driver name is added to the substitute apparatus name, and the connection destination as the address of the substitute apparatus. Accordingly, the substitute apparatus name becomes "First floor south printer Model2Fax", and the connection destination is "192,168.0.3". Afterward, the process proceeds to step S212.

When the installer 45 determines that the starting path includes "-S" (Y in step S212), the process proceeds to step S213. In step S213, the installer 45 retrieves the scanner driver name of the substitute apparatus "Model2Scn" and the scanner driver path of the substitute apparatus "¥¥Server¥Drv¥Model2Scn" from the starting path. Afterward, the process proceeds to step S214.

In step S214, the installer 45 determines whether the scanner driver having the scanner driver name "Model2Scn" and the connection destination "192.168.0.3" is installed. When the installer 45 determines that the scanner driver having the scanner driver name "Model2Scn" and the connection destination "192.168.0.3" is installed (Y in step S214), the process is completed. When the installer 45 determines that the scanner driver having the scanner driver name "Model2Scn" and the connection destination "192.168.0.3" is not installed (N in step S214), the process proceeds to step S215.

In step S215, the installer 45 installs the scanner driver 255 of the server 2A with the name that the scanner driver name is added to the substitute apparatus name, and the connection destination as the address of the substitute apparatus. Accordingly, the substitute apparatus name becomes "First floor south printer Model2Scn", and the connection destination is "192,168.0.3". Afterward, the process is completed.

As described above, through the process from step S201 to step S215, the printer driver 44 becomes the usable state at the client device 4b.

Figure 16:
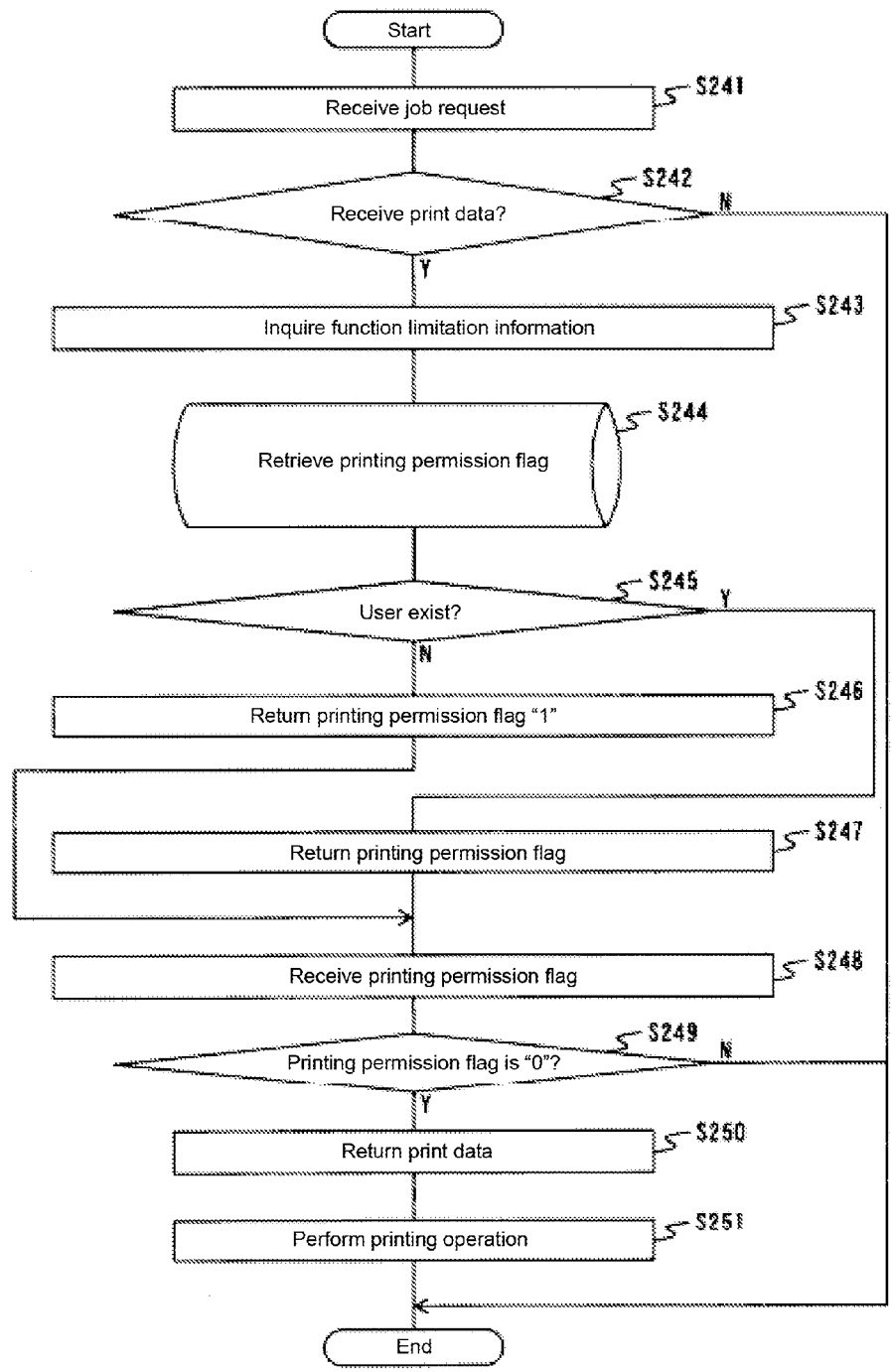
FIG. 16 is a flowchart showing the operation of the image forming system in a process when a job request is transmitted in a printer of the image forming system according to the second embodiment of the present invention.

FIG. 16 is a flowchart showing the operation of the image forming system in a process when the job request is transmitted in the printer 5 of the image forming system according to the second embodiment of the present invention.

In the process from step S241 to step S251 in the flowchart shown in FIG. 16, when the printer 5 receives the print data from the client device 4a or the client device 4b, the printer 5 retrieves the function restriction information of the printing operation of the user who requests the printing operation from the server 2A. When the printing operation is allowed, the printer 5 performs the printing operation.

First, the process will be explained when the user "User3" on the client device 4b requests the printer 5 to perform the printing operation after the driver of the printer 5 is installed with reference to FIGS. 7 and 9 along with the flowchart shown in FIG. 16.

When the user "User3" uses the client device 4b to request the printer 5 to perform the printing operation through an application (not shown), the process starts and proceeds to step S241. In step S241, the restricting unit 50 of the printer 5 receives the job request transmitted from the client device 4b, and the process proceeds to step S242. In step S242, the restricting unit 50 determines whether the restricting unit 50 receives the print data. In this case, the restricting unit 50 determines that the restricting unit 50 receives the print data (Y in step S242), and the process proceeds to step S243. In step S243, the restricting unit 50 inquires the server 2A of the function restriction information of the user "User3", and the process proceeds to step S244.

In step S244, the information obtaining unit 24A of the server 2A retrieves the second function limitation information table 251b of the user "User3" from the first function limitation information table 251a of the printer 5 to which the inquiry is referred, and the process proceeds to step S245. In step S245, the information obtaining unit 24A determines whether the user does exist. In this case, the information obtaining unit 24A determines that the user "User3" does exist (Y in step S245), and the process proceeds to step S247.

In step S247, the information obtaining unit 24A returns the printing permission flag "0" to the printer 5 to which the inquiry is referred, and the process proceeds to step S248. In step S248, the restricting unit 50 of the printer 5 receives the printing permission flag "0", and the process proceeds to step S249.

In step S249, the restricting unit 30 determines whether the printing permission flag is "0". In this case, the restricting unit 30 determines that the printing permission flag is "0" (Y in step S249), and the process proceeds to step S250. In step S250, the information obtaining unit 24A of the server 2A transmits the print data to the printing unit 51, and the process proceeds to step S251. In step S251, the printing unit 51 performs the printing operation of the print data thus received, and the process is completed.

Next, the process will be explained when the user "User1", who is using the printer 5 as the substitute apparatus through the client device 4a, requests the printer 5 to perform the printing operation in a case that the multifunction device 3a becomes the unusable state due to malfunction and the printer 5 is used as the substitute apparatus with reference to FIGS. 7 and 9 along with the flowchart shown in FIG. 16.

When the user "User1" uses the client device 4a to request the printer 5 to perform the printing operation through an application (not shown), the process starts and proceeds to step S241. In step S241, the restricting unit 50 of the printer 5 receives the job request transmitted from the client device 4a, and the process proceeds to step S242. In step S242, the restricting unit 50 determines that the restricting unit 50 receives the print data (Y in step S242), and the process proceeds to step S243. In step S243, the restricting unit 50 inquires the server 2 of the function restriction information of the user "User1", and the process proceeds to step S244.

In step S244, the information obtaining unit 24A of the server 2A retrieves the second function limitation information table 251b of the user "User1" from the second function limitation information table 251b of the printer 5 to which the inquiry is referred, and the process proceeds to step S245. In step S245, the information obtaining unit 24A determines that the user "User1" does exist (Y in step S245), and the process proceeds to step S247. In step S247, the information obtaining unit 24A returns the printing permission flag "0" to the printer 5 to which the inquiry is referred, and the process proceeds to step S248.

In step S78, the restricting unit 50 of the printer 5 receives the printing permission flag "0", and the process proceeds to step S249. In step S249, the restricting unit 50 determines that the printing permission flag is "0" (Y in step S249), and the process proceeds to step S250. In step S250, the information obtaining unit 24A of the server 2A transmits the print data to the printing unit 51, and the process proceeds to step S251. In step S251, the printing unit 51 performs the printing operation of the print data thus received, and the process is completed.

Next, the operation of the image forming system when the multifunction device 3a becomes the usable state will be explained. First, the operation of the server 2A after the inquiry interval of the server 2A is elapsed after the multifunction device 3a is restored and becomes the usable state will be explained with reference to FIGS. 7 to 10 along with the flowcharts shown in FIGS. 11 to 14.

As shown in the flowchart shown in FIG. 11, when the operation starts, the process proceeds to step S1. In step S1, the determining unit 21A set the number N in the apparatus administration table 250 to zero (N=0), and the process proceeds to step S2. In step S2, the determining unit 21A adds "1" to the number N (N=1), and the process proceeds to step S3. In step S3, the determining unit 21A determines that the apparatus exists at the first row in the apparatus administration table 250 (Y in step S3), and the process proceeds to step S4.

In step S4, from the apparatus entry at the first row of the apparatus administration table 250, the determining unit 21A retrieves the apparatus name "First floor west MFP", the address "192.168.0.2", the substitution flag "0", and the substitute apparatus name "First floor south printer". Then, the process proceeds to step S5. In step S5, the determining unit 21A obtains the status of the usable state "0" of the address "192.168.0.2", and the process proceeds to step S6. In step S6, the determining unit 21A determines that the apparatus can be connected (Y in step S6), and the process proceeds to step S7. In step S7, the determining unit 21A stores "0" in the first row of the non-connection time column 250E of the apparatus administration table 250, and the process proceeds to step S8.

In step S8, the determining unit 21A determines that the apparatus is in the usable state (Y in step S8), the process proceeds to step S14. In step S14, the determining unit 21A stores "0" in the status column 250D of the apparatus administration table 250, and the process proceeds to step S15. In step S15, the determining unit 21A determines that the substitution flag is "1" (Y in step S15), and the process proceeds to step S16. In step S16, the determining unit 21A stores "0" in the substitution flag column 250F of the apparatus administration table 250, and the process proceeds to step S17.

In step S17, the determining unit 21A transmits the apparatus name "First floor west MFP", the substitution flag "0", and the substitute apparatus name "First floor south printer" to the information setting unit 22A. Afterward, the process proceeds to step 120. In step S120, the information setting unit 22A transmits the apparatus name "First floor west MFP", the substitution flag "0", and the substitution apparatus name "First floor south printer" to the function comparing unit 25. Afterward, the process proceeds to step S121 in the flowchart shown in FIG. 12 through the connection path (2).

In step S121 in the flowchart shown in FIG. 12, the function comparing unit 25 retrieves the model name "Model1" of the entry matching to the apparatus name of the current apparatus "First floor west MFP" retrieved from the apparatus name column 250A of the apparatus administration table 250. In step S122, the function comparing unit 25 retrieves the printing flag "0", the facsimile transmission flag "0", and the scanning flag "0" of the entry in which the model name column 257A of the model information table 257 matches to the model name "Model1", and the process proceeds to step S123.

In step S123, the function comparing unit 25 retrieves to the model name "Model2" of the entry matching to the substitute apparatus name "First floor south printer" retrieved from the apparatus name column 250A of the apparatus administration table 250, and the process proceeds to step S124. In step S124, the function comparing unit 25 retrieves the printing flag "0", the facsimile transmission flag "1", and the scanning flag "1" of the entry in which the model name column 257A of the model information table 257 matches to the model name "Model2", and the process proceeds to step S125.

In step S125, the function comparing unit 25 compares the printing flag of the current apparatus "0" with the printing flag of the substitute apparatus "0", and the process proceeds to step S126. In step S126, the function comparing unit 25 determines whether the printing flag of the current apparatus and the printing flag of the substitute apparatus are both "0". In this case, the function comparing unit 25 determines that the printing flag of the current apparatus and the printing flag of the substitute apparatus are both "0" (Y in step S126), and the process proceeds to step S127. In step S127, the function comparing unit 25 sets the comparison result to "0", and the process proceeds to step S133.

In step S133, the function comparing unit 25 determines whether all of the printing flag, the facsimile transmission flag, and the scanning flag are compared. In this case, the function comparing unit 25 determines that the facsimile transmission flag and the scanning flag are not compared yet (N in step S133), the process returns to step S125.

In step S125, the function comparing unit 25 compares the facsimile transmission flag of the current apparatus "0" with the facsimile transmission flag of the substitute apparatus "1", and the process proceeds to step S126. In step S126, the function comparing unit 25 determines whether the facsimile transmission flag of the current apparatus and the facsimile transmission flag of the substitute apparatus are both "0". In this case, the function comparing unit 25 determines that the facsimile transmission flag of the current apparatus and the facsimile transmission flag of the substitute apparatus are not both "0" (N in step S126), and the process proceeds to step S128.

In step S128, the function comparing unit 25 determines whether the facsimile transmission flag of the current apparatus is "0" and the facsimile transmission flag of the substitute apparatus is "1". In this case, the function comparing unit 25 determines that the facsimile transmission flag of the current apparatus is "0" and the facsimile transmission flag of the substitute apparatus is "1" (Y in step S128), and the process proceeds to step S129. In step S129, the function comparing unit 25 sets the comparison result to "2", and the process proceeds to step S133. In step S133, the function comparing unit 25 determines whether all of the printing flag, the facsimile transmission flag, and the scanning flag are compared. In this case, the function comparing unit 25 determines that the scanning flag is not compared yet (N in step S133), the process returns to step S125.

In step S125, the function comparing unit 25 compares the scanning flag of the current apparatus "0" with the scanning flag of the substitute apparatus "1", and the process proceeds to step S126. In step S126, the function comparing unit 25 determines whether the scanning flag of the current apparatus and the scanning flag of the substitute apparatus are both "0". In this case, the function comparing unit 25 determines that the scanning flag of the current apparatus and the scanning flag of the substitute apparatus are not both "0" (N in step S126), and the process proceeds to step S128.

In step S128, the function comparing unit 25 determines whether the scanning flag of the current apparatus is "0" and the scanning flag of the substitute apparatus is "1". In this case, the function comparing unit 25 determines that the scanning flag of the current apparatus is "0" and the scanning flag of the substitute apparatus is "1" (Y in step S128), and the process proceeds to step S129. In step S129, the function comparing unit 25 sets the comparison result to "2", and the process proceeds to step S133.

In step S133, the function comparing unit 25 determines whether all of the printing flag, the facsimile transmission flag, and the scanning flag are compared. In this case, the function comparing unit 25 determines that all of the printing flag, the facsimile transmission flag, and the scanning flag are compared (Y in step S133), the process proceeds to step S134.

In step S134, the function comparing unit 25 returns the printing flag "0", the facsimile transmission flag "2", and the scanning flag "2" to the information setting unit 22A, and the process proceeds to step S135. In step S135, the information setting unit 22A sets the number M in the first function limitation information table 251a and the second function limitation information table 251b to "0" (M=0), and the process proceeds to step S141 in the flowchart shown in FIG. 13 through the connection path (3).

In step S141 of the flowchart shown in FIG. 13, the information setting unit 22A adds "1" to the number M (M=1), and the process proceeds to step S142. In step S142, the information setting unit 22A determines that the user entry exists at the first row of the first function limitation information table 251a corresponding to the apparatus name "First floor west MFP" (Y in step S142), and the process proceeds to step S143. In step S143, the information setting unit 22A determines that the substitution flag is not "1" (N in step S143), and the process proceeds to step S160.

In step S160, from the first function limitation information table 251a corresponding to the apparatus name "First floor west MFP", the information setting unit 22A retrieves the user name "User3" and the mail address "User3@aaa.bbb". Afterward, the process proceeds to step S161. In step S161, the information setting unit 22A determines whether the user name "User3" does exist in the second function limitation information table 251b corresponding to the substitute apparatus name "First floor south printer", and the substitute number is "1". In this case, the information setting unit 22A determines that the user name does exist and the substitute number is "1" (Y in step S161), so that the process proceeds to step S164.

In step S164, the information setting unit 22A deletes the user name "User3", and the process proceeds to step S165. In step S165, the information setting unit 22A transmits the apparatus name "First floor west MFP", the substitution flag "0", the substitute apparatus name "First floor south printer", the user name "User3", the mail address "User3@aaa.bbb", the printing flag "0", the facsimile transmission flag "2", and the scanning flag "2" to the notification unit 23A. Then, the process proceeds to step S171 in the flowchart shown in FIG. 14 through the connection path (4).

In step S171 of the flowchart shown in FIG. 14, the notification unit 23A retrieves the model name "Model2" and the address "192.168.0.3" of the entry having the substitute apparatus name "First floor south printer" matching to the apparatus name column 250A of the apparatus administration table 250, and the process proceeds to step S172. In step S172, the notification unit 23A determines that the substitution flag is not "1" (N in step S172), and the process proceeds to step S190.

In step S190, the notification unit 23A retrieves the printer driver name "Model2Prn", the facsimile driver name "NULL", and the scanner driver name "NULL" of the entry having the model name "Model2" matching to the model name column 257A of the model information table 257. Afterward, the process proceeds to step S191. In step S191, the notification unit 23A retrieves the model name "Model1" and the address "192.168.0.2" of the entry having the apparatus name of the current apparatus "First floor west MFP" matching to the apparatus name column 250A of the apparatus administration table 250, and the process proceeds to step S192.

In step S192, the notification unit 23A retrieves the printer driver name "Model1Prn", the facsimile driver name "Model1Fax", the scanner driver name "Model1Scn", the printer driver path "¥¥Server¥Drv¥Model1Prn", the facsimile driver path "¥¥Server¥Drv¥Model1Fax", and the scanner driver path "¥¥Server¥Drv¥Model1Scn" of the entry having the model name "Model1" matching to the model name column 257A of the model information table 257. Afterward, the process proceeds to step S193.

In step S193, the notification unit 23A writes the contents of the mail, and the process proceeds to step S194. The mail indicates that the apparatus name "First floor west MFP" becomes the usable state. In step S194, the notification unit 23A adds the substitution flag "0", the apparatus name of the current apparatus "First floor west MFP", the address of the current apparatus "192.168.0.2", and the address of the substitute apparatus "192.168.0.3" to the path "¥¥Server¥Drv¥Installer.exe" of the installer 252. Afterward, the process proceeds to step S195.

In step S195, the notification unit 23A determines whether the comparison result of the printing flag is "0". In this case, the notification unit 23A determines that the comparison result of the printing flag is "0" (Y in step S182), and the process proceeds to step S196. In step S196, the notification unit 23A adds "-P" indicating the printer driver, the printer driver name of the current apparatus "Model1Prn", the printer driver path "¥¥Server¥Drv¥ Model1Prn", and the printer driver name of the substitute apparatus "Model2Prn" to the path "¥¥Server¥Drv¥Installer.exe" of the installer 252. Afterward, the process proceeds to step S197.

In step S197, the notification unit 23A determines whether the comparison result of the facsimile transmission flag is "0". In this case, the notification unit 23A determines that the comparison result of the facsimile transmission flag is not "0" (N in step S197), and the process proceeds to step S199. In step S199, the notification unit 23A determines whether the comparison result of the scanning flag is "0". In this case, the notification unit 23A determines that the comparison result of the scanning flag is not "0" (N in step S199), and the process proceeds to step S188.

When the notification unit 23A determines that the comparison result of the facsimile transmission flag is "0" (Y in step S197), and the process proceeds to step S198. In step S198, the notification unit 23A adds "-F" indicating the facsimile driver, the facsimile driver name of the current apparatus, the facsimile driver path, and the facsimile driver name of the substitute apparatus to the path "¥¥Server¥Drv¥Installer.exe" of the installer 252. Afterward, the process proceeds to step S199.

When the notification unit 23A determines that the comparison result of the scanning flag is "0" (Y in step S199), and the process proceeds to step S200. In step S200, the notification unit 23A adds "-S" indicating the scanner driver, the scanner driver name of the current apparatus, the scanner driver path, and the scanner driver name of the substitute apparatus to the path "¥¥Server¥Drv¥Installer.exe" of the installer 252. Afterward, the process proceeds to step S188.

In step S188 of the flowchart shown in FIG. 13, the notification unit 23A writes the path of the installer and the additional information to the contents of the mail, and the process proceeds to step S189. In step S189, the notification unit 23A transmits the mail in which the path of the installer and the additional information are written to the mail address "User3@aaa.bbb". Afterward, the process returns to step S141 of the flowchart shown in FIG. 13 through the connection path (3).

In step S141 of the flowchart shown in FIG. 13, the information setting unit 22A adds "1" to the number M (M=2), and the process proceeds to step S142. In step S142, the information setting unit 22A determines that the user entry exists at the second row of the first function limitation information table 251a corresponding to the apparatus name "First floor west MFP" (Y in step S142), and the process proceeds to step S143. In step S143, the information setting unit 22A determines that the substitution flag is not "1" (N in step S143), and the process proceeds to step S160.

In step S160, from the user entry at the second row, the information setting unit 22A retrieves the user name "User4" and the mail address "User4@aaa.bbb". Afterward, the process proceeds to step S161. In step S161, the information setting unit 22A determines that although the user name exist, the substitute number is not "1" (N in step S161), so that the process proceeds to step S162.

In step S162, the information setting unit 22A determines whether the substitution number of the user thus identified is greater than "2". In this case, the information setting unit 22A determines that the substitution number of the user thus identified is not greater than "2" (N in step S162), and the process returns to step S141.

When the information setting unit 22A determines that the substitution number of the user thus identified is greater than "2" (Y in step S162), the process proceeds to step S163. In step S163, the information setting unit 22A subtracts "1" from the substitution number to be written.

In step S141, the information setting unit 22A adds "1" to the number M (M=3), and the process proceeds to step S142. In step S142, the information setting unit 22A determines that the user entry does not exist at the third row of the first function limitation information table 251a corresponding to the apparatus name "First floor west MFP" (N in step S142), and the process returns to step S2 of the flowchart shown in FIG. 11 through the connection path (1).

In step S2 of the flowchart shown in FIG. 11, the determining unit 21A adds "1" to the number N (N=2), and the process proceeds to step S3. In step S3, the determining unit 21A determines that the apparatus entry does exist at the second row in the apparatus administration table 250 (Y in step S3), and the process proceeds to step S4.

In step S4, the determining unit 21A retrieves the apparatus name "First floor south printer", the address "192.168.0.3", the substitution flag "0", and the substitute apparatus name "First floor west MFP" from the apparatus entry at the second row of the apparatus administration table 250. Afterward, the process proceeds to step S5. In step S5, the determining unit 21A obtains the status of the usable state "0" as the status column 250D of the address "192.168.0.3", and the process proceeds to step S6.

In step S6, the determining unit 21A determines that the apparatus can be connected (Y in step S6), the process proceeds to step S7. In step S7, the determining unit 21A stores "0" in the non-connection time column 250E of the apparatus administration table 250, and the process proceeds to step S8. In step S8, the determining unit 21A determines that the apparatus is in the usable state (Y in step S8), the process proceeds to step S14. In step S14, the determining unit 21 stores "0" in the status column 250D of the apparatus administration table 250, and the process proceeds to step S15. In step S15, the determining unit 21A determines that the substitution flag is not "1" (N in step S15), the process returns to step S2.

In step S2, the determining unit 21A adds "1" to the number N (N=3), and the process proceeds to step S3. In step S3, the determining unit 21A determines that the apparatus does not exist at the third row of the apparatus administration table 250 (N in step S3), and the process is completed.

In the process from step S201, step S202, and from step S216 to step S234 shown in the flowchart in FIG. 15, the installer 45 deletes the driver of the substitute apparatus when the substitute apparatus becomes unnecessary.

When the path of the transmitted mail is executed, the installer 252 of the server 2A is retrieved in the client device 4b, so that the installer 45 is started. Accordingly, the process starts and proceeds to step S201. In step S201, the installer 45 retrieves the substitution flag "0" transmitted from the path, and the process proceeds to step S202. In step S202, the installer 45 determines whether the substitution flag is "1". In this case, the installer 45 determines that the substitution flag is not "1" (N in step S202), and the process proceeds to step S216.

In step S216, the installer 45 retrieves the apparatus name of the current apparatus "First floor west MFP", the address of the current apparatus "192.168.0.2", and the address of the substitute apparatus "192.168.0.3" from the starting path. Afterward, the process proceeds to step S217.

In step S217, the installer 45 determines whether the starting path includes "-P". In this case, the installer 45 determines that the starting path includes "-P" (Y in step S217), and the process proceeds to step S218. In step S218, the installer 45 retrieves the printer driver name of the current apparatus "Model1Prn", the printer driver path of the current apparatus "¥¥Server¥Drv¥Model1Prn", and the printer driver name of the substitute apparatus "Model2Prn" from the starting path. Afterward, the process proceeds to step S219. When the installer 45 determines that the starting path does not include "-P" (N in step S217), the process proceeds to step S223.

In step S219, the installer 45 determines whether the printer driver having the printer driver name "Model2Prn" and the connection destination "192.168.0.3" is installed. In this case, the installer 45 determines that the printer driver having the printer driver name "Model2Prn" and the connection destination "192.168.0.3" is installed (Y in step S219), and the process proceeds to step S220. In step S220, the installer 45 deletes the printer driver having the printer driver name "Model2Prn" and the connection destination "192.168.0.3", and the process proceeds to step S221. When the installer 45 determines that the printer driver having the printer driver name "Model2Prn" and the connection destination "192.168.0.3" is not installed (N in step S219), the process proceeds to step S221.

In step S221, the installer 45 determines whether the printer driver having the printer driver name "Model1Prn" and the connection destination "192.168.0.2" is installed. In this case, the installer 45 determines that the printer driver having the printer driver name "Model1Prn" and the connection destination "192.168.0.2" is installed (Y in step S221), and the process proceeds to step S223. When the installer 45 determines that the printer driver having the printer driver name "Model1Prn" and the connection destination "192.168.0.2" is not installed (N in step S221), the process proceeds to step S222.

In step S222, the installer 45 adds the printer driver name to the apparatus name of the current apparatus and sets the connection destination to the address of the current apparatus, so that the installer 45 installs the printer driver of the printer driver path. Afterward, the process proceeds to step S223.

In step S223, the installer 45 determines whether the starting path includes "-F". In this case, the installer 45 determines that the starting path does not include "-F" (N in step S223), and the process proceeds to step S229. In step S229, the installer 45 determines whether the starting path includes "-S". In this case, the installer 45 determines that the starting path does not include "-S" (N in step S212), and the process is completed.

When the installer 45 determines that the starting path includes "-F" (Y in step S223), the process proceeds to step S224. In step S224, the installer 45 retrieves the facsimile driver name of the current apparatus "Model1Fax", the facsimile driver path of the current apparatus "¥¥Server¥Drv¥Model1Fax", and the facsimile driver path of the substitute apparatus "¥¥Server¥Drv¥Model2Fax" from the starting path. Afterward, the process proceeds to step S225.

In step S225, the installer 45 determines whether the facsimile driver having the facsimile driver name "NULL" and the connection destination "192.168.0.3" is installed. When the installer 45 determines that the facsimile driver having the facsimile driver name "NULL" and the connection destination "192.168.0.3" is installed (Y in step S225), the process proceeds to step S226. In step S226, the installer 45 deletes the facsimile driver thus identified, and the process proceeds to step S227. When the installer 45 determines that the facsimile driver having the facsimile driver name "NULL" and the connection destination "192.168.0.3" is not installed (N in step S225), the process proceeds to step S227.

In step S227, the installer 45 determines whether the facsimile driver having the facsimile driver name "Model1Fax" and the connection destination "192.168.0.2" is installed. When the installer 45 determines that the facsimile driver having the facsimile driver name "Model1Fax" and the connection destination "192.168.0.2" is installed (Y in step S227), the process proceeds to step S228. When the installer 45 determines that the facsimile driver having the facsimile driver name "Model1Fax" and the connection destination "192.168.0.2" is not installed (N in step S227), the process proceeds to step S228.

In step S228, the installer 45 installs the facsimile driver 254 of the server 2A with the name that the facsimile driver name is added to the apparatus name of the current apparatus, and the connection destination as the address of the current apparatus. Accordingly, the substitute apparatus name becomes "First floor west MFP Model1Fax", and the connection destination is "192,168.0.2". Afterward, the process proceeds to step S229.

When the installer 45 determines that the starting path includes "-S" (Y in step S229), the process proceeds to step S230. In step S230, the installer 45 retrieves the scanner driver name of the current apparatus "Model1Scn", the scanner driver path of the current apparatus "¥¥Server¥Drv¥Model1Scn", and the scanner driver path of the substitute apparatus "¥¥Server¥Drv¥Model2Scn" from the starting path. Afterward, the process proceeds to step S231.

In step S231, the installer 45 determines whether the scanner driver having the scanner driver name "NULL" and the connection destination "192.168.0.3" is installed. When the installer 45 determines that the scanner driver having the scanner driver name "NULL" and the connection destination "192.168.0.3" is installed (Y in step S231), the process proceeds to step S232. In step S232, the installer 45 deletes the scanner driver thus identified, and the process proceeds to step S233. When the installer 45 determines that the scanner driver having the scanner driver name "NULL" and the connection destination "192.168.0.3" is not installed (N in step S227), the process proceeds to step S233.

In step S233, the installer 45 determines whether the scanner driver having the scanner driver name "Model1Scn" and the connection destination "192.168.0.2" is installed. When the installer 45 determines that the scanner driver having the scanner driver name "Model1Scn" and the connection destination "192.168.0.2" is installed (Y in step S233), the process is completed. When the installer 45 determines that the scanner driver having the scanner driver name "Model1Scn" and the connection destination "192.168.0.2" is not installed (N in step S227), the process proceeds to step S234.

In step S228, the installer 45 installs the facsimile driver 254 of the server 2A with the name that the scanner driver name is added to the apparatus name of the current apparatus, and the connection destination as the address of the current apparatus. Accordingly, the substitute apparatus name becomes "First floor west MFP Model1Scn", and the connection destination is "192,168.0.2". Afterward, the process is completed.

As described above, through the process from step S216 to step S234 of the flowchart shown in FIG. 15, the printer driver 44 on the client device 4b is deleted, so that the printer driver 44 becomes the unusable state.

Lastly, the process will be explained when the user "User3" on the client device 4b requests the printer 5 to perform the printing operation after the driver of the printer 5 is deleted with the client device 4b with reference to FIGS. 7 and 9 along with the flowchart shown in FIG. 16.

When the user "User3" uses the client device 4b to request the printer 5 to perform the printing operation through an application (not shown), the process starts and proceeds to step S241 of the flowchart shown in FIG. 16. In step S241, the restricting unit 50 of the printer 5 receives the job request transmitted from the client device 4b, and the process proceeds to step S242. In step S242, the restricting unit 50 determines whether the restricting unit 50 receives the print data. In this case, the restricting unit 50 determines that the restricting unit 50 receives the print data (Y in step S242), and the process proceeds to step S243. In step S243, the restricting unit 50 inquires the server 2A of the function restriction information of the user "User3", and the process proceeds to step S244.

In step S244, the information obtaining unit 24A of the server 2A retrieves the second function limitation information table 251b of the user "User3" from the first function limitation information table 251a of the printer 5 to which the inquiry is referred, and the process proceeds to step S245. In step S245, the information obtaining unit 24A determines whether the user does exist. In this case, the information obtaining unit 24A determines that the user "User3" does not exist (N in step S245), and the process proceeds to step S246.

In step S246, the information obtaining unit 24A returns the printing permission flag "1" to the printer 5 to which the inquiry is referred, and the process proceeds to step S248. In step S248, the restricting unit 50 of the printer 5 receives the printing permission flag "1", and the process proceeds to step S249.

In step S249, the restricting unit 30 determines whether the printing permission flag is "0". In this case, the restricting unit 30 determines that the printing permission flag is not "0" (N in step S249), and the process is completed without transmitting the print data to the printing unit 51.

As described above, in the second embodiment, the image forming system includes the multifunction device 3a as the first image forming apparatus; the printer 5 as the additional image forming apparatus; and the server 2A as the administration apparatus. The server 2A is configured to store the setting information of the users of the multifunction device 3a and the printer 5, so that the server 2 controls the multifunction device 3a and the printer 5 according to the setting information thus stored.

Further, the server 2A includes the determining unit 21 for comparing the set functions of the multifunction device 3a and the set functions of the printer 5 with reference to the model information table 257 storing the functions corresponding to the model names. Accordingly, when the current apparatus and the substitute apparatus are different models, the setting information of the user of the apparatus that becomes the unusable state is automatically added to the substitute apparatus. As a result, the user, who uses the substitute apparatus, is capable of using the substitute apparatus without any additional operation as well as the user who uses the current apparatus that becomes the unusable state.

It should be noted that the present invention is not limited to the first embodiment and the second embodiment described above, and may be modified in various ways as explained below.

In the image forming system in the first embodiment and the second embodiment described above, two of the image forming apparatus and the information processing apparatus are connected to the network 1. However, the image forming apparatus and the information processing apparatus connected to the network 1 are not limited to two.

In the image forming system in the first embodiment and the second embodiment described above, the multifunction device 3a, the multifunction device 3b, the printer 5, the server 2, the server 2A, the client device 4a and the client device 4b are connected to the network 1 that is capable of bilateral communication, and may be connected through a wireless network that is capable of bilateral communication.

In the image forming system in the first embodiment and the second embodiment described above, the determining unit 21 and the determining unit 21A are configured to determine whether the substitute apparatus is necessary according to the predetermined condition. Alternatively, a condition setting unit may be provided in the determining unit 21 and the determining unit 21A separately for setting the condition to determine whether the substitute apparatus is necessary.

The disclosure of Japanese Patent Application No. 2013-015995, filed on Jan. 30, 2013, is incorporated in the application.

While the invention has been explained with reference to the specific embodiments of the invention, the explanation is illustrative and the invention is limited only by the appended claims.

What is claimed is:

1. An image forming system, comprising:
a first image forming apparatus configured to operate according to first setting information that is set to a first user;
a second image forming apparatus configured to operate according to second setting information that is set to a second user; and
an administration apparatus that administers the first image forming apparatus and the second image forming apparatus, said administration apparatus being configured to hold first apparatus information for the first image forming apparatus including the first setting information, and second apparatus information for the second image forming apparatus including the second setting information,
wherein said administration apparatus includes:
a determining unit configured to determine that the second image forming apparatus is used as a substitute apparatus for the first image forming apparatus when the first image forming apparatus cannot be used; and
an information setting unit configured to add the first setting information to the second apparatus information according to a determination result of the determining unit,
said first setting information includes first function restriction information for restricting a function that the first user can use, and
said second setting information includes second function restriction information for restricting a function that the second user can use.

2. The image forming system according to claim 1, wherein said administration apparatus further includes a notification unit configured to notify that the substitute apparatus for the first image forming apparatus is the second image forming apparatus.

3. The image forming system according to claim 1, further comprising an information processing apparatus having a control program for controlling an operation of the first image forming apparatus,
wherein said information processing apparatus includes an install unit configured to make the second image forming apparatus controllable.

4. The image forming system according to claim 1, wherein said information setting unit is configured to delete the first setting information added to the second apparatus information from the second apparatus information when the first image forming apparatus can be used and the determining unit determines that the substitute apparatus is not necessary.

5. The image forming system according to claim 2, wherein said administration apparatus further includes a function comparing unit configured to compare a first set of functions of the first image forming apparatus with a second set of functions of the second image forming apparatus so that the function comparing unit outputs a comparison result.

6. The image forming system according to claim 1, wherein said administration apparatus includes an administration table configured to store a condition for determining whether the substitute apparatus for the first image forming apparatus is necessary.

7. An image forming system, comprising:
a first image forming apparatus configured to operate according to first setting information that is set to a first user;
a second image forming apparatus configured to operate according to second setting information that is set to a second user; and
an administration apparatus that administers the first image forming apparatus and the second image forming apparatus, said administration apparatus being configured to hold first apparatus information for the first image forming apparatus including the first setting information, and second apparatus information for the second image forming apparatus including the second setting information,
wherein said administration apparatus includes:
a determining unit configured to determine that the second image forming apparatus is used as a substitute apparatus for the first image forming apparatus when the first image forming apparatus cannot be used;
an information setting unit configured to add the first setting information to the second apparatus information according to a determination result of the determining unit;
a notification unit configured to notify that the substitute apparatus for the first image forming apparatus is the second image forming apparatus; and
a function comparing unit configured to compare a first set of functions of the first image forming apparatus with a second set of functions of the second image forming apparatus so that the function comparing unit outputs a comparison result, and
said information setting unit is configured to void a function that exists only in the second image forming apparatus when the information setting unit adds the first setting information to the second apparatus information if the second set includes the function that exists only in the second image forming apparatus according to the comparison result.

8. An image forming system, comprising:
a first image forming apparatus configured to operate according to first setting information that is set to a first user;
a second image forming apparatus configured to operate according to second setting information that is set to a second user; and
an administration apparatus that administers the first image forming apparatus and the second image forming apparatus, said administration apparatus being configured to hold first apparatus information for the first image forming apparatus including the first setting information, and second apparatus information for the second image forming apparatus including the second setting information, wherein said administration apparatus includes:
- a determining unit configured to determine that the second image forming apparatus is used as a substitute apparatus for the first image forming apparatus when the first image forming apparatus cannot be used;
- an information setting unit configured to add the first setting information to the second apparatus information according to a determination result of the determining unit;
- a notification unit configured to notify that the substitute apparatus for the first image forming apparatus is the second image forming apparatus; and
- a function comparing unit configured to compare a first set of functions of the first image forming apparatus with a second set of functions of the second image forming apparatus so that the function comparing unit outputs a comparison result, and said notification unit is configured to notify that a function that exists only in the first image forming apparatus is not allowed to be used when the first set includes the function that exists only in the first image forming apparatus according to the comparison result.

\* \* \* \* \*